(12) United States Patent
Yamazaki

(10) Patent No.: US 7,929,382 B2
(45) Date of Patent: Apr. 19, 2011

(54) PIEZOELECTRIC TRANSDUCER, PIEZOELECTRIC ACTUATOR, AND PORTABLE DEVICE

(75) Inventor: Yutaka Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 519 days.

(21) Appl. No.: 12/024,405

(22) Filed: Feb. 1, 2008

(65) Prior Publication Data

US 2008/0192584 A1 Aug. 14, 2008

(30) Foreign Application Priority Data

Feb. 14, 2007 (JP) ................................. 2007-034079
Nov. 1, 2007 (JP) ................................. 2007-285086

(51) Int. Cl.
*G04F 5/00* (2006.01)
*H01L 41/08* (2006.01)
*H02N 2/10* (2006.01)

(52) U.S. Cl. ............... 368/157; 310/323.02; 310/323.16
(58) Field of Classification Search .................. 368/157, 368/160; 310/323.01, 323.06, 328, 323.02
See application file for complete search history.

(56) References Cited

U.S. PATENT DOCUMENTS

| | | | | |
|---|---|---|---|---|
| 5,233,258 A | * | 8/1993 | Myoga et al. ............ | 310/323.17 |
| 5,416,375 A | | 5/1995 | Funakubo et al. | |
| 5,821,670 A | | 10/1998 | Tobe et al. | |
| 5,828,157 A | | 10/1998 | Miki et al. | |
| 6,043,586 A | * | 3/2000 | Kobayashi et al. ....... | 310/323.09 |
| 6,051,912 A | * | 4/2000 | Gonda ..................... | 310/323.02 |
| 6,088,300 A | * | 7/2000 | Nakajima et al. ............... | 368/28 |
| 6,104,123 A | * | 8/2000 | Okazaki et al. .......... | 310/323.09 |
| 6,242,846 B1 | * | 6/2001 | Ashizawa et al. ........ | 310/323.02 |
| 7,119,476 B2 | * | 10/2006 | Nagahama .................... | 310/317 |
| 7,253,552 B2 | * | 8/2007 | Miyazawa et al. ....... | 310/323.02 |
| 2005/0082950 A1 | * | 4/2005 | Zakoji ............................ | 310/348 |
| 2005/0236936 A1 | * | 10/2005 | Shiv et al. ...................... | 310/328 |
| 2006/0175929 A1 | * | 8/2006 | Sawada et al. ................ | 310/312 |
| 2006/0250048 A1 | * | 11/2006 | Moteki et al. ............ | 310/323.02 |

FOREIGN PATENT DOCUMENTS

| | | |
|---|---|---|
| JP | 06-104503 A | 4/1994 |
| JP | 08-114408 A | 5/1996 |
| JP | 2000-188886 A | 7/2000 |
| JP | 2002-262586 A | 9/2002 |
| JP | 2004-254417 A | 9/2004 |
| JP | 3832260 B2 | 7/2006 |
| JP | 2007-221924 A | 8/2007 |
| WO | WO-96/14687 A1 | 5/1996 |
| WO | WO-01/63679 A1 | 8/2001 |

* cited by examiner

*Primary Examiner* — Vit W Miska
(74) *Attorney, Agent, or Firm* — Global IP Counselors, LLP

(57) ABSTRACT

A piezoelectric transducer that excites longitudinal vibration has a piezoelectric element, and a reinforcing member that is laminated with and affixed to the piezoelectric element and has a first void part. The first void part includes the center part of a location where strain produced by longitudinal vibration in the piezoelectric transducer or the reinforcing member or piezoelectric element is greatest.

15 Claims, 41 Drawing Sheets

PIEZOELECTRIC TRANSDUCER, PIEZOELECTRIC ACTUATOR, AND PORTABLE DEVICE

BACKGROUND

1. Technical Field

The present invention relates to a piezoelectric transducer, a piezoelectric actuator, and a portable device.

2. Related Art

In addition to reducing the size and thickness of parts used in small, portable electronic devices such as wristwatches, it is also conventionally desirable to reduce power consumption in order to extend battery life. This has led to piezoelectric actuators being used instead of stepping motors as the drive device in timepieces, for example, because of their small size, thinness, and superior efficiency converting electrical energy to mechanical energy. See, for example, Japanese Patent 3832260 (FIG. 6 and paragraphs 0008 and 0009), Japanese Unexamined Patent Appl. Pubs. JP-A-H08-114408 (FIG. 7), JP-A-H06-104503 (FIG. 1), JP-A-2004-254417 (FIG. 2 and FIG. 7), and WIPO Pamphlet 96/14687 (page 14, lines 15-24, and FIG. 16).

As shown in Japanese Patent 3832260, the piezoelectric actuator used in this type of portable device has a flat, substantially rectangular piezoelectric transducer that has a reinforcing member laminated with a rectangular piezoelectric element, uses the piezoelectric transversal effect produced by applying an electrical field in the thickness direction of the piezoelectric element to cause the piezoelectric transducer to vibrate in the direction (in-plane direction) along the surface perpendicular to the direction of the applied field, and drives a rotor or other driven body by transferring this vibration to the driven body.

Note that the "in-plane direction" as used herein is the direction of the plane that is perpendicular to the direction of the field applied to the piezoelectric element. This in-plane direction is a set of plural vectors perpendicular to the direction of the field applied to the piezoelectric element. The piezoelectric transducer of the present invention vibrates in this in-plane direction. In addition, any direction (any direction deviating from this in-plane direction) intersecting this in-plane direction is referred to as an "out-of-plane direction."

The reinforcing member that is laminated to the piezoelectric element in the piezoelectric transducer taught in Japanese Patent 3832260 has a stationary part, a pair of movable parts, and a pair of arm parts. The stationary part is fixed to a device-side support member, for example, and is disposed near the plane center of the piezoelectric element. The pair of movable parts are disposed along the short sides of the piezoelectric element, and the pair of arms connect the stationary part with the movable parts. A protruding tip is rendered to each of the movable parts, and one of the protruding tips is set in contact with the rotor (driven body). The reinforcing member is shaped this way in order to increase the amplitude of and stabilize sinusoidal vibration, which is typically difficult to control. The area of the reinforcing member is smaller than the area of the piezoelectric element while leaving a place to attach the reinforcing member to the device and a place for contact with the driven body, and the rigidity of the reinforcing member is reduced.

Japanese Unexamined Patent Appl. Pub. JP-A-H08-114408 teaches forming an opening in the reinforcing member for greater flexibility and reduces the rigidity of the reinforcing member by reducing the thickness of the reinforcing member in places.

JP-A-H06-104503 teaches reducing the rigidity of the reinforcing member by forming a slit in the rectangular reinforcing member so that the flexural rigidity across the width is greater than the flexural rigidity along the length.

Similarly, JP-A-2004-254417 teaches reducing the rigidity of the reinforcing member by making the reinforcing member small enough to contact only a part of the piezoelectric element.

WIPO Pamphlet 96/14687 teaches reducing the rigidity of the reinforcing member by making the reinforcing member from a material with good flexibility.

Demand for increasingly smaller and thinner electronic devices continues unabated, and growing use of piezoelectric actuators has also created demand for piezoelectric actuators that can drive heavier loads, piezoelectric actuators that can continuously drive a driven body, and piezoelectric actuators that can achieve a high drive speed. To achieve this requires increasing the amplitude of the piezoelectric transducer and improving the drive efficiency.

Reducing the size and thickness of the device and increasing the amplitude of the piezoelectric transducer are usually mutually exclusive. The applied voltage drops if the size of the power supply (battery) is reduced, the amplitude therefore also decreases, and it is difficult to achieve the desired drive characteristic. Conversely, increasing the applied voltage to increase the amplitude typically requires a larger power supply. Note that as the size of the power supply decreases and the applied voltage decreases, vibration of the piezoelectric element decreases and the drive efficiency relative to the input power drops, and driving the driven body may not be possible. It is therefore necessary to greatly increase drive efficiency.

Simply reducing the rigidity of the reinforcing member by using a reinforcing member with less area than the piezoelectric element as taught in Japanese Patent 3832260, JP-A-H08-114408, JP-A-H06-104503, and JP-A-2004-254417, or reducing the rigidity of the reinforcing member by making the reinforcing member from a material with good flexibility as taught in WIPO Pamphlet 96/14687, does not mean that the amplitude can be reliably increased and is still far from achieving the required drive efficiency. This is because the relationship between the rigidity of the reinforcing member and the vibration energy density in different parts of the piezoelectric transducer in specific vibration modes is not considered. Unless the significance of the different shapes of low rigidity reinforcing members is better understood, reliably increasing amplitude in a specific vibration mode and achieving high drive efficiency will not be possible.

Japanese Patent 3832260, JP-A-H08-114408, JP-A-H06-104503, and JP-A-2004-254417 teach reducing the rigidity of the reinforcing member by changing the shape of the reinforcing member. Contact state between the piezoelectric element and the reinforcing member at the node and antinode of vibration in Japanese Patent 3832260, JP-A-H08-114408, JP-A-H06-104503, and JP-A-2004-254417 is shown in Table 1.

TABLE 1

|  | JP 3832260 | JP-A-H08-114408 | JP-A-H06-104503 | JP-A-2004-254417 |
| --- | --- | --- | --- | --- |
| Node of longitudinal vibration | contact | contact | contact | contact |
| Antinode of sinusoidal vibration | no contact | contact | contact | no contact |

Because the reinforcing member and the piezoelectric element in Japanese Patent 3832260, JP-A-H08-114408, JP-A-H06-104503, and JP-A-2004-254417 are in contact at the node of longitudinal vibration where the strain of longitudinal vibration is greatest, vibration of the piezoelectric transducer is impeded and vibration efficiency drops.

Vibration of the piezoelectric transducer is also impeded and vibration efficiency drops with the devices taught in JP-A-H08-114408 and JP-A-H06-104503 because the reinforcing member and the piezoelectric element are in contact at the antinode of the sinusoidal vibration where the strain of sinusoidal vibration is greatest. Note that in JP-A-H08-114408 the electrode functions as a reinforcing member because there is no reinforcing member per se.

In JP-A-2004-254417 the reinforcing member is present and is in contact with the piezoelectric element in the center of the width at the node of longitudinal vibration.

The reinforcing member and the piezoelectric element do not touch at the antinode of sinusoidal vibration in Japanese Patent 3832260 and JP-A-2004-254417. However, because the shape of the part (this part is referred to as the arm parts in Japanese Patent 3832260) of the reinforcing member extending substantially lengthwise through the widthwise center part of the rectangular piezoelectric element is not particularly considered and this part is narrow in width, the reinforcing member may not be able to limit displacement in any direction other than the direction (in-plane direction) along the plane perpendicular to the direction of the field applied to the piezoelectric element. As a result, it may not even be possible to achieve the desired effect of increased amplitude.

More specifically, because displacement in a direction (out-of-plane direction) other than the direction (in-plane direction) along the plane perpendicular to the direction of the field applied to the piezoelectric element occurs, the amplitude of vibrations in the direction along the plane perpendicular to the direction of the field applied to the piezoelectric element is attenuated.

The tendency for displacement in a direction (out-of-plane direction) other than the in-plane direction was analyzed using a piezoelectric transducer 100 (FIG. 33) that has a reinforcing member (FIG. 32) with a smaller area than the piezoelectric element, substantially the same as the reinforcing member taught in Japanese Patent 3832260 and JP-A-2004-254417. FIG. 34 and FIG. 35 show the results of this analysis.

As shown in FIG. 32, the reinforcing member 101 has a rectangular outside shape (indicated by the double-dot dash line) with four portions of equal length and width removed from the reinforcing member 101 as shown in FIG. 32, rendering void portions 101A. The piezoelectric transducer 100 shown in FIG. 33 has this reinforcing member 101 and piezoelectric elements 102 that are bonded to the front and back surfaces of the reinforcing member 101. A non-contacting portion 103 where there is no contact between the reinforcing member 101 and the piezoelectric elements 102 is rendered in the areas where the void portions 101A are formed in the reinforcing member 101 (FIG. 32), and these non-contacting portions 103 are rendered at the same positions as the void portions 101A.

Fives electrodes configured identically to the five electrodes 231 to 235 shown in FIG. 3 are disposed to the piezoelectric elements 102. FIG. 34 shows the vibration of the piezoelectric transducer 100 when voltage is applied to the electrodes of the piezoelectric elements 102 of the piezoelectric transducer 100 that correspond to electrodes 232, 233, and 234 in FIG. 3, and voltage is not applied to the electrodes corresponding to electrodes 231 and 235 in FIG. 3. Not applying voltage to some of the electrodes on the piezoelectric elements 102 produces an imbalance in the longitudinal expansion and contraction of the piezoelectric elements 102, and thus induces sinusoidal vibration in a direction perpendicular to the longitudinal direction of the piezoelectric elements 102. Note that FIG. 34 shows what happens when a rotor or other driven body does not contact the piezoelectric transducer 100 and the piezoelectric transducer 100 vibrates in a no-load state.

FIG. 34 shows the result of a computer simulation of the vibration state of the piezoelectric transducer in FIG. 33. FIG. 35 shows only the piezoelectric element 102 of the piezoelectric transducer 100 in FIG. 34 when vibrating. FIG. 34 and FIG. 35 exaggerate the actual displacement of the piezoelectric elements 102 and reinforcing member 101, but it will be obvious from FIG. 34 and FIG. 35 that vibration on the z-axis in the non-contacting portions 103 (FIG. 34) where there is no contact between the reinforcing member 101 and the piezoelectric elements 102 is greater than the parts where the reinforcing member 101 and the piezoelectric elements 102 touch. As a result, displacement in a direction other than the in-plane direction (i.e., the out-of-plane direction) results if the size of the voids is increased indiscriminately.

SUMMARY

As a result of studying the shape of the reinforcing member and the vibration energy density in different parts of the reinforcing member, the piezoelectric transducer, the piezoelectric actuator, and a portable device according to the present invention can greatly improve the drive efficiency.

A first aspect of the invention is a piezoelectric transducer that excites longitudinal vibration and has a piezoelectric element, and a reinforcing member that is laminated with and affixed to the piezoelectric element, and a first void part is formed in the reinforcing member. The opening of the first void part includes the center part of a location where strain produced by longitudinal vibration in the piezoelectric transducer or the reinforcing member or piezoelectric element is greatest.

The strain produced by longitudinal vibration means the percentage of displacement in a prescribed unit length of the piezoelectric transducer (or the piezoelectric element or reinforcing member).

The node of longitudinal vibration denotes the part where strain in the piezoelectric transducer produced by longitudinal vibration is maximum. The antinode of longitudinal vibration is where the strain is minimum.

Note that the node is where the vibration amplitude in the piezoelectric transducer is substantially zero, and the antinode is where the piezoelectric transducer moves the most and amplitude is greatest.

In the following description of the invention the location "where strain produced by longitudinal vibration is greatest" is equal to the node of longitudinal vibration. The node of longitudinal vibration is located on a line dividing the dimension of the piezoelectric transducer in the direction of longitudinal vibration into equal halves. The center part denotes the center in the direction perpendicular to the direction of longitudinal vibration at the node of longitudinal vibration. For example, if the piezoelectric transducer is a rectangular plate, a position on the line dividing the length of the piezoelectric transducer in half is the node of longitudinal vibration, and the center part is the center of the width of the piezoelectric transducer at the node of longitudinal vibration.

By rendering the first void part to include the center part of the location where strain in the piezoelectric transducer is greatest in the longitudinal vibration mode, the reinforcing member does not contact the piezoelectric element in this first void part, and interference with vibration due to the resistance of the reinforcing member to expansion and contract of the piezoelectric element can be suppressed.

The graph in FIG. 36 shows the amount of strain in the piezoelectric transducer due to longitudinal vibration. The x-axis in FIG. 36 corresponds to the y-axis in FIG. 37. More specifically, the x-axis in FIG. 36 shows the distance from the lengthwise center (point O) of a rectangular piezoelectric transducer (FIG. 37) to a selected point on the y-axis. In FIG. 36 the length from the lengthwise center (point O) to the short side of the piezoelectric transducer is 100 (see FIG. 37). The y-axis in FIG. 36 shows the amount of strain in the piezoelectric transducer produced by longitudinal vibration (where the maximum is 100). FIG. 36 and FIG. 40 and FIG. 41 described below show data for a piezoelectric transducer that does not have a void formed in the reinforcing member.

The graph in FIG. 36 is calculated using the following equation (1).

$$\varepsilon d = \frac{\rho(1-y)a}{E} \quad (1)$$

The parameters used in equation (1) are described below with reference to FIG. 37.

εd: amount of strain in the piezoelectric transducer at a selected point on the y-axis l: length from the lengthwise center of the piezoelectric transducer (point O) to the short side ρ: piezoelectric transducer density a: acceleration when the piezoelectric transducer moves by elongation E: Young's modulus of the piezoelectric transducer Y: distance from the lengthwise center of the piezoelectric transducer (point O) to a selected point on the y-axis The correctness of the data shown in the graph in FIG. 36 was verified based on a detection signal from a detection electrode disposed to the piezoelectric element. More specifically, a detection electrode 105 that is isolated from the drive electrode 104 was formed as shown in FIG. 38, and the amplitude of the detection signals output from the detection electrode 105 was measured. The amount of strain can be measured by measuring the detection signal because the detection signal amplitude substantially represents the amount of strain. The drive electrode 104 covers the entire surface of the piezoelectric element other than where the detection electrode 105 is formed. Applying a drive signal (an AC signal with a frequency near the longitudinal resonance frequency) (applying a voltage) to the drive electrode 104 actively deforms the part where the drive electrode 104 is disposed. The part where the detection electrode is disposed is passively deformed by this active deformation, and a voltage signal denoting the vibration state of the piezoelectric transducer is output from the detection electrode.

The position of the detection electrode 105 was then changed along the lengthwise center line C1 of the piezoelectric transducer (FIG. 38), and the strain produced at each of these positions was measured based on the detection signal amplitude. The resulting data exhibited a trend close to equation (1). The relationship between the amount of strain produced by longitudinal vibration and a selected position y on the y-axis (FIG. 37) between the lengthwise center of the piezoelectric transducer and the short side can therefore be said to be generally as shown in FIG. 36.

The node of longitudinal vibration in the piezoelectric transducer is located on the center line C2 (FIG. 38) across the width of the piezoelectric transducer, and it will be understood from FIG. 36 that the place where strain in the longitudinal vibration mode is greatest is on this center line C2. By rendering the first void part to include at least the center of the location where strain produced by longitudinal vibration is greatest based on verifying the vibration energy density in the piezoelectric transducer, the amplitude of longitudinal vibration caused by in-plane expansion and contraction of the reinforcing member can be reliably increased. Because amplitude is increased while the part of the reinforcing member where a void is not formed suppresses out-of-plane displacement of the piezoelectric element, the amplitude of longitudinal vibration is not attenuated and is reliably increased.

By thus increasing amplitude, the piezoelectric transducer can be used as an actuator to drive a driven body of a heavier load at a higher speed using the same input power, and drive efficiency can therefore be improved. Alternatively, because the input power can be reduced to drive a driven body of a specific load, the electrical capacity of the battery or other power source can be reduced, and devices that incorporate the piezoelectric transducer can be made smaller and thinner.

FIG. 39 shows an example of driving a driven body by means of a piezoelectric transducer that excites primarily longitudinal vibration. As shown in the figure the piezoelectric transducer 91 is disposed substantially in line with the tangent L of the rotor 92, and the rotor 92 is pushed in the direction of the tangent L and driven by movement of a contact prod 911 that is disposed to the piezoelectric transducer 91 as a contact part.

When the piezoelectric transducer 91 is disposed as shown in FIG. 39, the increased amplitude of longitudinal vibration increases the distance the rotor is driven in each vibration cycle of the contact prod 911. As a result, the drive speed can be improved, torque is increased, and a driven body with a large load can be driven.

The direction the driven body moves (the direction of rotation in the case of a rotor) is not limited to one direction, and a rotor, for example, can be driven to rotate clockwise or counterclockwise.

The driven body is also not limited to a rotor, and can be driven linearly.

The piezoelectric actuator can be used, for example, to drive the date wheel and hands in a timepiece, in the zoom mechanism or autofocus mechanism of a camera lens module, in the inkjet head or paper feed mechanism of a printer, in a piezoelectric buzzer, and in the drive mechanism of moving toys.

In another aspect of the invention the piezoelectric transducer excites a mixed vibration mode adding sinusoidal (bending) vibration to the longitudinal vibration.

This aspect of the invention also increases the amplitude of sinusoidal vibration, which is a secondary vibration induced by the longitudinal vibration, as a result of the amplitude of longitudinal vibration being increased by the first void part formed in the reinforcing member. The invention is not limited to arrangements in which sinusoidal vibration is induced by longitudinal vibration, and can be arranged to actively excite both longitudinal vibration and sinusoidal vibration. This mixed vibration mode of longitudinal vibration and sinusoidal vibration can produce an elliptical movement in the piezoelectric transducer that can drive the driven body with high efficiency, and the combined effect of increased longitudinal vibration amplitude and increased sinusoidal vibration amplitude can further increase drive efficiency.

Further preferably, the first piezoelectric transducer according to the invention in which a mixed vibration mode is excited preferably has a second void part formed in the reinforcing member, the second void part including a location where strain produced by sinusoidal vibration in the piezoelectric transducer or the reinforcing member or piezoelectric element is greatest.

The strain produced by sinusoidal vibration means the percentage of displacement in a prescribed unit length of the piezoelectric transducer (or the piezoelectric element or reinforcing member).

By thus rendering a void in the reinforcing member, the place where strain produced by sinusoidal vibration is greatest is open, the reinforcing member does not contact the piezoelectric element in this second void part, and the reinforcing member can suppress interference with vibration.

The graph in FIG. 40 shows the amount of strain in the piezoelectric transducer produced by sinusoidal vibration on the x-axis in FIG. 37 (the axis perpendicular to the long side through center O, the axis perpendicular to the y-axis, and the widthwise axis). The x-axis in FIG. 40 corresponds to the x-axis in FIG. 37. More specifically, the x-axis in FIG. 40 shows the distance (the distance across the width, from the widthwise center (point O) of a rectangular piezoelectric transducer (FIG. 37) to a selected point on the x-axis. In FIG. 40 the distance from the widthwise center (point O) to the long side of the piezoelectric transducer is 100 (see FIG. 37). The y-axis in FIG. 40 shows the amount of strain in the piezoelectric transducer produced by sinusoidal vibration (where the maximum is 100).

As will be understood from FIG. 40, strain in the sinusoidal vibration mode gradually increases from the widthwise center (point O) along the x-axis to the outside edge part of the long side of the piezoelectric transducer. The magnitude of the absolute value of strain produced by sinusoidal vibration on the y-axis in FIG. 40 differs according to the position on the y-axis (FIG. 37). In FIG. 37 the absolute value of strain is greatest at a distance of 37 from center point O where the distance from the center point O to the short side is 100, strain decreases from this position at a distance of 37 from the center point O, and strain decreases from this position at a distance of 37 to a distance of 74 from the center point O. This change in strain is the same in both directions, going up and going down, from the center point O as seen in FIG. 37.

In order to increase amplitude and prevent the reinforcing member from interfering with expansion and contraction of the piezoelectric element, it is conceivable to not provide the reinforcing member at the outside edge part of the long side of the piezoelectric transducer. However, if a void is formed over a large part of the outside edge part of the reinforcing member as shown in FIG. 32, unwanted vibration on the z-axis increases as shown in FIG. 34.

The graph in FIG. 40 is calculated from equation (2) below.

$$\varepsilon = \frac{12M_y}{Ebh^3}x \qquad (2)$$

The parameters used in equation (2) are described below with reference to FIG. 37.

My: bending moment received from sinusoidal vibration at a selected distance y along the y-axis from center point O
E: Young's modulus of the piezoelectric transducer
b: thickness of the piezoelectric transducer
h: width of the piezoelectric transducer
x: distance from the widthwise center of the piezoelectric transducer (point O) to a selected point on the x-axis The correctness of the data shown in the graph in FIG. 40 was verified based on a detection signal from a detection electrode disposed to the piezoelectric element.

The position of the detection electrode 105 was changed parallel to the center line C2 through the width of the piezoelectric transducer (FIG. 38), the strain produced at each of these positions was measured based on the detection signal amplitude, and the resulting data exhibited a trend close to equation (2). An AC signal of a frequency close to the sinusoidal resonance frequency was applied to the drive electrode. The relationship between the amount of strain produced by sinusoidal vibration on the x-axis and the distance x from the center of the width of the piezoelectric transducer to a desired point on the x-axis, which is the widthwise direction, can therefore be said to be generally as shown in FIG. 40.

FIG. 41 extracts the vibration behavior of the secondary sinusoidal vibration along the lengthwise center line (see C1 in FIG. 38) of the rectangular piezoelectric transducer. The y-axis in FIG. 41 shows displacement (amplitude) widthwise to the piezoelectric transducer, and has a maximum value of 100. The x-axis in FIG. 41 shows the distance from the lengthwise center (point O) of the piezoelectric transducer (see FIG. 37) to a desired point on the y-axis, which is the long axis, and has a maximum value of 100. The length of the rectangular piezoelectric transducer in the example shown in FIG. 41 is 3.5 mm and the width is 1.0 mm (a reinforcing member and piezoelectric element of the same length and width dimensions was used in FIG. 36 to FIG. 38 and FIG. 40).

As shown in FIG. 41, if the distance from the lengthwise center (point O) of the piezoelectric transducer to the short side is 100%, there is a point P at a distance of approximately 37% where displacement widthwise to the piezoelectric transducer is greatest. The position of this point P is the antinode of sinusoidal vibration.

Because strain is greater at the outside edge area than toward the inside (center) of the width of the piezoelectric transducer as shown in FIG. 40, the strain produced by sinusoidal vibration is greatest in the piezoelectric transducer at the intersections of the outside edge parts (long sides) of the piezoelectric transducer and a line widthwise to the piezoelectric transducer at point P offset 37% of the distance from the planar center to the short side. In other words, these points of intersection are where the strain produced by sinusoidal vibration of the piezoelectric transducer is greatest (the energy density of the sinusoidal vibration is greatest).

Based on verification of the vibration energy density in the piezoelectric transducer, second void parts are formed where strain produced by sinusoidal vibration is greatest, and the openings at these voids can reliably increase the amplitude of sinusoidal vibration. Because amplitude is increased while the part of the reinforcing member where a void is not formed suppresses out-of-plane displacement of the piezoelectric element, the amplitude of sinusoidal vibration in the in-plane direction of the reinforcing member is not attenuated and is reliably increased.

In addition to rendering a first void part containing the location where strain produced by longitudinal vibration is greatest in the mixed mode of longitudinal vibration and sinusoidal vibration, this aspect of the invention also renders a void in the reinforcing member where strain produced by sinusoidal vibration is greatest. This aspect of the invention can therefore increase the amplitude of both longitudinal vibration and sinusoidal vibration, and can also increase the path of elliptical movement. Vibration efficiency can therefore be further improved, and when the piezoelectric transducer is used as an actuator drive efficiency can be further improved and size can be reduced.

In the first piezoelectric transducer of the invention that excites a mixed vibration mode the reinforcing member preferably has a center part in which the first void part is formed, a spine extending through the center part from one end part to the other end part of the piezoelectric element in the direction of longitudinal vibration, and branches formed intersecting the spine, including at least one branch between the one end part of the spine and the center part and at least one branch between the other end part of the spine and the center part. The second void part is formed from an outside edge part of the reinforcing member toward the spine in the regions between the spine and adjacent branches.

In this aspect of the invention the spine works as a support column, the spine, center part, and branches form a skeleton, and this skeleton can desirably suppress out-of-plane displacement of the piezoelectric element. This can further improve vibration efficiency.

When there are numerous branches, the shape of the reinforcing member resembles a fish skeleton.

If the spine extends from one end to the other end of the piezoelectric element or reinforcing member, the spine can be formed in a straight line or an S-shape, for example.

The strain produced by sinusoidal vibration means the percentage of displacement in a prescribed unit length when sinusoidal vibration is produced in the piezoelectric transducer (or the piezoelectric element or reinforcing member). The location of maximum strain in the piezoelectric transducer caused by sinusoidal vibration therefore corresponds to the antinode of sinusoidal vibration and is a place at the outside edge part of the reinforcing member or the piezoelectric element. The node is where amplitude is substantially zero in the piezoelectric transducer, and the antinode is where the piezoelectric transducer oscillates the most and amplitude is greatest (see point P in FIG. 41).

In the first piezoelectric transducer of the invention that excites a mixed vibration mode the reinforcing member preferably has a contour part around the entire perimeter of the piezoelectric element when seen in plan view, and a first void part and a third void part rendered to include a location where strain produced by sinusoidal vibration is substantially greatest are formed inside the contour part.

With this aspect of the invention a void is formed inside the contour part including a part of the location where strain produced by longitudinal vibration is greatest and the location where strain produced by sinusoidal vibration is substantially greatest. The reinforcing member does not contact the piezoelectric element in this void, and impedance of vibration by the reinforcing member can be suppressed.

The amount of strain caused by longitudinal vibration in the piezoelectric transducer is as previously described with reference to FIG. 36, and the amount of strain caused by sinusoidal vibration is as previously described with reference to FIG. 40 and FIG. 41. Because a void is formed inside the contour part including a part of the location where strain produced by longitudinal vibration is greatest and the location where strain produced by sinusoidal vibration is substantially greatest, the amplitude of longitudinal vibration and sinusoidal vibration in the in-plane direction of the reinforcing member can be reliably increased. Because amplitude is increased while the contour part can suppress out-of-plane displacement of the piezoelectric element, the amplitude of longitudinal vibration and sinusoidal vibration is not attenuated and is reliably increased.

The contour part formed in this aspect of the invention also improves the strength of the reinforcing member and can increase in-plane torsion strength.

Furthermore, because there is a contour part around the perimeter of the piezoelectric element, the position of the reinforcing member and the position of the piezoelectric element can be easily aligned when laminating the piezoelectric element and reinforcing member. Productivity is thereby improved and variation of characteristics can be suppressed.

In another aspect of a piezoelectric transducer having the foregoing contour part according to the invention the contour part has a substantially rectangular outside planar shape, the reinforcing member has one or more connecting parts connecting the long side parts of the contour part across (along) the width of the piezoelectric element on both sides of the center line dividing the length of the piezoelectric element in the direction of longitudinal vibration into two equal parts, and the first void part and third void part are formed surrounded by the contour part and the connecting parts.

With this aspect of the invention the long side parts of the contour part are support columns, and the skeleton formed by these long side parts and the connecting parts can desirably suppress out-of-plane displacement of the piezoelectric element. As a result, amplitude can be reliably increased and vibration efficiency can be further improved.

The reinforcing member in this aspect of the invention has a substantially ladder-shaped configuration.

In another aspect of a piezoelectric transducer having the foregoing contour part according to the invention the inside of the contour part of the reinforcing member is a single opening, and this opening combines the first void part and the third void part.

By rendering the first void part and the third void part in a single opening having a large open area, this aspect of the invention significantly prevents impeding displacement of the piezoelectric element.

A piezoelectric transducer according to a second aspect of the invention is a piezoelectric transducer that excites sinusoidal vibration and has a piezoelectric element, a reinforcing member in which a second void part is formed. The reinforcing member is laminated with and affixed to the piezoelectric element, and has a center part, a spine extending through the center part from one end part to the other end part of the piezoelectric element substantially perpendicularly to the direction of sinusoidal vibration, and branches formed intersecting the spine, including at least one branch between the one end part of the spine and the center part and at least one branch between the other end part of the spine and the center part. The second void part is formed from an outside edge part of the reinforcing member toward the spine in the regions between the spine and adjacent branches, and includes a location where strain produced by sinusoidal vibration in the piezoelectric transducer or the reinforcing member or piezoelectric element is greatest.

Because the reinforcing member is removed to leave an opening where strain produced by sinusoidal vibration is greatest in this aspect of the invention, the reinforcing member does not contact the piezoelectric element in the second void part and impedance of vibration by the reinforcing member can thereby be prevented. The amount of strain produced in the piezoelectric transducer by sinusoidal vibration is as already described with reference to FIG. 40 and FIG. 41. The amplitude of in-plane sinusoidal vibration in the reinforcing member can be reliably increased by removing a part of the reinforcing member to form a void where strain produced by sinusoidal vibration is greatest. Because amplitude is increased while the part of the reinforcing member that is not removed to form a void can suppress out-of-plane displacement of the piezoelectric element, the amplitude of sinusoidal vibration is not attenuated and is reliably increased.

The strain produced by sinusoidal vibration means the percentage of displacement in a prescribed unit length when sinusoidal vibration is produced in the piezoelectric transducer (or the piezoelectric element or reinforcing member). The location of maximum strain in the piezoelectric transducer caused by sinusoidal vibration therefore corresponds to the antinode of sinusoidal vibration and is a place at the outside edge part of the reinforcing member. The node is where amplitude is substantially zero in the piezoelectric transducer, and the antinode is where the piezoelectric transducer oscillates the most and amplitude is greatest (see point P in FIG. 41).

FIG. 42 shows an example of an arrangement for driving a driven body by means of a piezoelectric transducer according to the invention that excites primarily sinusoidal vibration. As shown in this figure the piezoelectric transducer 93 is disposed on a normal to a tangent L to the rotor 92, and the rotor 92 is pushed and driven in the direction of the tangent L by movement of the contact prod 931 disposed to the piezoelectric transducer 93 as a contact part. When the piezoelectric transducer 93 is disposed as shown in FIG. 42, the increased amplitude of sinusoidal vibration increases the distance the rotor is driven in each vibration cycle of the contact prod 931. As a result, the drive speed can be improved, torque is increased, and a driven body with a large load can be driven.

The driven body is also not limited to a rotor, and can be driven linearly.

The modulus of elasticity (such as Young's modulus) of the vibrating reinforcing member is generally greater than the modulus of elasticity of the piezoelectric element in the piezoelectric transducer according to the invention. In order to improve the vibration characteristic of the reinforcing member in this case the area of contact between the reinforcing member and the piezoelectric element is preferably less than the area of the piezoelectric element when the first void part or second void part is formed in the reinforcing member. The invention can thus render the rigidity of the reinforcing member close to the rigidity of the piezoelectric element.

Further preferably, the planar surfaces of the main part and the support units of the reinforcing member do not overlap. The first void part therefore will not overlap the support units, and movement of the main part of the reinforcing member will not be impeded.

When the outside profile of the reinforcing member is left as the contour part, the shape (such as rectangular) of the piezoelectric element is preferably the same as the outside profile (such as rectangular) of the reinforcing member before voids are formed. As a result, when the reinforcing member with voids and the piezoelectric element are put together, the reinforcing member and the piezoelectric element can be easily and accurately aligned with each other, and variation in the vibration characteristic of the piezoelectric element can be suppressed.

In the piezoelectric transducer according to another aspect of the invention the outside planar shape of the reinforcing member before the void parts are formed is substantially rectangular, and at least one of the void parts is formed line symmetrically to the center line dividing the width of the reinforcing member into two equal parts.

This aspect of the invention enables exerting the constraint of the reinforcing member on out-of-plane displacement of the piezoelectric element line symmetrically on both sides of the center line. As a result, when the vibration behavior of the piezoelectric element is switched line symmetrically to the center line, the vibration characteristic is the same on both sides of the center line. The drive characteristic is therefore the same whether vibration of the piezoelectric transducer is transferred to drive the driven body in one direction or the opposite direction.

Note that "void part" generally refers here and below to the first void part, second void part, and third void part.

In a piezoelectric transducer according to another aspect of the invention a member made from a material with a lower modulus of elasticity than the material of the reinforcing member is disposed in at least one void part.

This aspect of the invention disposes a member that is separate from the reinforcing member and has a low modulus of elasticity in the first void part, second void part, or third void part, thereby assuring the strength of the reinforcing member and enabling increasing vibration amplitude without interfering with the in-plane displacement of the piezoelectric element.

If, for example, the reinforcing member is steel or other metal, the member with a lower modulus of elasticity (such as a low Young's modulus) than the reinforcing member can be made from a material such as plastic or solder.

In a piezoelectric transducer according to another aspect of the invention the reinforcing member has a contact part that contacts a driven body to drive the driven body, and the first void part is formed to include a location where strain produced by longitudinal vibration is greatest or substantially greatest when the piezoelectric transducer is affected by the reaction of the driven body.

In a piezoelectric transducer according to another aspect of the invention the second void part and/or the third void part is formed to include a location where strain produced by sinusoidal vibration is greatest or substantially greatest when the piezoelectric transducer is affected by the reaction of the driven body.

The piezoelectric transducer in these aspects of the invention is used as an actuator for driving a driven body. By forming the first void part or the second void part or the third void part to include a location where strain produced by longitudinal vibration is greatest or substantially greatest, or to include a location where strain produced by sinusoidal vibration is greatest or substantially greatest, when the piezoelectric transducer is affected by the reaction of the driven body, the piezoelectric transducer can precisely track the vibration behavior of the piezoelectric element when used as an actuator. More specifically, even if the vibration characteristic of the piezoelectric transducer differs slightly from the vibration characteristic when the piezoelectric transducer vibrates alone due to the reaction of the driven body when the piezoelectric actuator operates, the reinforcing member can limit out-of-plane displacement of the piezoelectric element, reliably increase amplitude, and achieve a good vibration characteristic.

The contact part (prod) can be rendered unimorphously to or separately from the reinforcing member.

Another aspect of the invention is a piezoelectric actuator that has the piezoelectric transducer described herein and a driven body that is driven by the transfer of vibration from the piezoelectric transducer.

This aspect of the invention has the piezoelectric transducer described above and therefore affords the same action and effect.

Another aspect of the invention is a portable device having the piezoelectric actuator described above.

This aspect of the invention has the piezoelectric transducer described above and therefore affords the same action and effect.

Examples of such a portable device include wristwatches, pocket watches, digital cameras, digital video camcorders and players, portable printers, portable information devices, and cell phones.

A portable device according to another aspect of the invention is timepiece having a timekeeping unit, and a time information display unit that displays information kept by the timekeeping unit and is driven by the driven body.

In this aspect of the invention the piezoelectric transducer operates as an actuator to drive wheels, for example, to display time information such as the current time or date. Because the piezoelectric transducer of the invention can greatly increase the vibration amplitude, thick parts with a heavy load can be driven, a fast-travelling second hand, for example, can be driven continuously, or a flyback hand can be quickly reset to zero.

In addition, because amplitude is increased and drive efficiency is improved with the same input power, the applied voltage can be reduced and a small, thin battery with low battery capacity can be used. As a result, the size and thickness of the timepiece can be further reduced.

A portable device according to the invention also realizes the benefits of a piezoelectric actuator, including quick response and not being affected by magnetism.

The invention thus greatly improves drive efficiency.

Other objects and attainments together with a fuller understanding of the invention will become apparent and appreciated by referring to the following description and claims taken in conjunction with the accompanying drawings.

DESCRIPTION OF EMBODIMENTS

Figure 1:
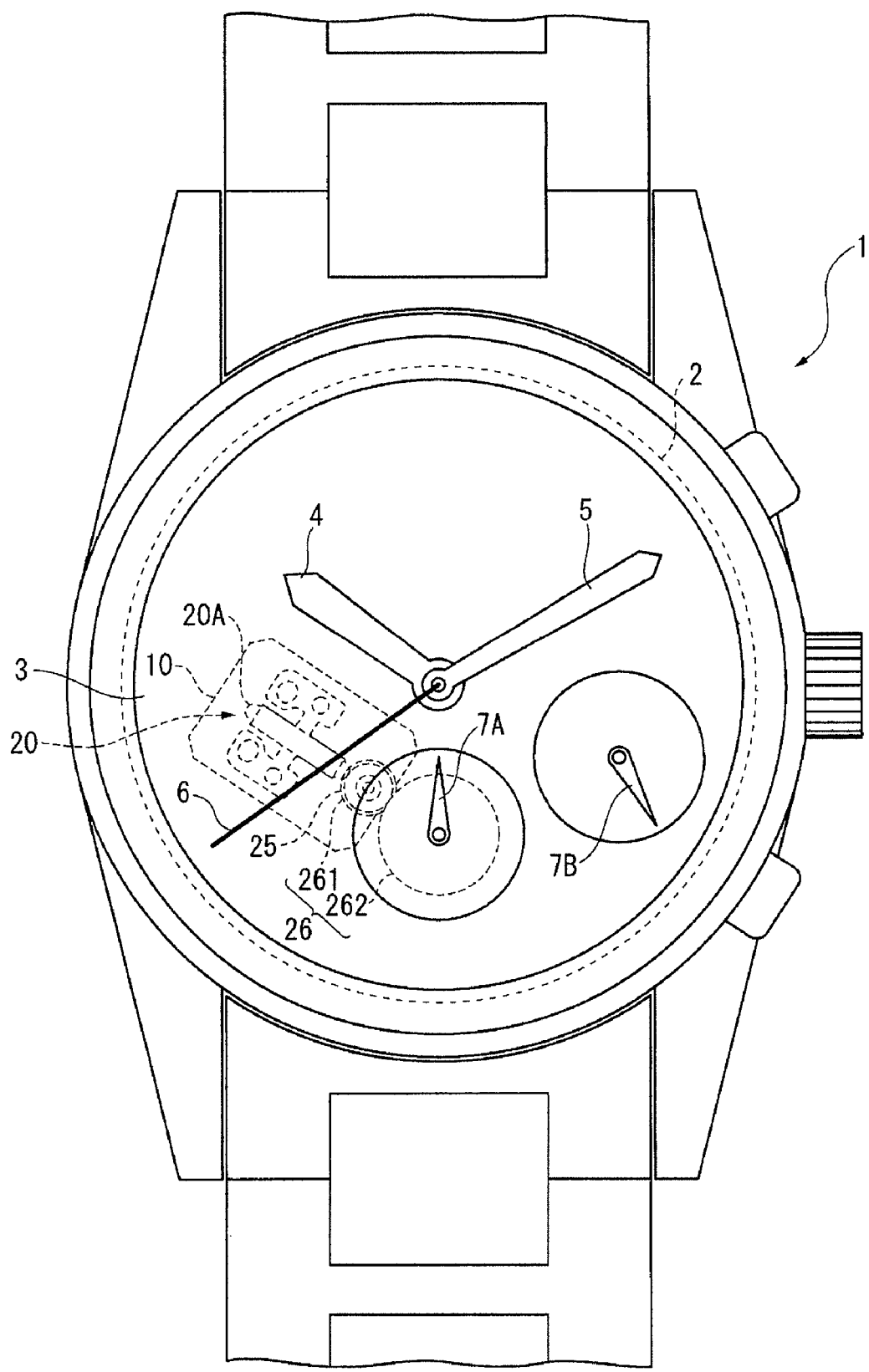
FIG. 1 shows a wristwatch according to a first embodiment of the invention.

Preferred embodiments of the present invention are described below with reference to the accompanying figures. Note that like parts are identified by the same reference numerals used in the first embodiment, and further detailed description thereof is omitted or simplified in the second and other embodiments.

Embodiment 1

This embodiment of the invention uses a wristwatch with a chronograph as an example of a portable device. This embodiment of the invention enables increasing the amplitude of longitudinal vibration, and can thereby also increase the amplitude of sinusoidal vibration.

1. General Configuration

FIG. 1 is a plan view of a timepiece 1 according to this embodiment of the invention. This timepiece 1 has a movement 2, a dial 3, an hour hand 4, a minute hand 5, and a second hand 6 for displaying the time, and chronograph second hand 7A and chronograph minute hand 7B for showing the chronograph time.

The hour hand 4, minute hand 5, and second hand 6 are the same as in a conventional quartz watch, and are driven by a circuit board having a crystal oscillator, a stepping motor having a coil, stator, and rotor, a drive wheel train, and a battery.

2. Chronograph Second Hand Drive Mechanism

The drive mechanism that drives the chronograph second hand 7A includes a piezoelectric transducer 20A, a rotor 25, and a speed-reducing wheel train 26. The rotor 25 is the driven body that is driven rotationally by the piezoelectric transducer 20A. The speed-reducing wheel train 26 transfers while reducing the speed of rotor 25 rotation. The piezoelectric transducer 20A and rotor 25 render a piezoelectric actuator 20.

The speed-reducing wheel train 26 includes wheels 261 and 262. The one wheel 261 is disposed coaxially to and rotates in unison with the rotor 25. The other wheel 262 meshes with the first wheel 261 and is fixed to the rotary shaft of the chronograph second hand 7A.

Figure 2:
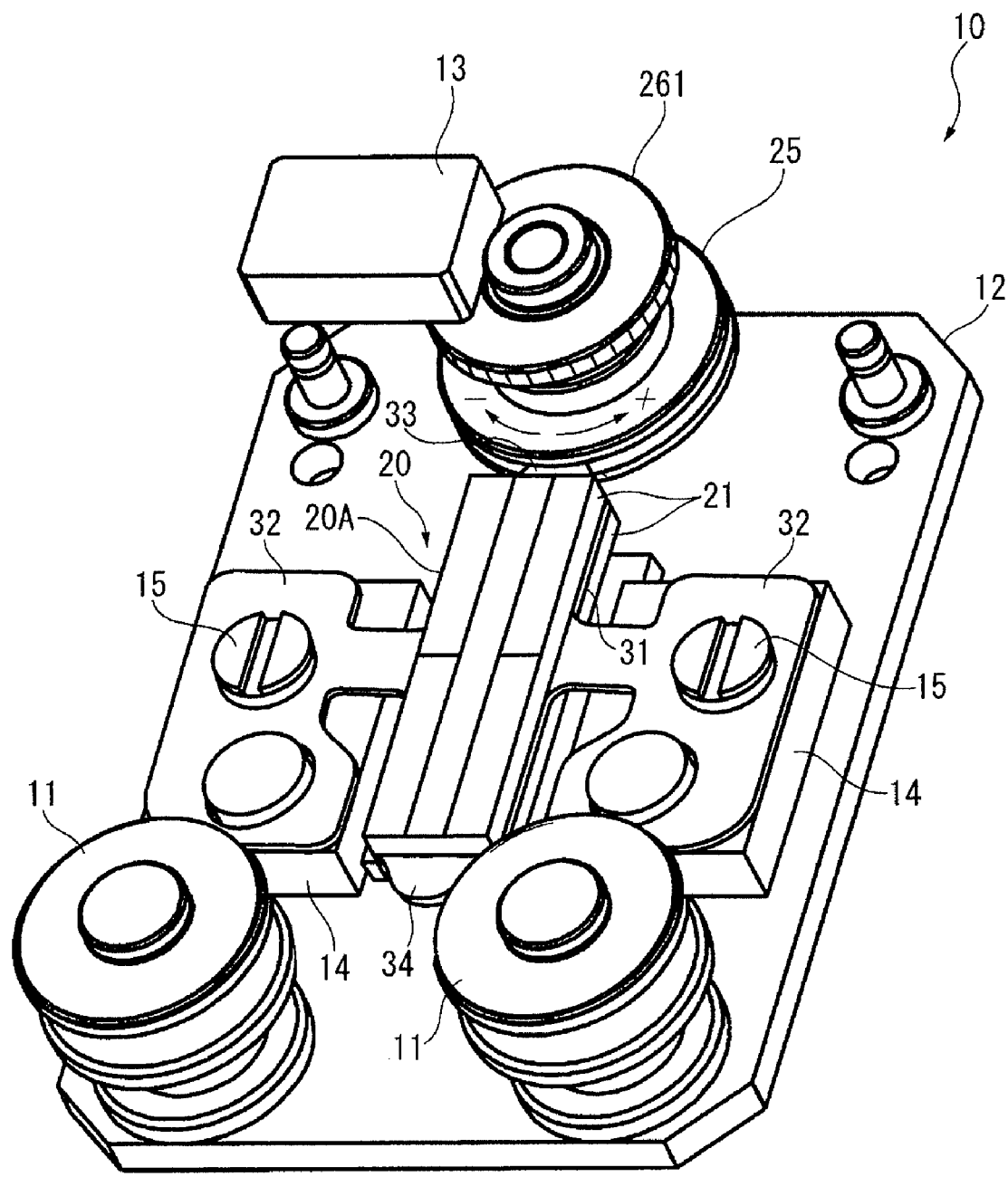
FIG. 2 is an oblique view of the piezoelectric actuator unit according to the first embodiment of the invention.

The piezoelectric actuator 20, the rotor 25, and the wheel 261 are rendered as a piezoelectric actuator unit 10 as shown in FIG. 2.

3. Piezoelectric Actuator Unit

The piezoelectric actuator unit 10 shown in FIG. 2 includes a support plate 12 that is fixed, for example, to the main plate of the timepiece 1 by screws or other affixing member 11, the piezoelectric actuator 20A affixed to the support plate 12, and the rotor 25 and wheel 261 disposed freely rotatably on the support plate 12. The piezoelectric actuator 20 in this embodiment of the invention includes the piezoelectric transducer 20A and the rotor 25. Rotation (the rotational position) of wheel 261 is detected by a rotation sensor 13 disposed above the wheel 261.

A base member 14 to which the piezoelectric actuator 20 is attached is fixed to the support plate 12.

4. Piezoelectric Actuator

Figure 3:
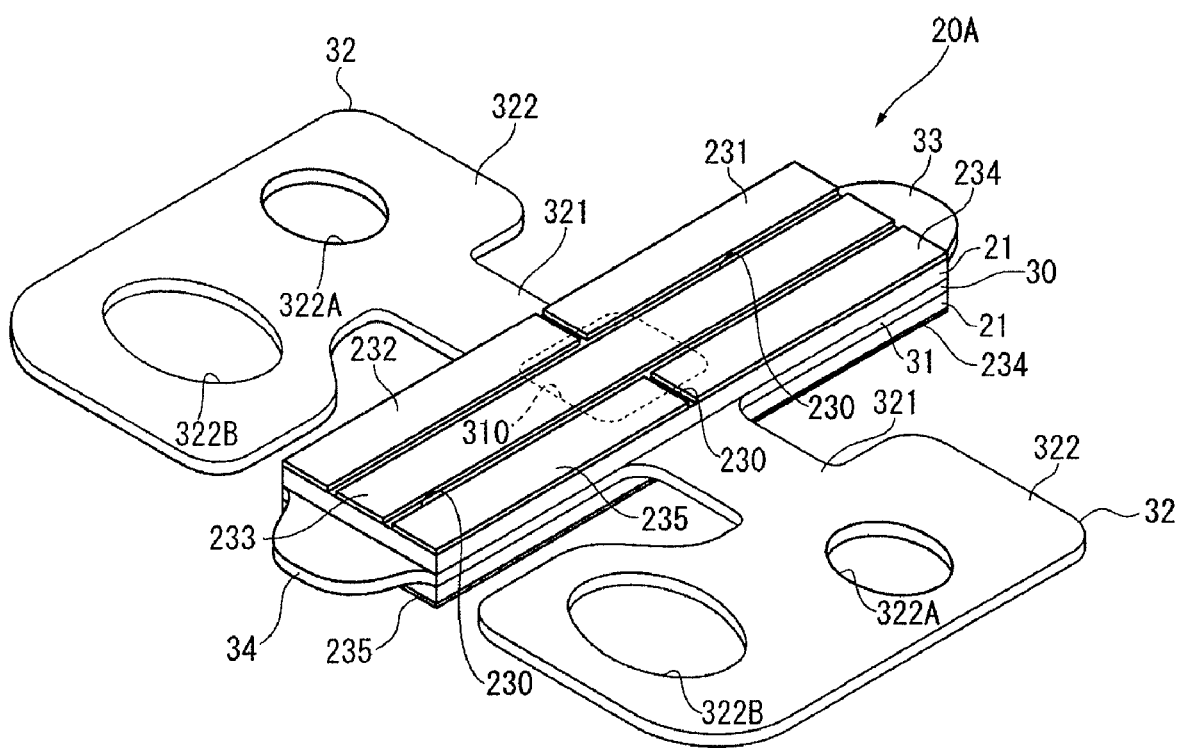
FIG. 3 is an oblique view of the piezoelectric transducer according to the first embodiment of the invention.

FIG. 3 shows the piezoelectric transducer 20A of the piezoelectric actuator 20. The overall shape of the piezoelectric transducer 20A is substantially rectangular.

The piezoelectric transducer 20A has two rectangular piezoelectric elements 21, and a reinforcing member 30 made of stainless steel, for example. The piezoelectric elements 21 are bonded to the front and back sides of the reinforcing member 30 in a layered arrangement to render the piezoelectric transducer 20A.

4-1 Piezoelectric Elements

The piezoelectric elements are made from lead zirconate titanate (PZT(R)) in this embodiment of the invention, but quartz, lithium niobate, barium titanate, lead titanate, lead metaniobate, polyvinylidene fluoride, lead zinc niobate, or lead scandium niobate, for example, could also be used.

An electrode surface is formed on the surface of each piezoelectric element 22 by plating, sputtering, vapor deposition, or other method. The electrode surface is segmented by channels 230 formed by etching, for example, thus rendering five electrodes 231 to 235 on the surface of each piezoelectric element 21. These electrodes 231 to 235 are identically positioned on each piezoelectric element 21 so that, for example, an electrode 235 is formed on the surface of the back piezoelectric element 21 on the back of the piezoelectric transducer 20A at the same position as the electrode 235 formed on the front piezoelectric element 21 on the front of the piezoelectric transducer 20A as shown in FIG. 3. In other words, the electrodes of the front piezoelectric element 21 and the back piezoelectric element 21 occupy the same space when seen in plan view.

The opposite side of the front and back piezoelectric elements 21 as the side on which the electrodes 231 to 235 are formed conductively contacts the reinforcing member 30. The reinforcing member 30 thus functions as an electrode of each piezoelectric element 21.

Alternatively, an electrode can be formed over the entire surface of each piezoelectric element 21 that contacts the reinforcing member 30, in which case this electrode and the reinforcing member 30 are electrically conductive.

The dimensions of the piezoelectric element 21 are set so that the width to length ratio is 2:7, and in this embodiment of the invention the width is 1 mm and the length is 3.5 mm.

4-2 Reinforcing Member

Figure 4:
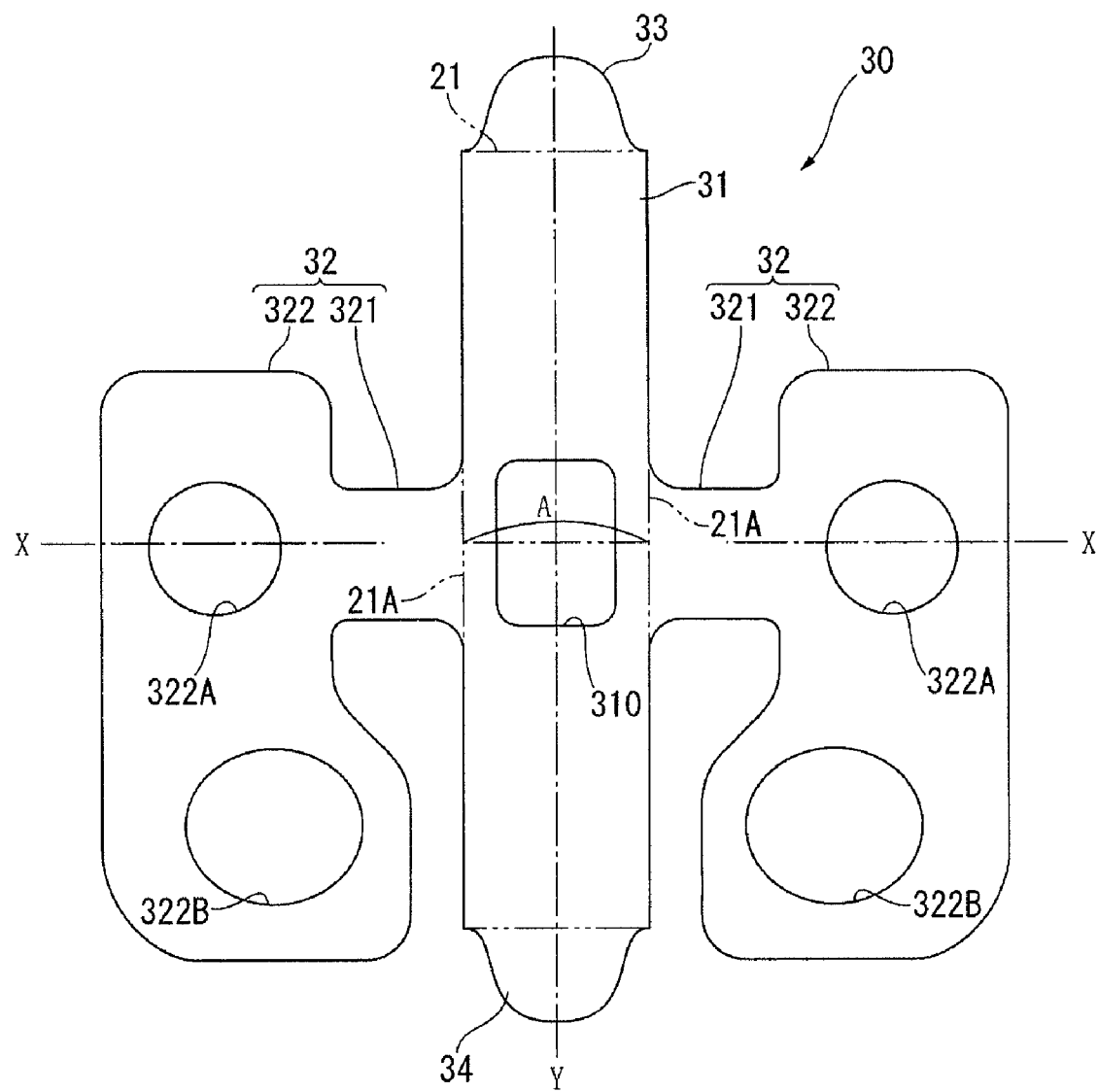
FIG. 4 is a plan view of the reinforcing member according to the first embodiment of the invention.

FIG. 4 is a plan view showing the shape of the reinforcing member 30 of the piezoelectric transducer 20A. The reinforcing member 30 has rectangular reinforcing plate 31, a pair of support units 32, a protruding contact prod 33, and an opposing protrusion 34. The piezoelectric elements 21 are laminated to the front and back sides of the reinforcing plate 31. The support units 32 are connected to the opposite long sides of the reinforcing plate 31. The protruding contact prod 33 is contiguous to a short side of the reinforcing plate 31, and the other protrusion 34 is disposed to balance the vibration of the contact prod 33.

The reinforcing member 30 in this embodiment of the invention is made from stainless steel, an electrically conductive, non-magnetic material, but the reinforcing member 30 is not so limited. More specifically, non-magnetic materials that can be used for the reinforcing member include, for example, austenitic stainless steel, aluminum, aluminum alloys, copper, copper alloys, and other metals, polyimide and other plastics, or various ceramic materials. Rendering the reinforcing member from metal or other electrically conductive material is advantageous because the reinforcing member can be used as an electrode for the piezoelectric element and it is therefore not necessary to form a separate electrode on the piezoelectric elements that are laminated with the reinforcing member. In addition, if a non-magnetic material is used for the reinforcing member, magnetic fields outside the timepiece and magnetic fields produced by the stepping motor used inside the timepiece will not affect the operation of the piezoelectric actuator 20. While the piezoelectric actuator is more resistant to magnetic field effects than a stepping motor, using a non-magnetic material for the reinforcing member makes the piezoelectric actuator even more resistant to magnetic field effects. Note that a magnetic material can be used for the reinforcing member.

The length and width of the reinforcing plate 31 are the same as the length and width of the piezoelectric elements 21, and a through-hole 310 is formed as a first void part in the center of the surface of the reinforcing plate 31. The contact area of the reinforcing plate 31, which is the part that vibrates in conjunction with vibration of the piezoelectric elements 21, to the piezoelectric element 21 is therefore less than the area of the piezoelectric element 21, and the vibration characteristic of the piezoelectric transducer 20A can thereby be improved.

The reinforcing plate 31 and the support units 32 are formed so that they do not overlap in plan view. The support units 32 are therefore not present in the through-hole 310 and the support units 32 do not interfere with reinforcing plate 31 movement.

The piezoelectric elements 21 are bonded by an epoxy adhesive to the parts of the reinforcing plate 31 other than the through-hole 310.

The through-hole 310 is formed line-symmetrically to the center line Y dividing the width of the piezoelectric element 21 into two equal parts.

Each of the support units 32 has a connecting part 321 that is connected to the reinforcing plate 31, and a mounting part 322 that is fastened to the base member 14 by a screw 15 (FIG. 2). The support units 32 protrude from the outside edges of the piezoelectric element 21 and support the piezoelectric element 21 from the sides instead of from above or below. A set screw hole 322A through which a screw 15 passes and a positioning hole 322B are formed in each mounting part 322.

The connecting parts 321 can be formed with a narrow width in order to impart spring force to the reinforcing plate 31. This spring force elastically presses the contact prod 33 to the rotor 25 so that exciting the piezoelectric actuator 20 drives the rotor 25 rotationally. The method of imparting this spring force is not limited to this construction and any other method can be used instead.

The connecting parts 321 of the support units 32 are disposed on opposite sides of the width of the piezoelectric elements 21 on line X-X passing through the node (line segment A) of the longitudinal vibration excited by the piezoelectric transducer 20A. Line segment A is a line segment that passes through the center of the piezoelectric element 21 surface, is perpendicular to the length of the piezoelectric element 21, and has end points at the outside edges 21A of the piezoelectric element 21.

The relative distance of the contact prod 33 to the rotor 25 is set so that the contact prod 33 contacts the outside surface of the rotor 25 (FIG. 2) with a prescribed force, thereby producing sufficient friction between the contact prod 33 and the side of the rotor 25 to transfer the vibration of the piezoelectric transducer 20A to the rotor 25.

The protrusion 34 formed on the end of the reinforcing plate 31 that does not contact the rotor 25 is the same shape and mass as the contact prod 33 and thus functions as a counterweight to the contact prod 33.

5. Electrical Arrangement of the Piezoelectric Transducer

Figure 5:
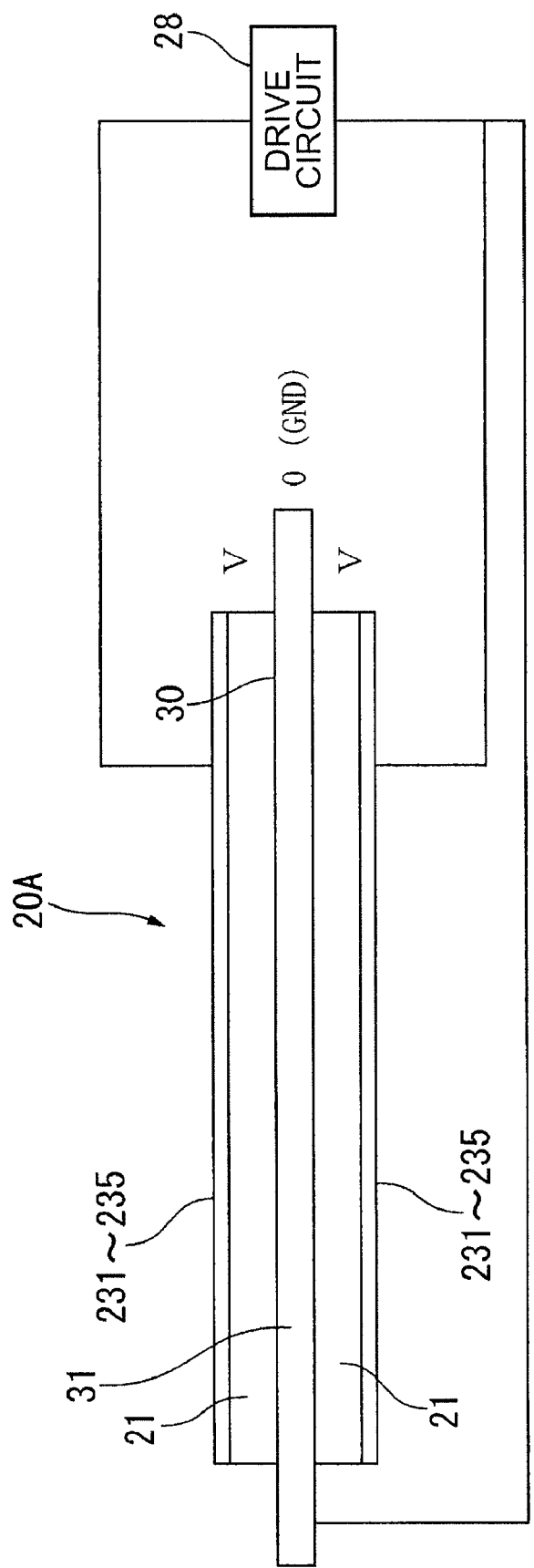
FIG. 5 shows the electrical connections of the piezoelectric transducer according to the first embodiment of the invention.

FIG. 5 shows the electrical connections of the piezoelectric transducer 20A. A wiring layer not shown is disposed to the piezoelectric transducer 20A, and the electrodes 231 to 235 disposed to the piezoelectric element 21 and the reinforcing member 30 are connected to the drive circuit 28 through this wiring layer.

The reinforcing member 30 goes to ground as the common electrode of the piezoelectric elements 21, and the drive circuit 28 applies an AC voltage between the reinforcing member 30 and the electrodes 231 to 235 of one piezoelectric element 21 and between the reinforcing member 30 and the electrodes 231 to 235 of the other piezoelectric element 21. While the electrodes 231 to 235 are used selectively as described below, the same potential is applied simultaneously to matching electrode pairs, that is, to electrodes 231 and 231, electrodes 232 and 232, electrodes 233 and 233, electrodes 234 and 234, and electrodes 235 and 235.

The drive circuit 28 applies a single-phase drive voltage to the piezoelectric transducer 20A.

The frequency of the drive voltage (the drive frequency) is determined with consideration for the resonance point of the longitudinal vibration and the resonance point of the sinusoidal vibration of the piezoelectric transducer 20A.

Figure 6:
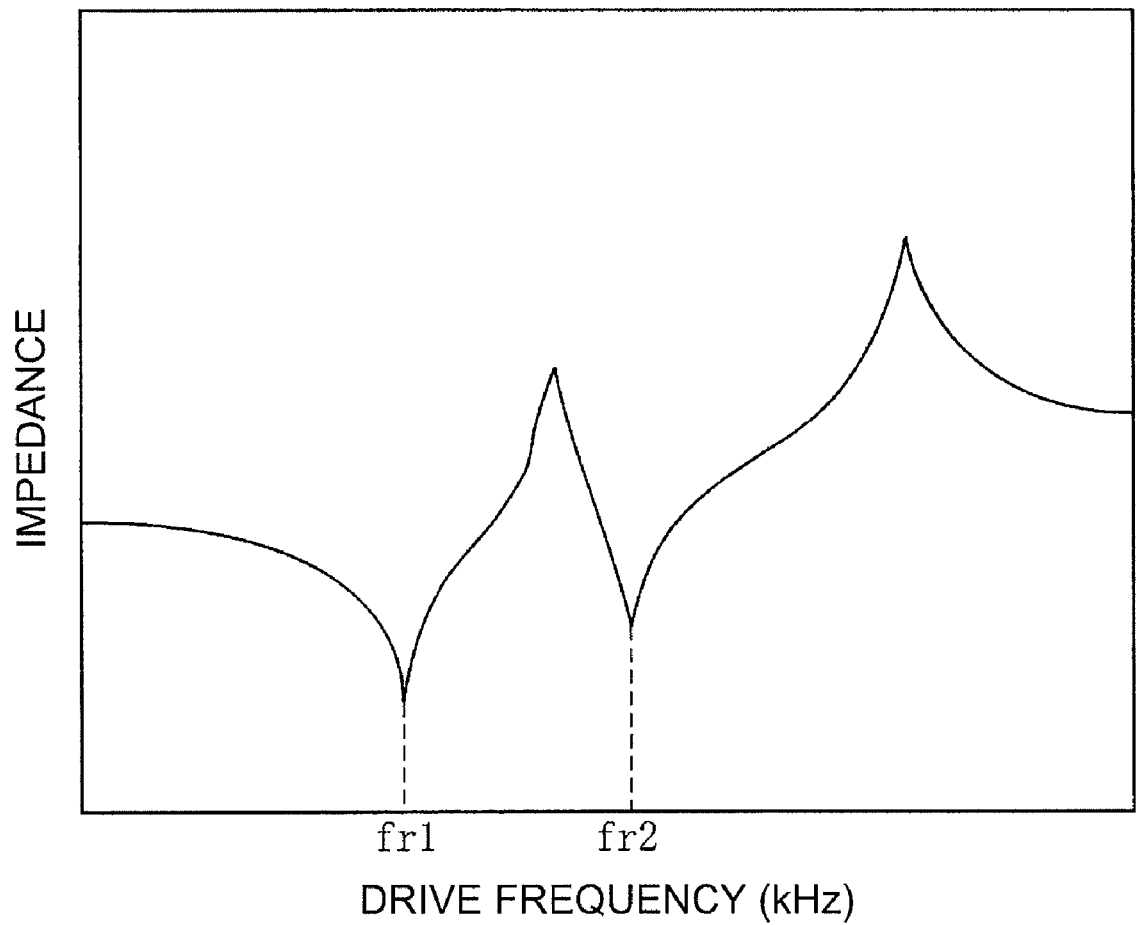
FIG. 6 is a graph showing the relationship between drive frequency and impedance in the piezoelectric transducer according to the first embodiment of the invention.

FIG. 6 shows the relationship between the drive frequency and impedance of the piezoelectric transducer 20A. As shown in FIG. 6 there are two resonance points where impedance to the drive frequency is minimal and the amplitude is greatest. The resonance point of the lower frequency is the resonance point of longitudinal vibration, and the point at the higher frequency is the resonance point of sinusoidal vibration.

More specifically, if the piezoelectric transducer 20A is driven between the longitudinal resonance frequency fr1 of the longitudinal vibration and the sinusoidal resonance frequency fr2 of sinusoidal vibration, sufficient amplitude is assured for both longitudinal vibration and sinusoidal vibration, and the piezoelectric actuator 20 drives with high efficiency. Note that a drive frequency that increases the amplitude of both longitudinal vibration and sinusoidal vibration can be set if the longitudinal resonance frequency fr1 and the sinusoidal resonance frequency fr2 are closer together.

6. Operation of the Piezoelectric Transducer

Figure 7:
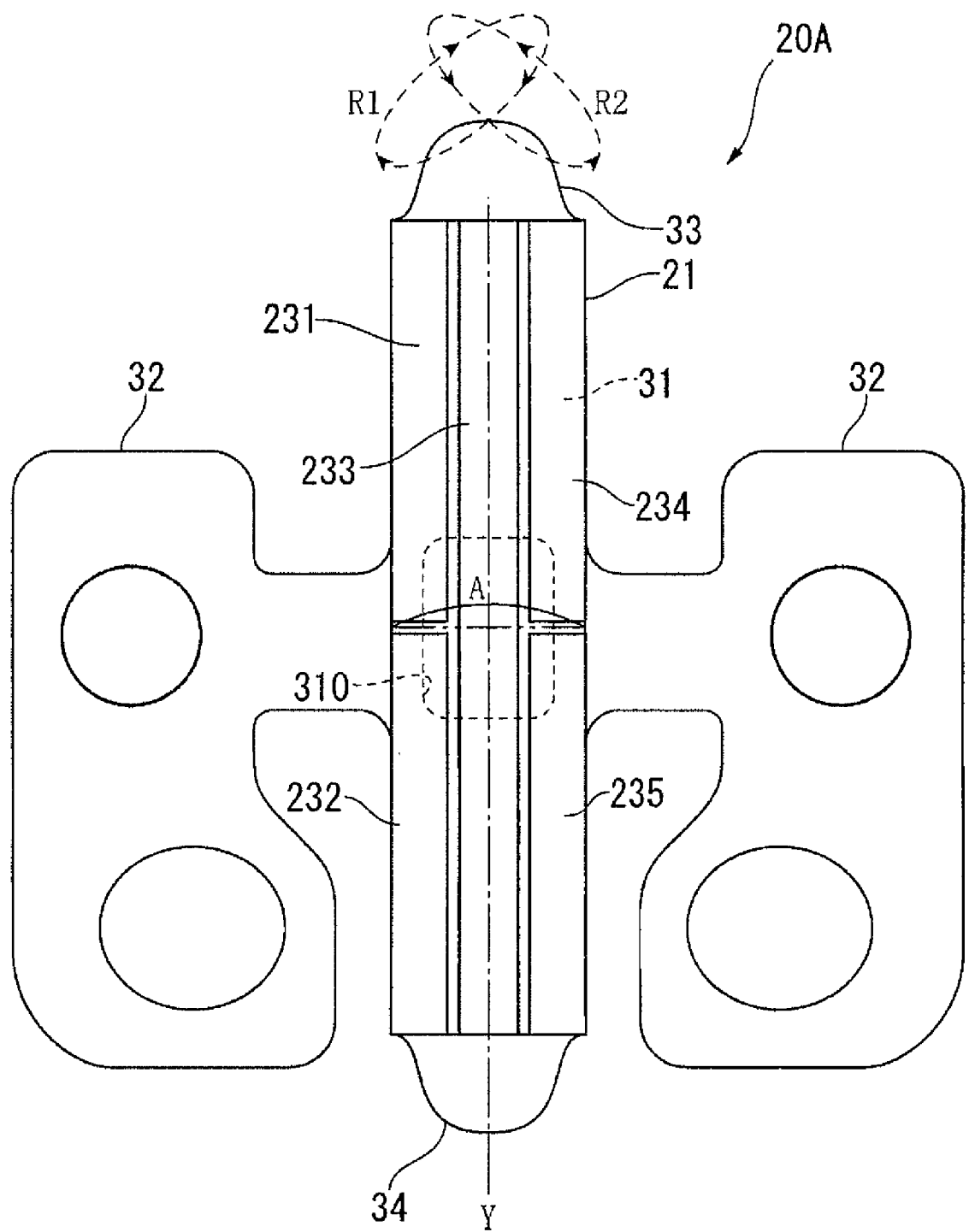
FIG. 7 describes the operation of the piezoelectric transducer according to the first embodiment of the invention.

FIG. 7 shows the vibration behavior of the piezoelectric transducer 20A. Potential is selectively applied to the electrodes 231 to 235 of the piezoelectric element 21 in this embodiment of the invention.

If potential is applied to the electrode 233 disposed lengthwise through the center of the piezoelectric element 21 surface, and to the electrodes 231 and 235 located point symmetrically to the center of the piezoelectric element 21 surface, expansion and contraction of the piezoelectric element 21 caused by applying voltage to the parts where these electrodes 231, 233, and 235 are disposed excites a primary longitudinal vibration along the length of the piezoelectric transducer 20A, and the moment produced by an imbalance in the expanding and contracting parts of the piezoelectric element 21 induces a secondary sinusoidal vibration widthwise to the piezoelectric element 21. This causes the piezoelectric transducer 20A to vibrate in a mixed mode combining longitudinal vibration and sinusoidal vibration, the longitudinal vibration and sinusoidal vibration travel in the in-plane direction of the reinforcing member 30 as a result of the piezoelectric elements 21 being held by the reinforcing plate 31 layered with the piezoelectric elements 21.

Figure 36:
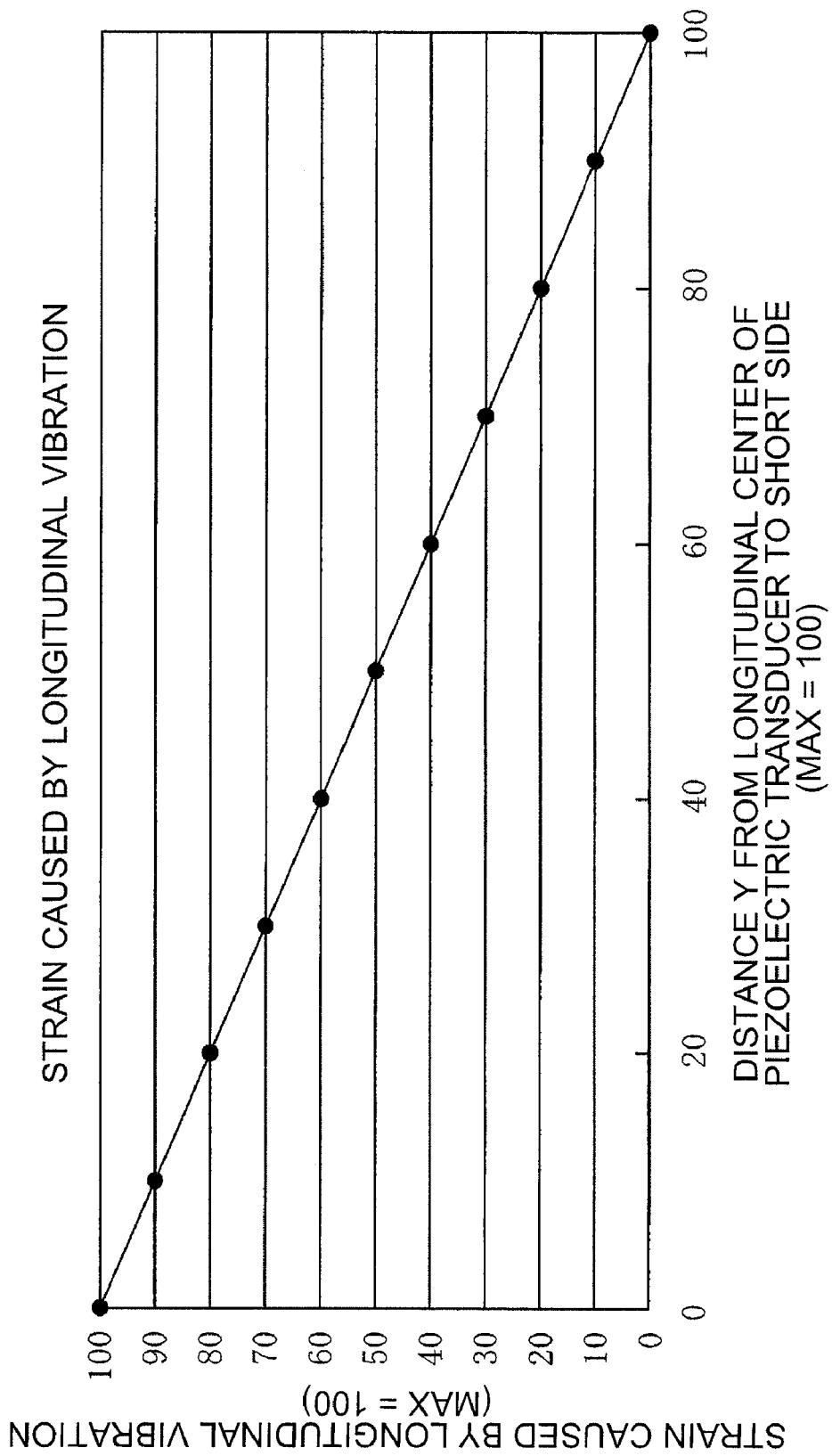
FIG. 36 shows the amount of strain produced by longitudinal vibration.

As already shown in the graph in FIG. 36, the node of longitudinal vibration (denoted by A in FIG. 7) is the same place where the strain produced in the piezoelectric transducer 20A by longitudinal vibration is greatest (where the vibration energy density of the longitudinal vibration is greatest), and the through-hole 310 is formed in the reinforcing plate 31 to include the center of this longitudinal vibration node (the center of the surface of the piezoelectric transducer 20A in this embodiment of the invention). In other words, the center of where strain produced by the longitudinal vibration is greatest is inside the through-hole 310.

The reinforcing plate 31 and piezoelectric elements 21 do not touch in the through-hole 310 including the portion of the line segment A where the longitudinal vibration produces maximum strain, the piezoelectric elements 21 can therefore expand and contract freely, and the amplitude resulting from the maximum vibration energy produced by contraction and expansion of the piezoelectric elements 21 can be increased.

In addition, because the piezoelectric element 21 is held to the surface of the reinforcing plate 31 outside of the through-hole 310 and out-of-plane displacement of the piezoelectric element 21 is thereby limited, the amplitude of the piezoelectric transducer 20A is not attenuated and the amplitude of longitudinal vibration of the piezoelectric transducer 20A can be substantially maximized. Note that the amplitude of longitudinal vibration is greatest at the short side parts of the piezoelectric transducer 20A.

Furthermore, by thus maximizing the amplitude of longitudinal vibration, the amplitude of sinusoidal vibration induced by the longitudinal vibration is also increased.

The through-hole 310 is open in the lengthwise direction of the piezoelectric element 21 from a position on line segment A where the strain produced by longitudinal vibration is greatest to a position 1/20th (or 5%) of the length of the piezoelectric element 21. Part of the location where strain produced by longitudinal vibration is greatest is therefore inside the through-hole 310 even if the vibration energy density distribution of the piezoelectric transducer 20A is offset farther from the rotor 25 due to the reaction of the rotor 25 contacted by the contact prod 33 than when the piezoelectric transducer 20A vibrates alone.

A specific phase difference between this longitudinal vibration and the sinusoidal vibration, which is a secondary vibration, causes the piezoelectric transducer 20A to excite an elliptical vibration. As a result, the contact prod 33 of the piezoelectric transducer 20A traces an elliptical path R1 that is inclined to the center line Y along the length of the piezoelectric element 21. The rotor 25 (FIG. 2) is pressed tangentially to the contact prod 33 and caused to rotate forward by the elliptical movement of the contact prod 33.

When a potential is applied to the center electrode 233 and the point symmetrical electrodes 232 and 234, voltage is applied to the areas that are line symmetrical to the areas to which voltage was applied to the piezoelectric element 21 above. As a result, the path of the contact prod 33 is an elliptical path R2 that is line symmetrical to path R1, and the rotor 25 rotates in reverse (FIG. 2).

When the rotor 25 turns, the wheel 261 rendered in unison with the rotor 25 also turns, wheel 262 turns as wheel 261 turns, and the chronograph second hand 7A (FIG. 1) is driven forward or reverse.

Drive can alternatively be controlled by detecting vibration of the piezoelectric transducer 20A. In this case a voltage signal indicating the vibration state of the piezoelectric transducer 20A is detected through the electrodes 232, 234 to which the drive voltage is not applied when the rotor 25 is driven forward, and a voltage signal indicating the vibration state of the piezoelectric transducer 20A is detected through the electrodes 231, 235 to which the drive voltage is not applied when the rotor 25 is driven in reverse. The drive frequency or drive pulse width can then be controlled based on the detected voltage signal.

7. Effect (1) A through-hole 310 covering a portion of the line segment A where the strain produced by longitudinal vibration is greatest is formed in the reinforcing plate 31 of a piezoelectric actuator 20 that operates using a battery in a timepiece 1 as the power source as a result of verifying the vibration energy density of the piezoelectric transducer 20A as shown in FIG. 36. The amplitude of longitudinal vibration is thus reliably increased because the portions of the reinforcing plate 31 other than the through-hole 310 limit out-of-plane displacement of the piezoelectric elements 21 while the piezoelectric elements 21 can achieve maximum vibration energy and increase vibration amplitude in the through-hole 310.

This arrangement enables driving heavier loads (such as the rotor 25, wheels 261 and 262, and chronograph second hand 7A) or driving a driven body at high speed using the same input power so that, for example, a second hand, such as a chronograph second hand 7A that is driven at a relatively high speed, can be driven.

The invention can therefore also drive a driven body of a specific load using less input power, thereby enabling reducing battery capacity and thus facilitating reducing the size and thickness of the timepiece 1.

(2) Because the amplitude of sinusoidal vibration induced by longitudinal vibration is also increased as a result of increasing the amplitude of longitudinal vibration as described in (1) above, the path of the elliptical vibration of the piezoelectric transducer 20A in the mixed mode combining longitudinal vibration and sinusoidal vibration can be increased and vibration efficiency can be further improved. This enables driving a driven body with an even higher load, or driving the driven body at an even higher speed.

(3) The force of the reinforcing plate 31 limiting out-of-plane displacement of the piezoelectric element 21 can be exerted line symmetrically on both sides of center line Y because the through-hole 310 formed in the reinforcing plate 31 is rendered line symmetrically to the lengthwise center line Y of the piezoelectric element 21. As a result, the vibration characteristic when the contact prod 33 travels on elliptical path R1 and the vibration characteristic when travelling on elliptical path R2 are equal, and drive performance is the same whether the rotor 25 is driven in the forward or reverse direction.

(4) The size, position, and shape of the through-hole 310 formed in the reinforcing plate 31 are determined to allow for the reaction of the rotor 25 when the contact prod 33 contacts the rotor 25, and can therefore be adjusted according to the displacement behavior of the piezoelectric element 21 when the piezoelectric actuator 20 is operating. More specifically, even if the reaction of the rotor 25 when the piezoelectric actuator 20 is operating causes the vibration characteristic of the piezoelectric transducer 20A to differ slightly from the vibration characteristic when the piezoelectric transducer 20A is driven with no load, amplitude can be reliably increased and a desirable vibration characteristic can be achieved while the reinforcing plate 31 continues to limit out-of-plane displacement of the piezoelectric element 21.

Variation of the First Embodiment

Figure 8:
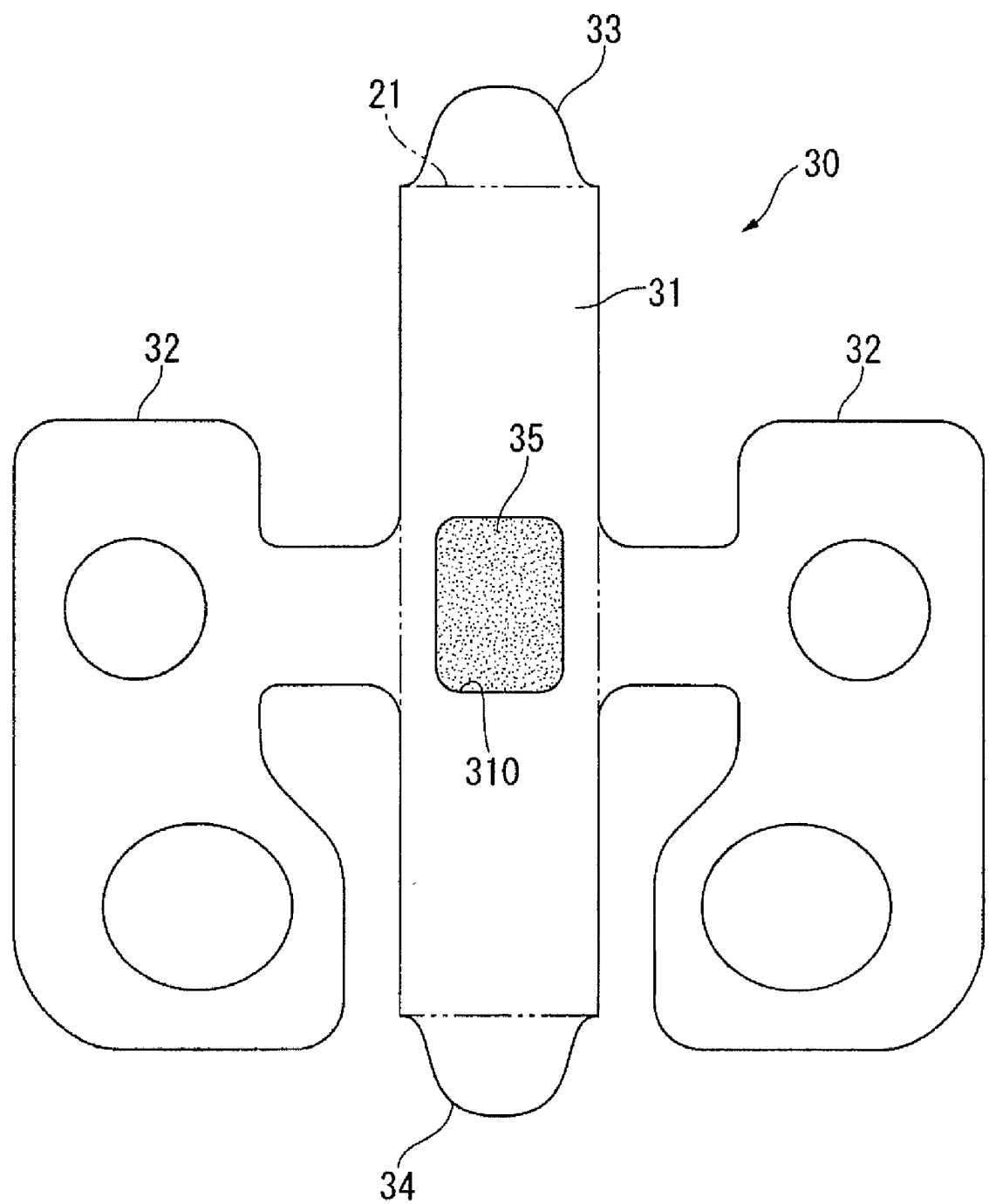
FIG. 8 shows a variation of the first embodiment of the invention.

FIG. 8 shows another aspect of the invention in which a member 35 with a lower modulus of elasticity than the reinforcing member 30 is disposed and fixed (by bonding, for example) in the space inside the through-hole 310 of the reinforcing plate 31. This member 35 is formed from resin or solder, for example, exerts substantially no resistance to the expansion and contraction of the piezoelectric element 21 because of its low modulus of elasticity, and affords the same effect as the first embodiment in which the inside of the through-hole 310 is empty (FIG. 4).

The strength of the reinforcing plate 31 can also be improved by rendering a member 35 separate from the reinforcing plate in the through-hole 310.

Figure 9:
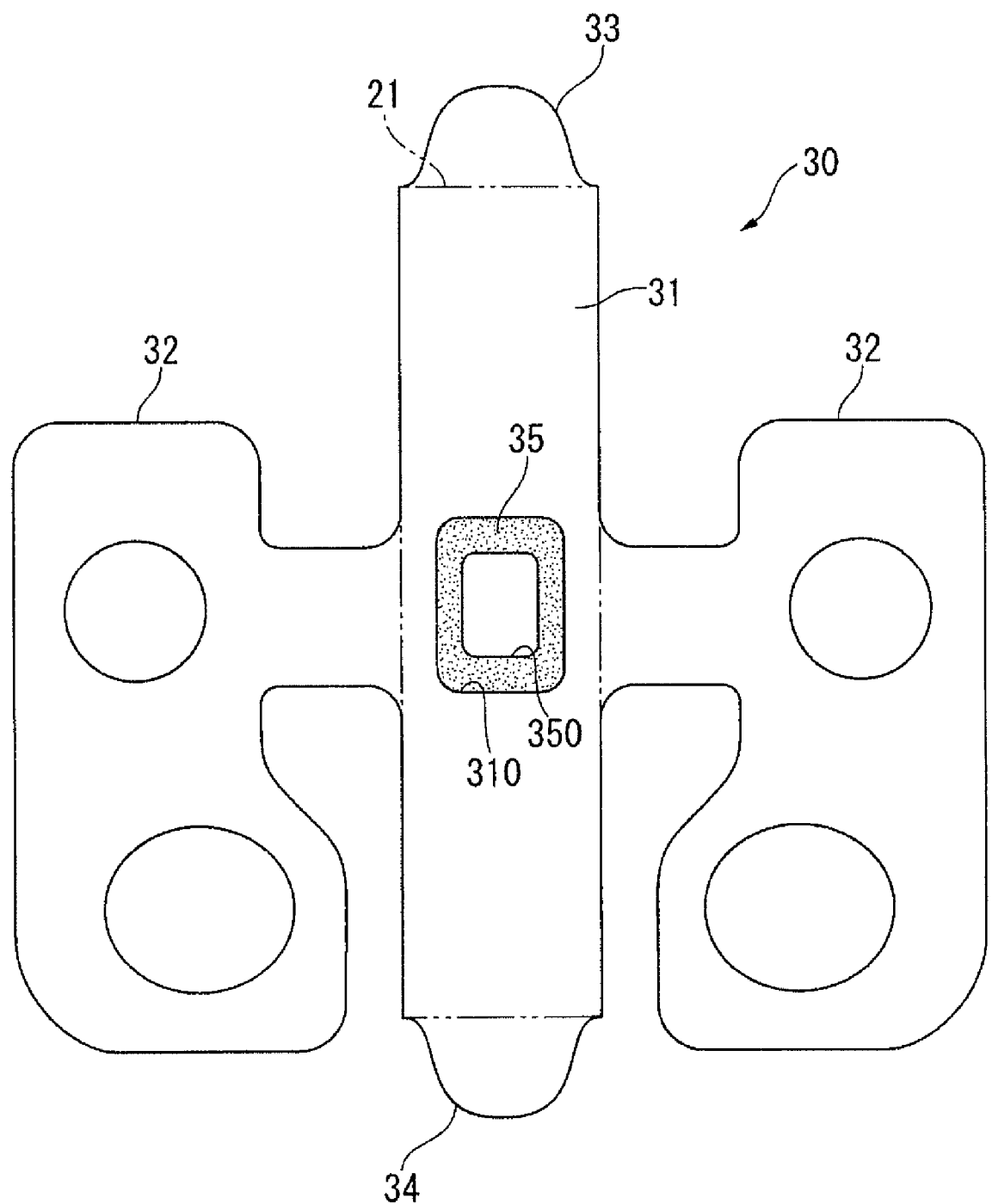
FIG. 9 shows another variation of the first embodiment of the invention.

Further alternatively, the member 35 can be disposed to only part of the through-hole 310 as shown in FIG. 9 and a through-hole 350 surrounded by the member 35 can be formed in the reinforcing plate 31, thereby helping to further increase the amplitude.

The same effect as this variation of the first embodiment can also be achieved if the adhesive that bonds the piezoelectric elements 21 and reinforcing plate 31 together flows into the through-hole 310 of the first embodiment (FIG. 4) because the elastic modulus of this adhesive is less than the elastic modulus of the reinforcing member 30.

Second Embodiment

A second embodiment of the invention is described next. The arrangement of this embodiment of the invention enables increasing the amplitude of longitudinal vibration and sinusoidal vibration.

Figure 10:
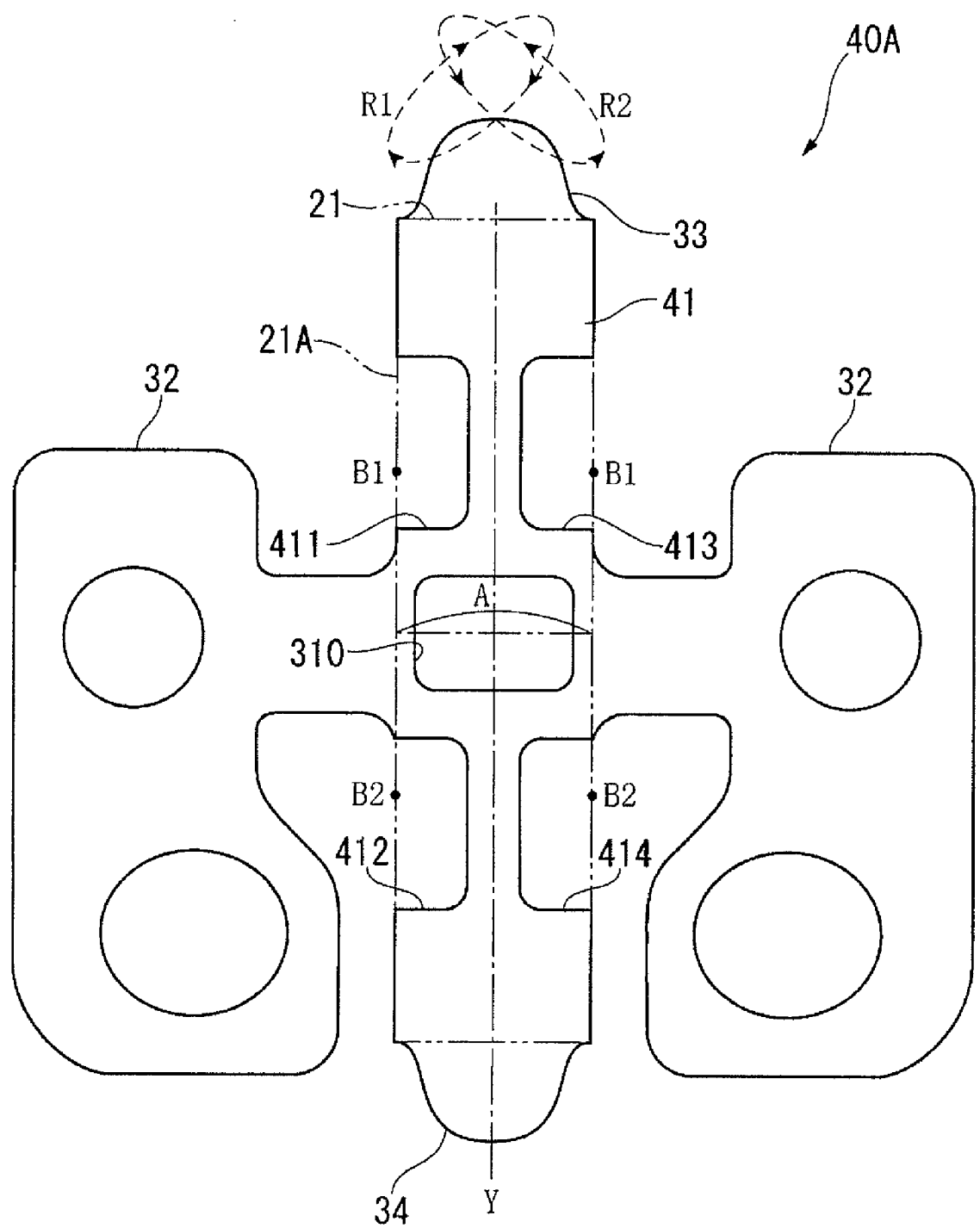
FIG. 10 is a plan view of a piezoelectric transducer according to a second embodiment of the invention.

FIG. 10 shows a piezoelectric transducer 40A according to this embodiment of the invention. This embodiment differs from the first embodiment only in the shape of the reinforcing plate 41 that is layered with the piezoelectric elements 21, and is otherwise the same as the first embodiment.

In addition to having a through-hole 310 substantially identical to the first embodiment, the reinforcing plate 41 in this embodiment of the invention also has recesses 411 to 414 formed on both long sides of the reinforcing plate 41. These recesses 411 to 414 are formed as voids proceeding from the edges of the reinforcing plate 41 corresponding to the outside lengthwise edges 21A of the piezoelectric elements 21 to the inside across the width of the piezoelectric element 21. The recesses 411 to 414 are line symmetrical to center line Y, and are formed at positions corresponding to the points (locations) B1, B2 (antinodes of sinusoidal vibration) derived from FIG. 40 where the strain produced by the sinusoidal vibration that is induced when the piezoelectric transducer 40A vibrates is greatest.

Figure 40:
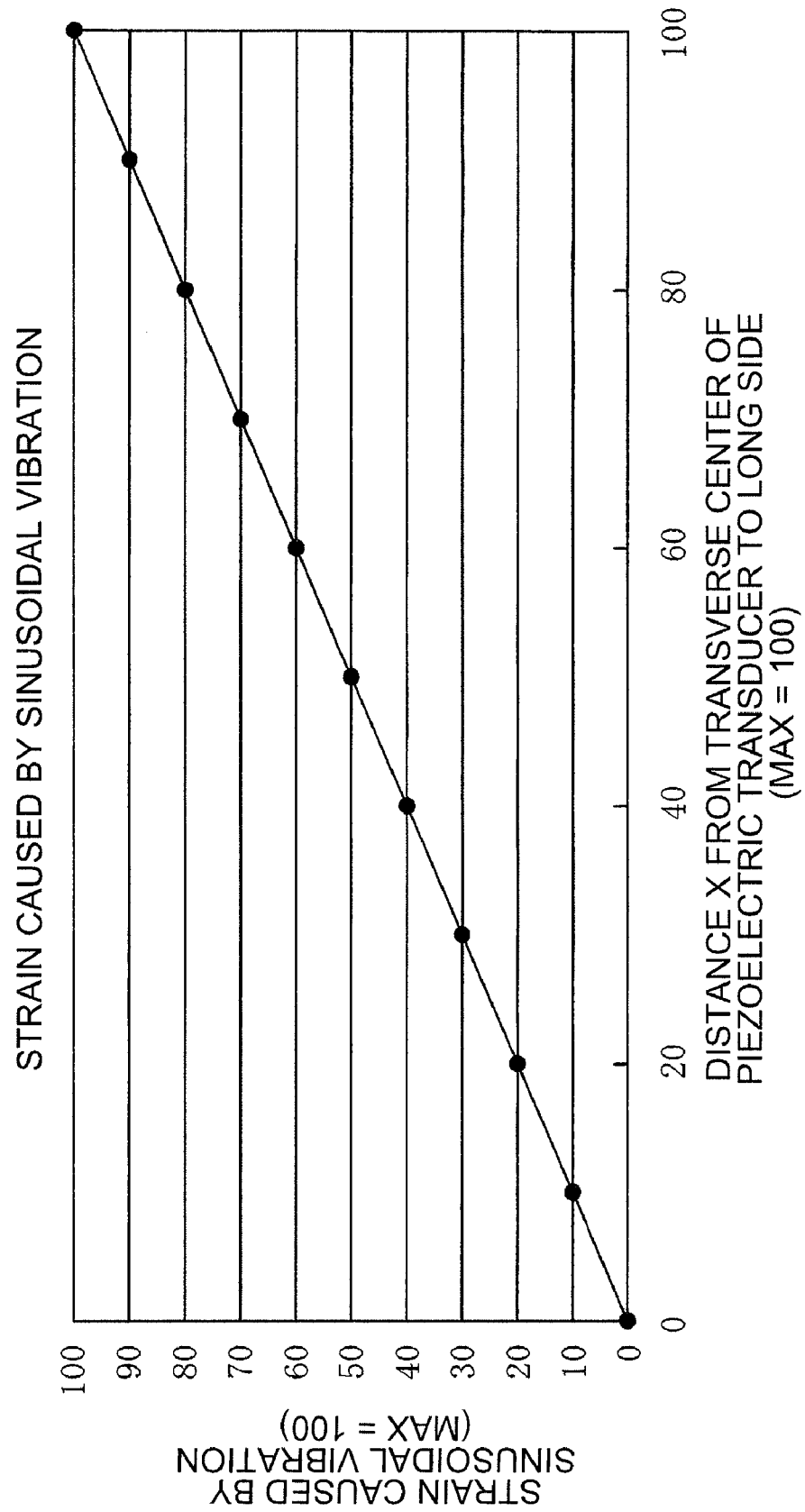
FIG. 40 shows the strain produced by sinusoidal vibration.
Figure 41:
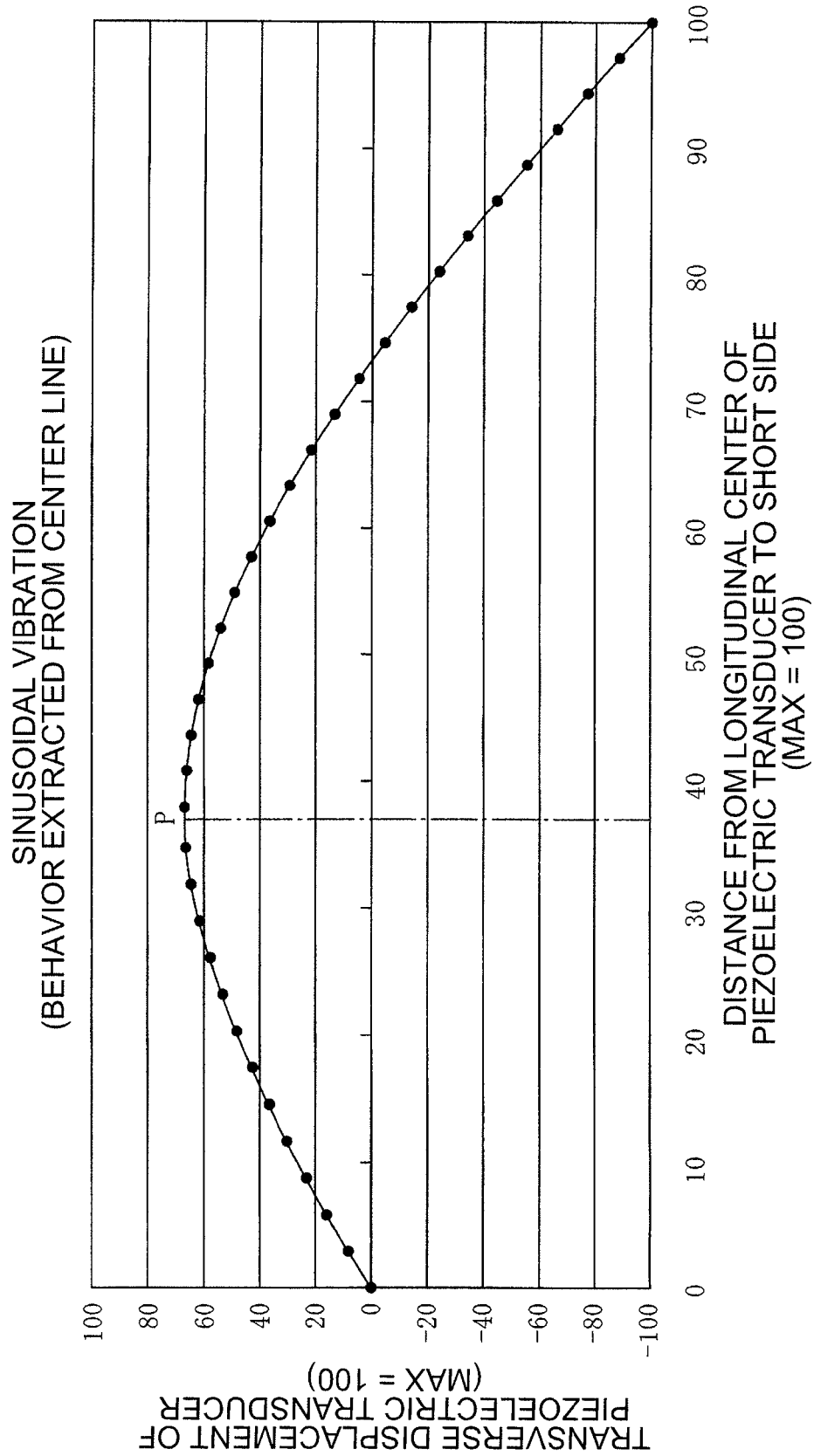
FIG. 41 shows the behavior of section view.
Figure 42:
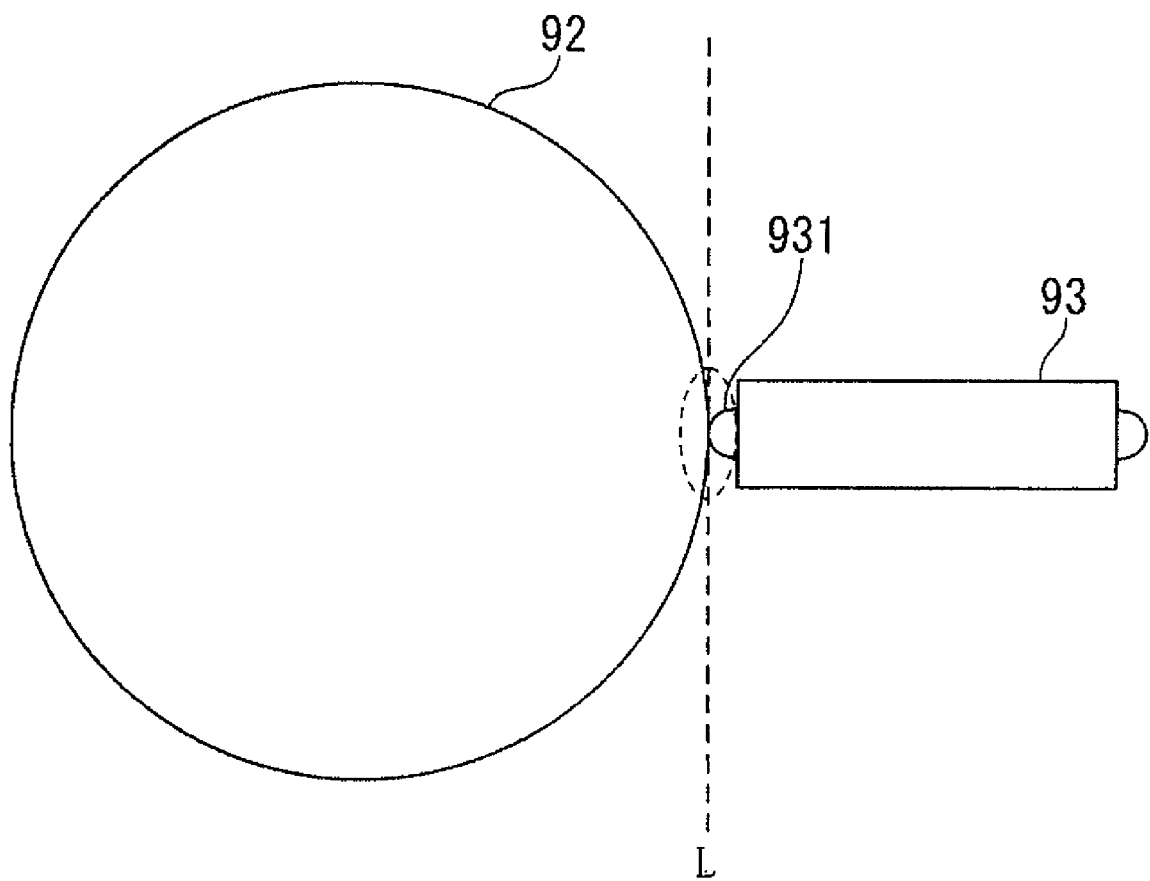
FIG. 42 shows driving a driven body by means of sinusoidal vibration.

When the vibration behavior of sinusoidal vibration at the lengthwise center line Y of the piezoelectric transducer 40A is detected in this embodiment of the invention, the result is substantially identical to FIG. 41 and there is a point P where displacement (amplitude) widthwise to the piezoelectric transducer is greatest. If the distance from the center of the surface of the piezoelectric transducer 40A to the short side is 100%, this point P is at a distance of approximately 37%. Because strain is greater at the outside edge area than toward the inside (center) of the width of the piezoelectric transducer 40A as shown in FIG. 40, the strain produced by sinusoidal vibration is greatest at points B1 and B2, which are at the intersections of the outside edge parts (long sides) of the piezoelectric transducer 40A and a transverse line through point P offset 37% of the distance from the center to the short side from the center of the surface. In other words, these points (locations) B1 and B2 (point P) are positioned where the strain produced by sinusoidal vibration of the piezoelectric transducer 40A is greatest (the energy density of the sinusoidal vibration is greatest). Based on FIG. 40 and FIG. 41, the place where the strain of sinusoidal vibration is greatest is at points B1 and B2 as described above.

The recesses 411 to 414 are therefore formed to contain these points B1 and B2. These recesses 411 to 414 are thus second void parts. Because the piezoelectric element 21 expands and contracts freely at these recesses 411 to 414, the amplitude produced by the maximum vibration energy that can be produced by the sinusoidal vibration of the piezoelectric element 21 can be increased.

Because outside of the out-of-plane displacement of the piezoelectric element 21 is limited as a result of the parts of the piezoelectric elements 21 other than the recesses 411 to 414 and through-hole 310 being held to the surface of the reinforcing plate 41, the amplitude of longitudinal vibration and sinusoidal vibration in the piezoelectric transducer 20A can be substantially maximized.

Because the recesses 411 to 414 are open around the sinusoidal vibration points B1 and B2 where the strain produced by sinusoidal vibration is greatest, the place of maximum strain produced by sinusoidal vibration remains in the recesses 411 to 414 even if the reaction of the rotor 25 (FIG. 2) driven by the contact prod 33 changes the vibration energy density distribution from the vibration energy density distribution of the piezoelectric transducer 20A alone.

The piezoelectric transducer 40A according to this embodiment of the invention excites an elliptical vibration in a mixed mode combining longitudinal vibration and sinusoidal vibration as in the first embodiment, but further improves vibration efficiency because in addition to the through-hole 310 increasing the amplitude of longitudinal vibration and the amplitude of sinusoidal vibration, the recesses 411 to 414 also further increase the amplitude of sinusoidal vibration.

This embodiment also achieves the other effects of the first embodiment described above.

Variation of the Second Embodiment

Figure 11:
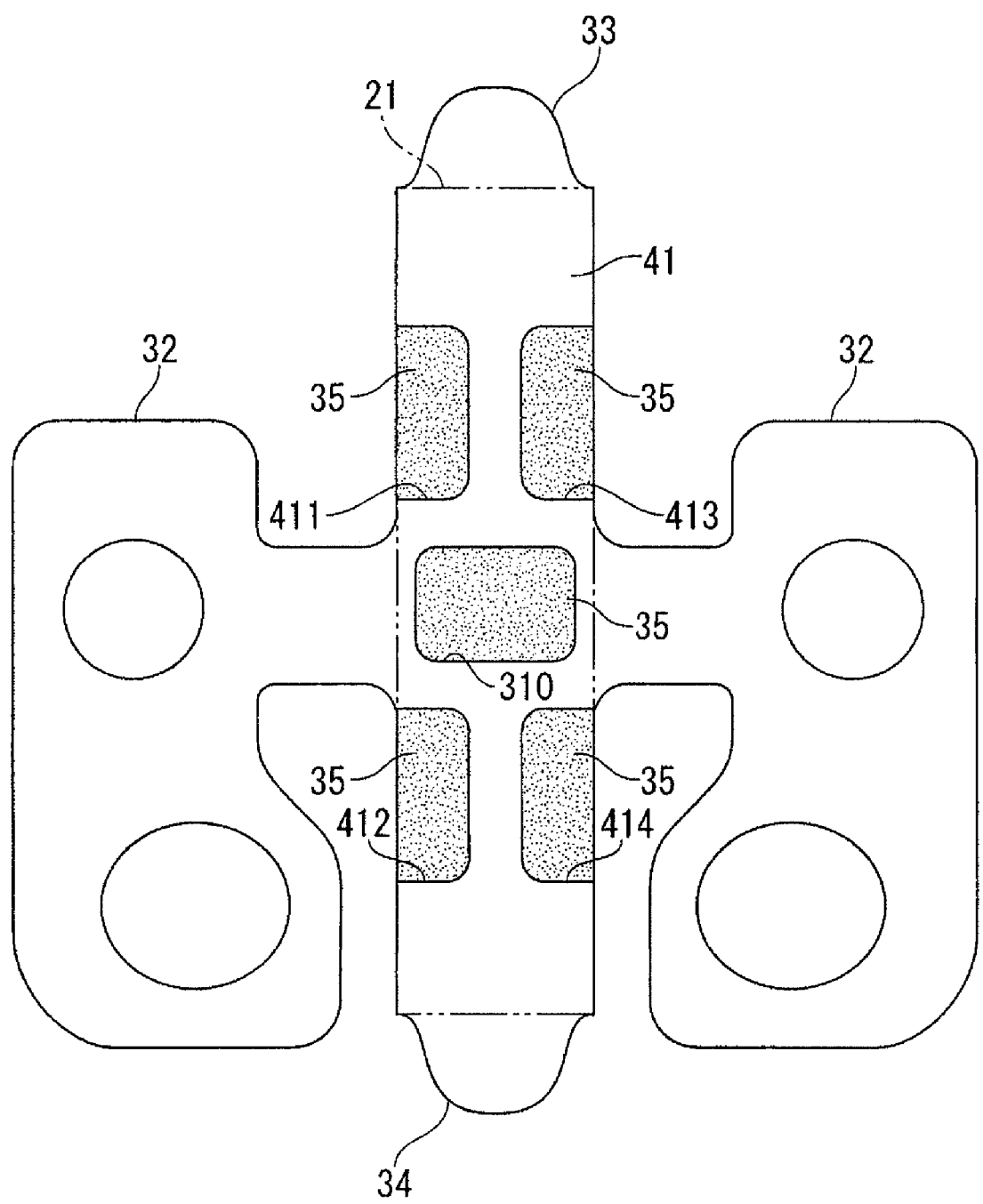
FIG. 11 shows a variation of the second embodiment of the invention.

FIG. 11 shows a variation of the second embodiment in which a member 35 formed by resin or solder is disposed and fixed in the internal spaces of the through-hole 310 and recesses 411 to 414 in the reinforcing plate 41. Because the elastic modulus of the member 35 is lower than the elastic modulus of the reinforcing member 30, this variation affords the same effect as the second embodiment (FIG. 10) in which the insides of the through-hole 310 and the recesses 411 to 414 are empty. Disposing this member 35 in the through-hole 310 and recesses 411 to 414 also better assures sufficient strength in the reinforcing plate 41.

The member 35 could alternatively be rendered only in a part of the through-hole 310 or apart of each recess 411 to 414. For example, greater amplitude can be achieved by not rendering the member 35 where the strain produced by sinusoidal vibration is greatest (points B1, B2) and leaving these places open.

The same effect as this variation of the invention can also be achieved if the adhesive that bonds the piezoelectric elements 21 and reinforcing plate 41 together flows into the through-hole 310 and recesses 411 to 414 of the second embodiment (FIG. 10) because the elastic modulus of this adhesive is less than the elastic modulus of the reinforcing member 30.

Embodiment 3

A third embodiment of the invention is described next. The arrangement of this embodiment of the invention enables increasing the amplitude of longitudinal vibration and sinusoidal vibration.

Figure 12:
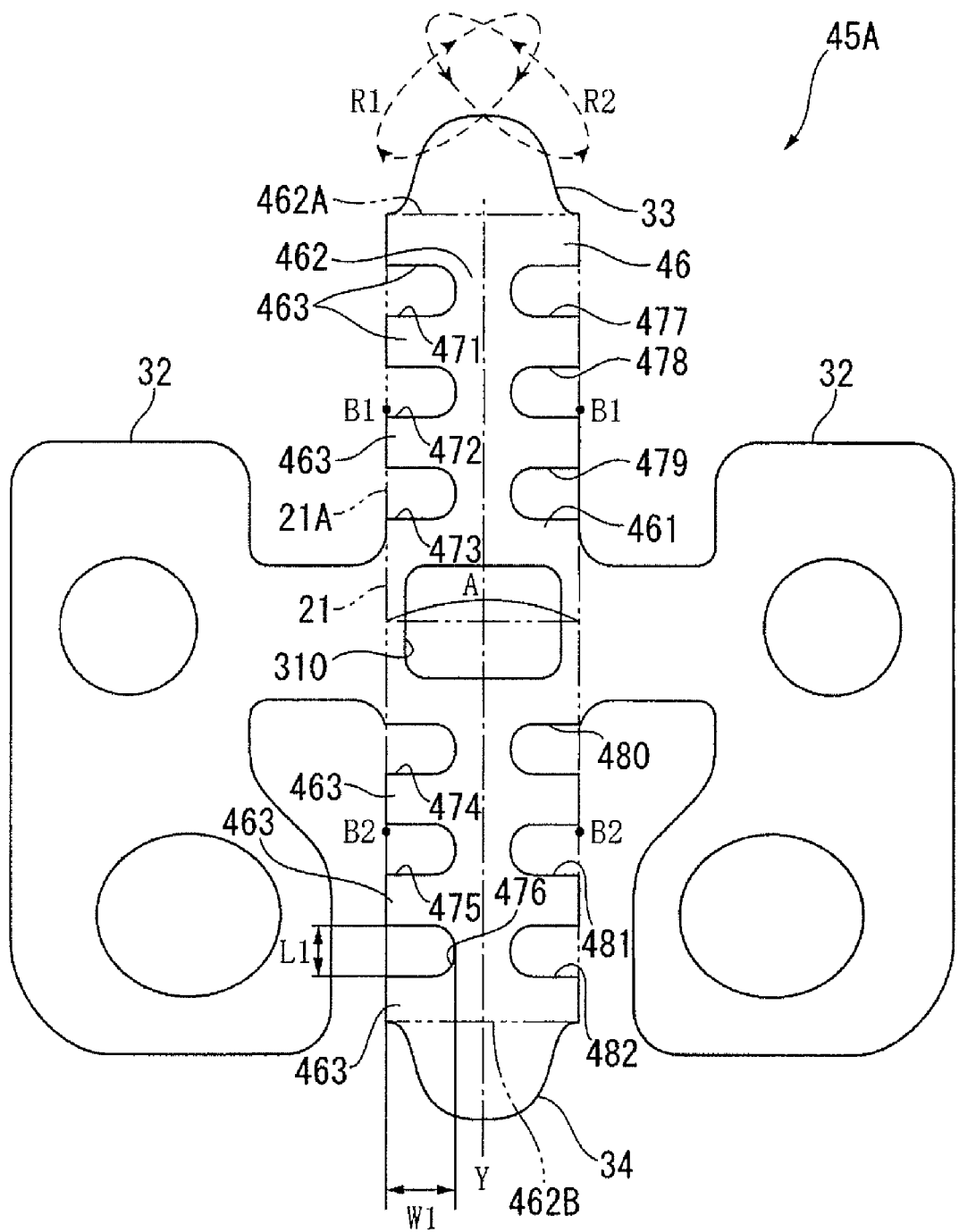
FIG. 12 is a plan view of a piezoelectric transducer according to a third embodiment of the invention.

FIG. 12 shows a piezoelectric transducer 45A according to this embodiment of the invention. This embodiment differs from the preceding embodiments only in the shape of the reinforcing plate 46 that is layered with the piezoelectric elements 21, and is otherwise the same as the preceding embodiments.

The reinforcing plate 46 is shaped similarly to a fish skeleton and has a center part 461, a spine 462, and a plurality of branches 463. The center part 461 is layered with and located in the center part of the surface of the piezoelectric element 21, and has a through-hole 310 formed therein. The spine 462 extends from one end to the other end of the length of the piezoelectric element 21 through the center part 461. The plurality of branches 463 are formed intersecting the spine 462.

There are six branches 463 in this embodiment of the invention, including three between one end 462A of the spine 462 and the center part 461 and three between the other end 462B of the spine 462 and the center part 461.

Voids 471 to 482 are formed in this reinforcing plate 46 from a position corresponding to the outside lengthwise edges 21A of the piezoelectric elements 21 toward the spine 462 between the one end 462A of the spine 462 and the adjacent branch 463, between the other end 462B of the spine 462 and the adjacent branch 463, between adjacent branches 463, and between the center part 461 and the adjacent branches 463. These voids 471 to 482 are also formed line symmetrically to the center line Y.

The voids 472 and 478 are formed to contain the point (place) B1 where strain produced by sinusoidal vibration is greatest (the position on the long side at point P of the reinforcing plate 46), and voids 475 and 481 are formed to contain the point (place) B2 where strain produced by sinusoidal vibration is greatest (the position on the long side at point P of the reinforcing plate 46). Voids 472, 478, 475, and 481 are thus second void parts.

In addition, the length L1 of voids 471 to 482 is less than or equal to 7% (and preferably greater than or equal to 3%) of the length of the piezoelectric element 21, and the width W1 of the voids 471 to 482 is less than or equal to 39% (and preferably greater than or equal to 10%) of the width of the piezoelectric element 21. Positioning the voids 471 to 482 in this range assures sufficient strength in the reinforcing member, reduces the vibration component along the z-axis during vibration, and improves vibration efficiency.

The size, position, and shape of the voids 471 to 482 are determined to allow for the change in the vibration energy density distribution caused by the reaction of the rotor 25 (FIG. 2) when the contact prod 33 drives the rotor 25.

The amplitude resulting from the maximum vibration energy produced by sinusoidal vibration of the piezoelectric elements 21 can also be increased because the piezoelectric elements 21 can expand and contract freely in the voids 471 to 482.

The vibration behavior of the piezoelectric transducer 45A in this embodiment of the invention is described next with reference to FIG. 13 to FIG. 16.

Figure 13:
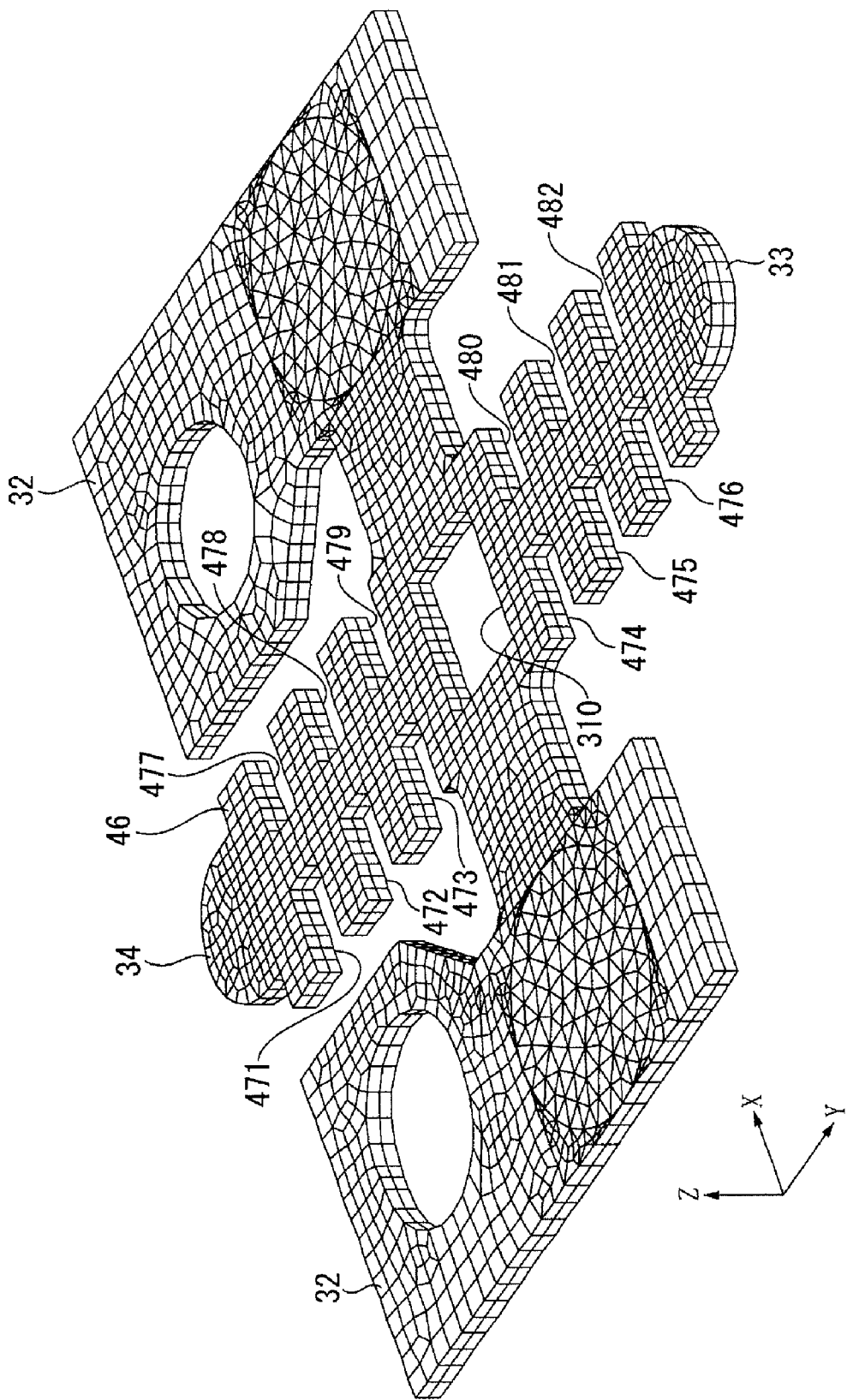
FIG. 13 shows the reinforcing member according to the third embodiment of the invention.
Figure 14:
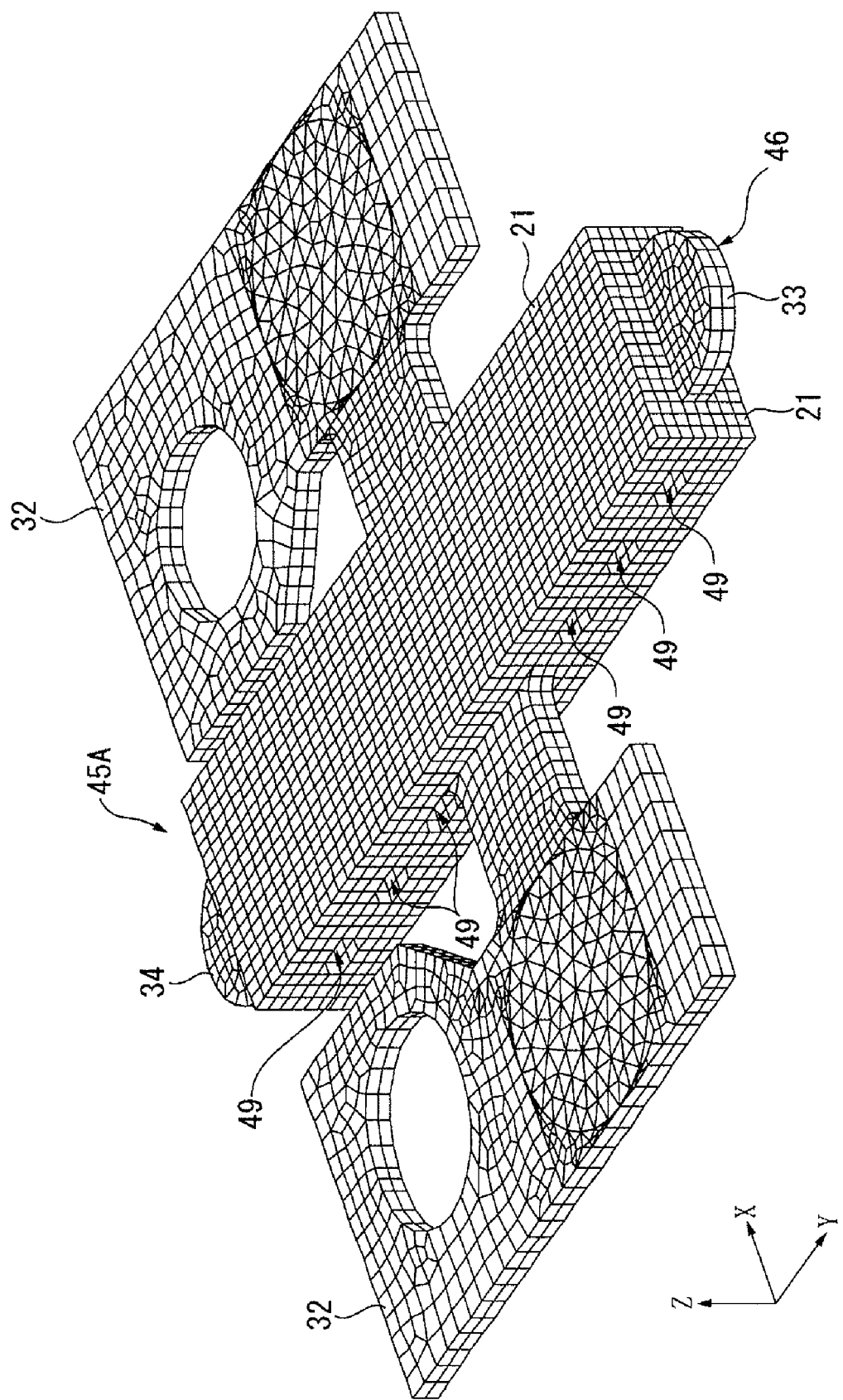
FIG. 14 shows a piezoelectric transducer according to the third embodiment of the invention with the reinforcing member shown in FIG. 13.

FIG. 13 shows the reinforcing member of the piezoelectric transducer 45A, and FIG. 14 is an oblique view of the piezoelectric transducer 45A. Non-contacting parts 49 where there is no contact between the reinforcing plate 46 and the piezoelectric elements 21 are formed where the voids 471 to 482 are formed in the reinforcing plate 46 of the reinforcing member. These non-contacting parts 49 are formed at the same positions as the voids 471 to 482.

Figure 15:
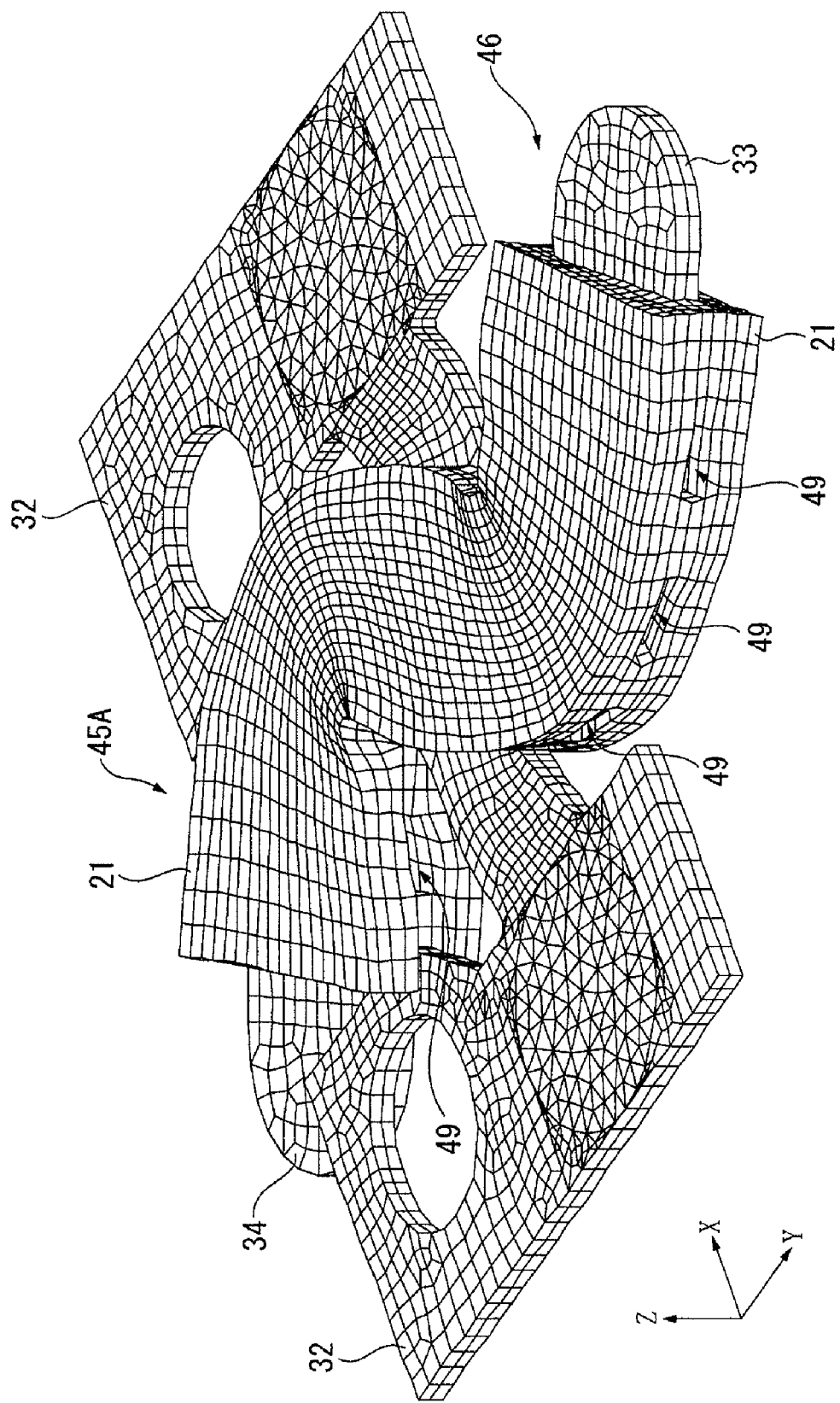
FIG. 15 shows the vibration behavior of the piezoelectric transducer shown in FIG. 14.

FIG. 15 shows what happens when the piezoelectric transducer 45A is caused to vibrate by applying voltage to electrodes 232, 233, and 234 (see FIG. 3) of the piezoelectric elements 21 of the piezoelectric transducer 45A and not applying voltage to electrodes 231 and 235 (FIG. 3). Note that FIG. 15 shows the vibration state when the piezoelectric transducer 45A is driven in a no-load state and there is no contact between the piezoelectric transducer 45A and the rotor or other driven body.

Figure 16:
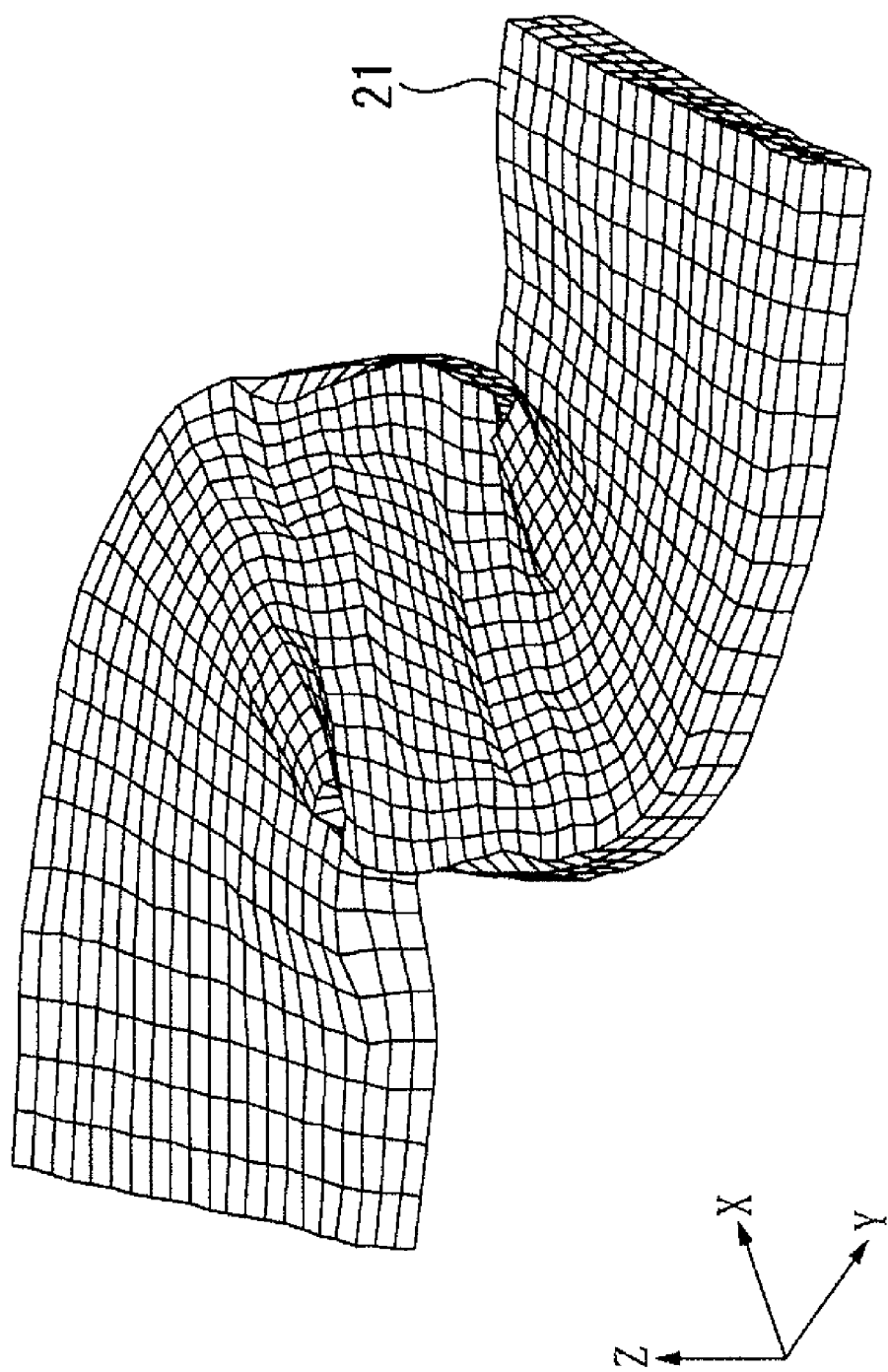
FIG. 16 shows only the piezoelectric element of the piezoelectric transducer when vibrating.
Figure 34:
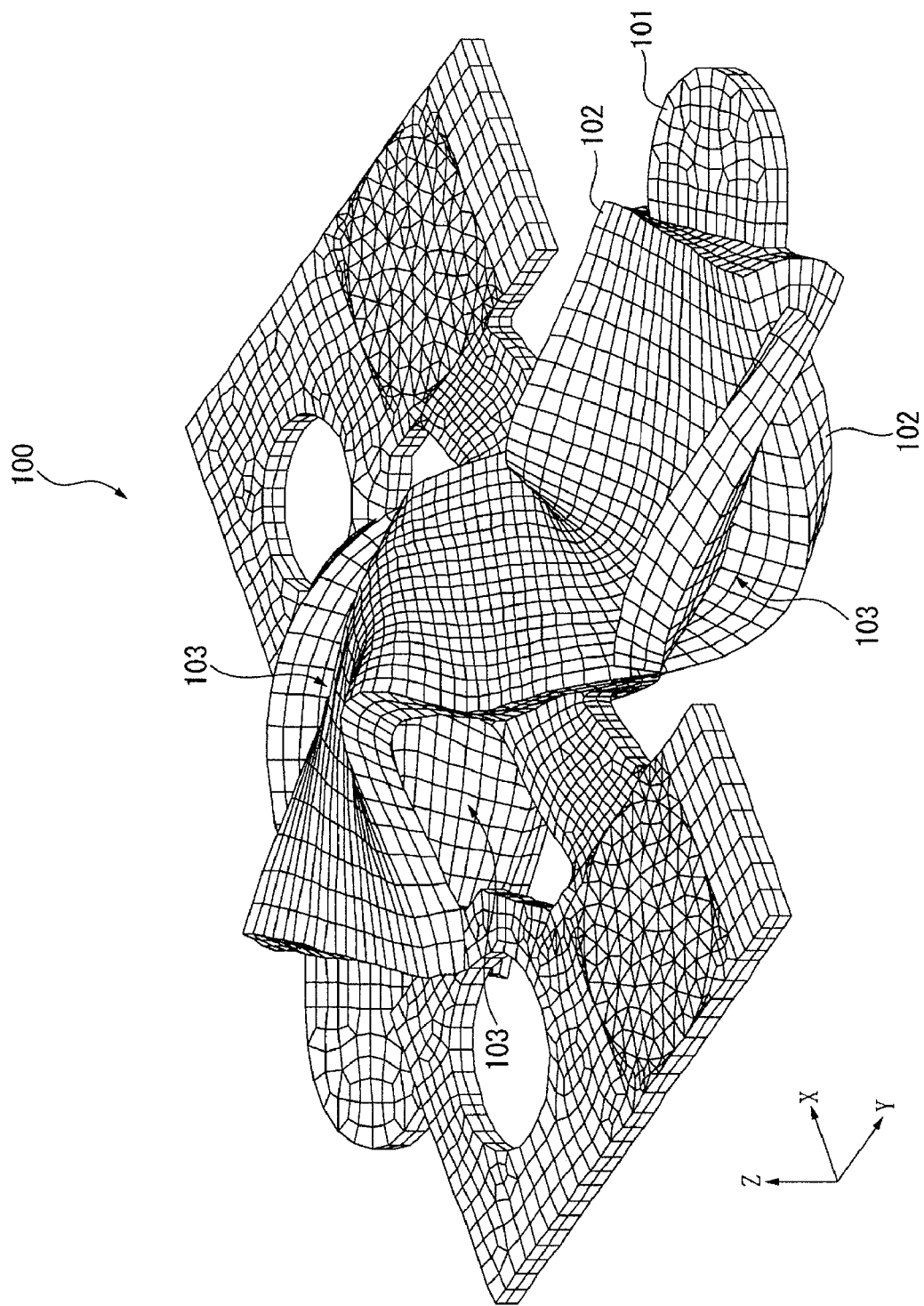
FIG. 34 shows a simulation of the tendency for out-of-plane displacement in a piezoelectric transducer having the reinforcing member shown in FIG. 32.
Figure 35:
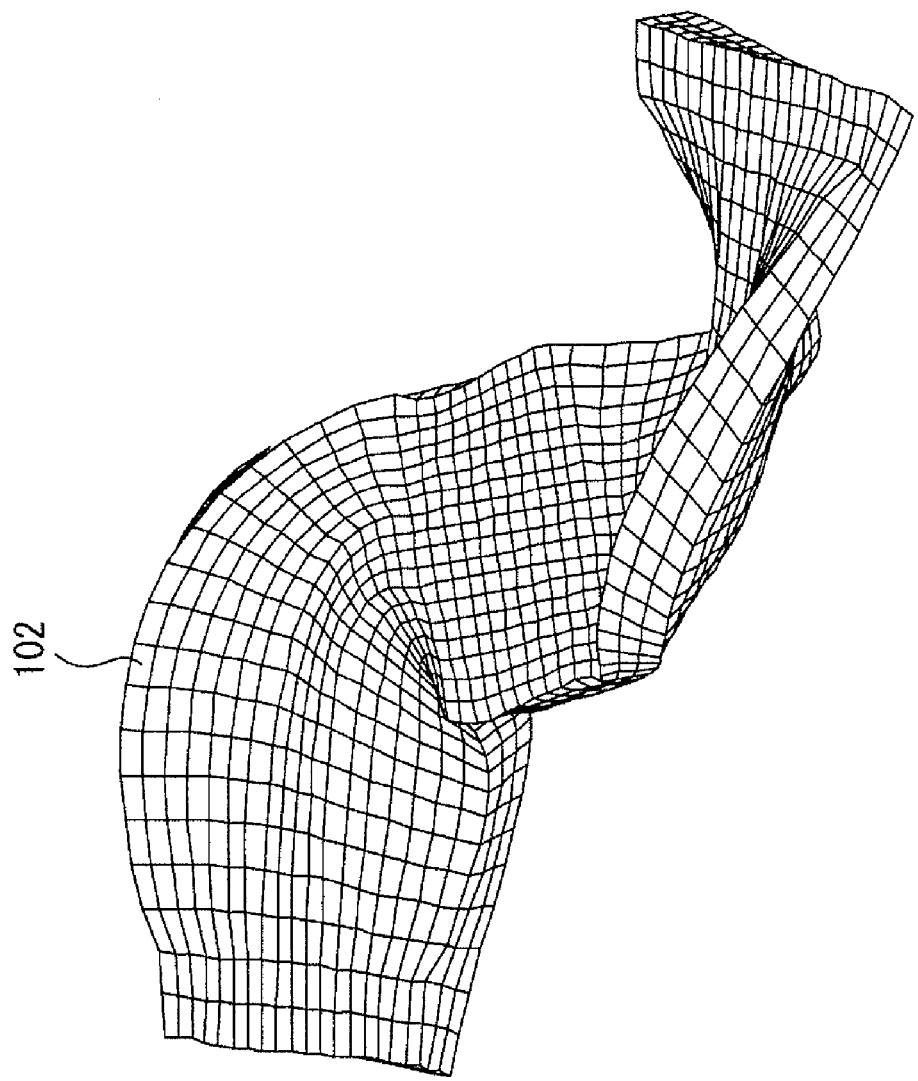
FIG. 35 shows only the piezoelectric element in this piezoelectric transducer when vibrating.

FIG. 15 shows the result of a computer simulation of piezoelectric transducer 45A vibration. FIG. 16 shows only the piezoelectric elements 21 of the piezoelectric transducer 45A when vibrating. It will be understood from FIG. 15 and FIG. 16 that the piezoelectric transducer 45A vibrates overall in the in-plane direction both in the non-contacting parts 49 and the parts where the piezoelectric element 21 and reinforcing plate 46 contact, and there is substantially no vibration (out-of-plane vibration) in the out-of-plane direction (the direction including the z-axis). As shown in FIG. 34 and FIG. 35, the reinforcing member having large voids formed as described above exhibits large out-of-plane vibration at the no-contact portion 103 and low vibration efficiency in the in-plane direction because contact between the reinforcing member 101 and piezoelectric elements 102 impedes vibration in areas outside of the no-contact portion 103. The behavior of the piezoelectric transducer shown in FIG. 34 and the behavior of the piezoelectric transducer 45A according to this embodiment of the invention thus differ significantly.

The piezoelectric element 21 is held by the parts of the reinforcing plate 46 other than the voids 471 to 482 and through-hole 310 in this embodiment of the invention because the length L1 of the open area in the reinforcing plate 46 in voids 471 to 482 is less than or equal to 7% (and preferably greater than or equal to 3%) of the length of the piezoelectric element 21, and the width W1 of the open area of the reinforcing plate 46 in the voids 471 to 482 is less than or equal to 39% (and preferably greater than or equal to 10%) of the width of the piezoelectric element 21. As a result, vibration efficiency can be improved while limiting out-of-plane vibration without interfering with vibration. This void effect is achieved when the length L1 of the open area of the voids is greater than or equal to 3% and the width W1 of the open area of the voids is greater than or equal to 10%. However, because the strength of the reinforcing member is reduced if the length L1 exceeds 7% or the width W1 exceeds 39%, the ability to limit out-of-plane vibration is reduced and amplitude is attenuated.

Figure 17:
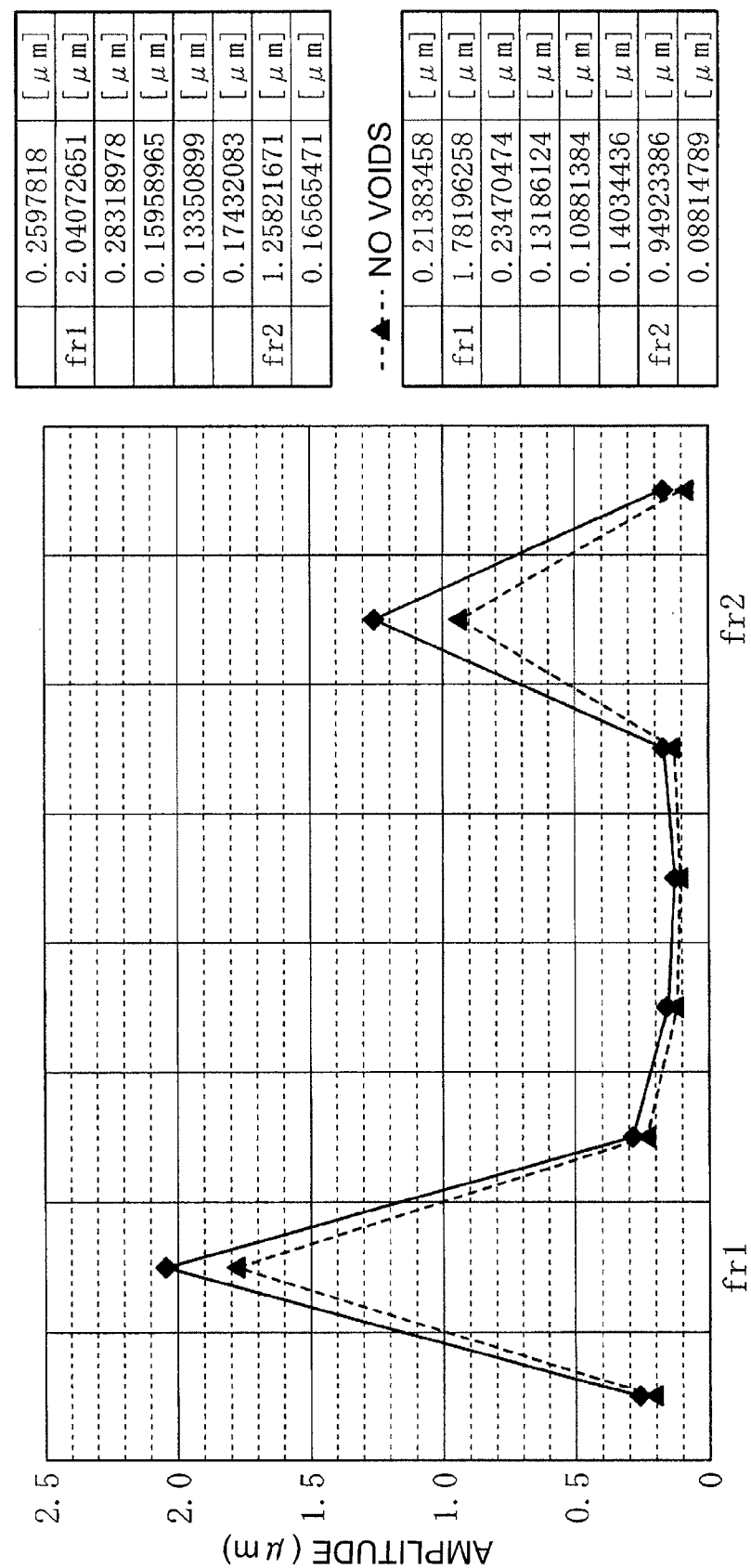
FIG. 17 shows the vibration amplitude of the piezoelectric transducer according to the invention, and the vibration amplitude of a piezoelectric transducer that does not have void portions formed in the reinforcing member.

The graph in FIG. 17 shows the vibration amplitude (solid line) of the piezoelectric transducer 45A according to this embodiment of the invention, and the vibration amplitude (dotted line) of a piezoelectric transducer that does not have void portions formed in the reinforcing member. The piezoelectric transducer for which the vibration amplitude is indicated by the dotted line was formed identically to the piezoelectric transducer of the present embodiment except that no voids were formed in the reinforcing plate. The x-axis of the graph in FIG. 17 shows the frequency of the drive voltage applied to the piezoelectric elements. Both the amplitude of longitudinal vibration and the amplitude of sinusoidal vibration can be increased and the vibration efficiency can thereby be improved by applying a drive voltage of an appropriate frequency between the longitudinal resonance frequency fr1 corresponding to the resonance point of the longitudinal vibration and the sinusoidal resonance frequency fr2 corresponding to the resonance point of the sinusoidal vibration. The table at the top in FIG. 17 shows the vibration amplitude of the piezoelectric transducer 45A at each of the graduations of the drive frequency in the graph in FIG. 17, and the bottom table in FIG. 17 shows the vibration amplitude of the piezoelectric transducer in which voids are not formed.

As shown in FIG. 17 the vibration amplitude of the piezoelectric transducer 45A denoted by the solid line is greater than the vibration amplitude of the piezoelectric transducer in which void portions are not formed. More specifically, because vibration amplitude is increased by limiting out-of-plane vibration while not impeding vibration, the elliptical path traced by the contact prod 33 of the piezoelectric transducer 45A increases and the rotor 25 can thereby be driven with high efficiency.

As described above, the vibration efficiency of the piezoelectric transducer 45A in this embodiment of the invention is high, and the stopping torque of a piezoelectric actuator rendered with this piezoelectric transducer 45A and a rotor 25 is improved 15% to 20% compared with a piezoelectric transducer using a reinforcing member in which the void portions are not formed.

The piezoelectric transducer 45A according to this embodiment of the invention has a reinforcing plate 46 in which openings are formed to include a part of the line segment A where strain produced by longitudinal vibration is greatest and the points B1 and B2 where strain produced by sinusoidal vibration is greatest, and therefore affords substantially the same effect as the second embodiment. This embodiment also has the following effect.

(5) By rendering the void parts of the reinforcing plate 46 to a length less than or equal to 7% of the length and a width less than or equal to 39% of the width of the piezoelectric element 21, the reinforcing plate 46 can reliably limit out-of-plane displacement of the piezoelectric element 21 without impeding vibration, and vibration efficiency can thereby be improved.

Embodiment 4

A fourth embodiment of the invention is described next. This embodiment enables increasing the amplitude of longitudinal vibration and sinusoidal vibration.

Figure 18:
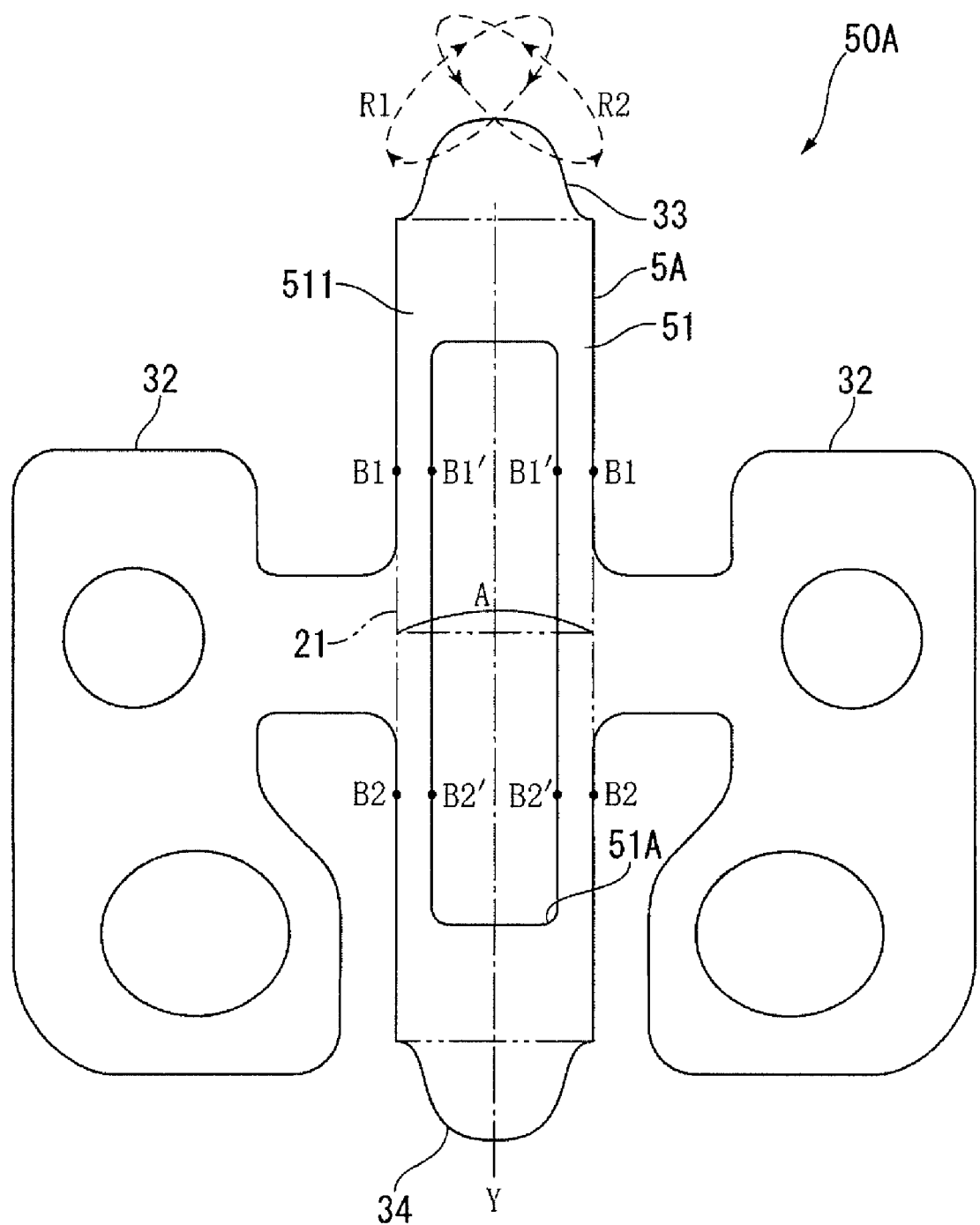
FIG. 18 is a plan view of a piezoelectric transducer according to a fourth embodiment of the invention.

FIG. 18 shows a piezoelectric transducer 50A according to this embodiment of the invention. This embodiment differs form the preceding embodiments only in the shape of the reinforcing plate 51 that is layered with the piezoelectric elements 21, and other aspects of this embodiment are the same as in the preceding embodiments.

The reinforcing plate 51 according to this embodiment of the invention has a substantially rectangular frame-like contour part 511 that conforms to the outside circumference of the piezoelectric element 21 when seen in plan view. The inside part of the reinforcing plate 51 is removed to leave this contour part 511, and a single aperture 51A is formed inside the contour part 511.

This aperture 51A is formed to contain a part of the line segment A where the strain produced by longitudinal vibration is greatest and the area near the points B1, B2 where the strain produced by sinusoidal vibration is greatest (points B1' and B2' where the strain produced by sinusoidal vibration is substantially greatest). This aperture 51A thus functions as a first void part and a third void part. Because the piezoelectric element 21 expands and contracts freely in this aperture 51A, the amplitude produced by the maximum vibration energy that can be produced by the longitudinal vibration and sinusoidal vibration of the piezoelectric element 21 can be increased.

The points (places) B1 and B2 where the strain produced by sinusoidal vibration is greatest are on the reinforcing plate 51. The aperture 51A is also line symmetrical to the center line Y.

The width of the aperture 51A is preferably 40% to 78%, and further preferably 50% to 60%, of the width of the reinforcing plate 51, and the length of the 51a is preferably 40% to 80%, and further preferably 50% to 60%, of the length of the reinforcing plate 51.

The piezoelectric transducer 50A according to this embodiment of the invention affords the same effect as the second embodiment because, substantially like in the second embodiment, an opening including the line segment A where the strain produced by longitudinal vibration is substantially greatest and the points B1', B2' where strain produced by sinusoidal vibration is substantially greatest is formed in the reinforcing plate 51. In addition, this embodiment also has the following effect.

(6) The strength of the reinforcing plate 51 is improved and the in-plane torsion strength can be improved by forming the contour part 511.

Because the contour part 511 follows the perimeter of the piezoelectric element 21, positioning the reinforcing plate 5A with the piezoelectric elements 21 is simple when assembling the piezoelectric elements 21 and reinforcing plate 5A during piezoelectric transducer 50A production. In other words, piezoelectric transducer 50A productivity is improved and variation in characteristics can be reduced.

(8) Because a plurality of voids such as described above are connected to form a single aperture 51A and the opening in this aperture 51A is large, interference with displacement of the piezoelectric element 21 can be significantly prevented.

Variation of Embodiment 4

Figure 19:
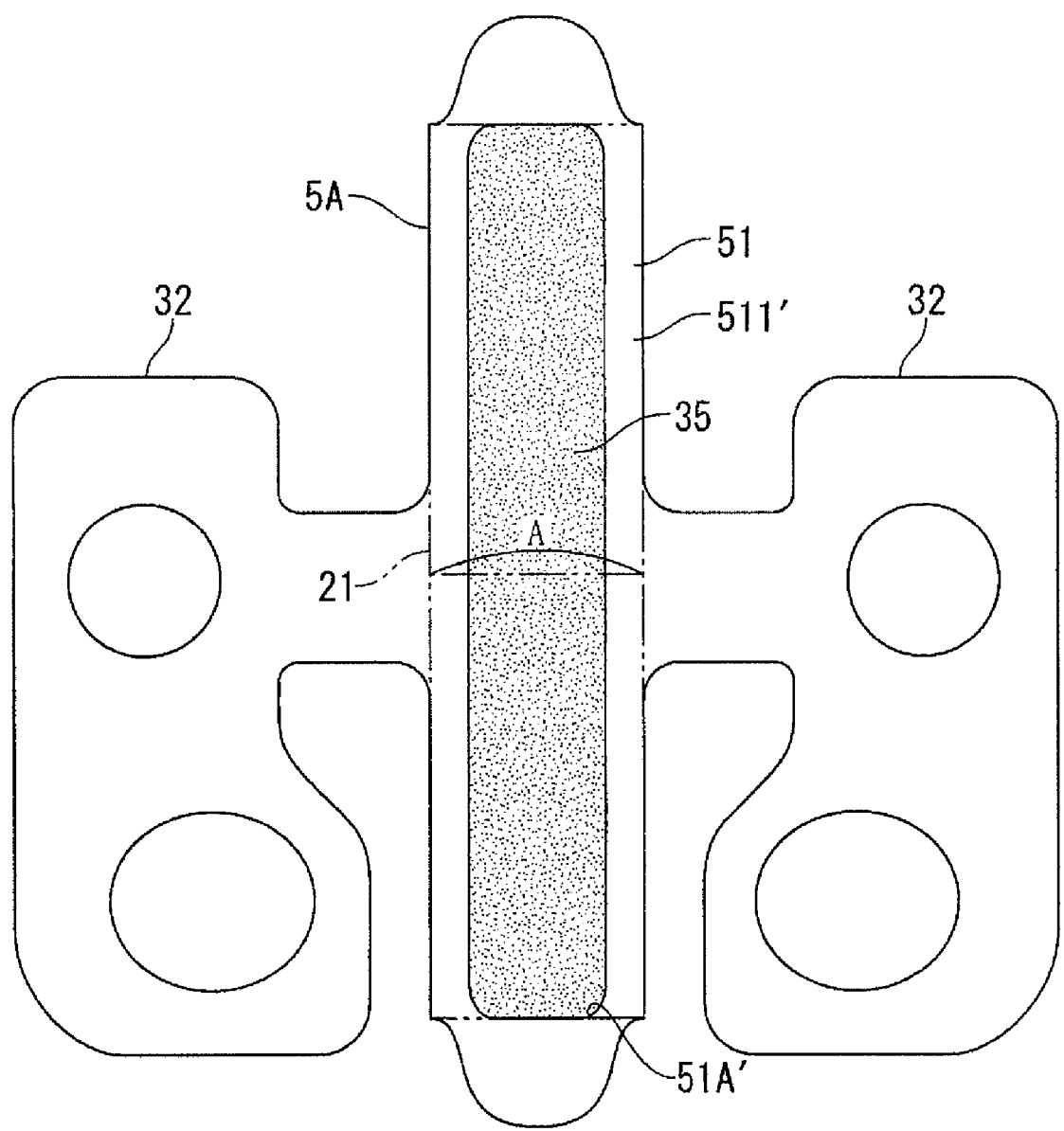
FIG. 19 shows a variation of the fourth embodiment of the invention.

FIG. 19 shows another aspect of the invention in which a member 35 formed from resin or solder, for example, is disposed and affixed in the space inside the aperture 51A' formed inside the contour part 511' of the reinforcing plate 51. Because the modulus of elasticity of the member 35 is lower than the elastic modulus of the reinforcing plate 5A, this embodiment has the same effect as the foregoing arrangement (FIG. 18) in which the inside of the aperture 51A is empty. In addition, this member 35 enables rendering a large aperture 51A' while assuring even greater strength in the reinforcing plate 51. As a result, the length of this aperture 51A' is greater than the length of the aperture 51A shown in FIG. 18 and good vibration efficiency can be achieved because the piezoelectric element 21 can expand and contract freely in this large aperture 51A'.

Further alternatively, an aperture can be formed in the member 35 in the area where the node of longitudinal vibration and the node of sinusoidal vibration overlap and coincide (the center of the surface of the piezoelectric element 21).

While the contour part 511 is disposed around the entire perimeter of the piezoelectric element 21 in this fourth embodiment of the invention, the skeleton is rendered by the contact prod 33 when a part of the contour part 511 is removed, and such arrangements can therefore also be used.

Embodiment 5

A fifth embodiment of the invention is described next. The arrangement of this embodiment of the invention enables increasing the amplitude of longitudinal vibration and sinusoidal vibration.

Figure 20:
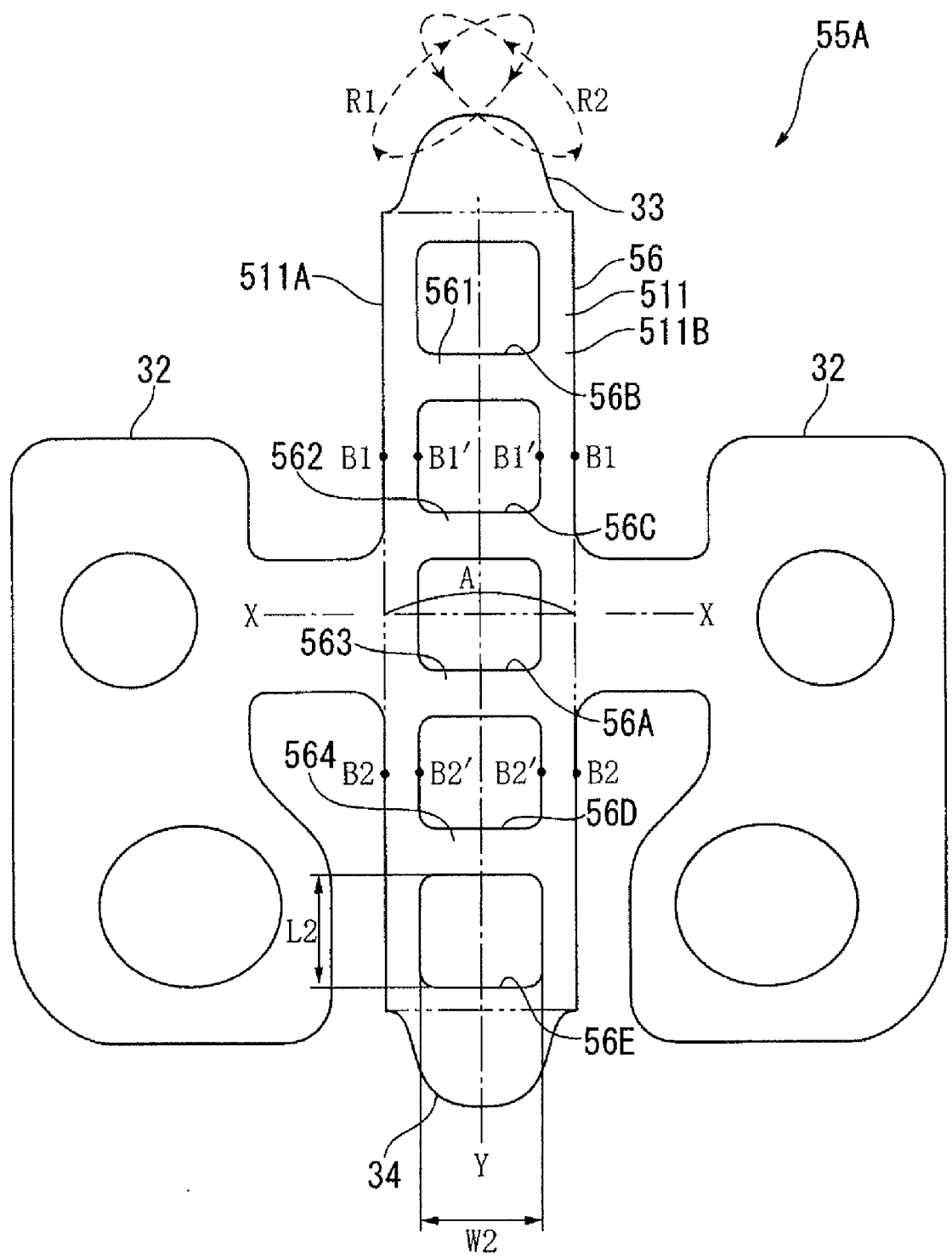
FIG. 20 is a plan view of a piezoelectric transducer according to a fifth embodiment of the invention.

FIG. 20 shows a piezoelectric transducer 55A according to this embodiment of the invention. This embodiment differs from the foregoing embodiments only in the shape of the reinforcing plate 56 that is layered with the piezoelectric elements 21, and is otherwise the same as in the previous embodiments.

The reinforcing plate 56 according to this embodiment of the invention is shaped basically like a ladder, having a substantially rectangular contour part 511 and a plurality of connecting parts 561 to 564. The connecting parts 561 to 564 are disposed connecting the long side parts 511A and 511B of the contour part 511 across the width of the piezoelectric element 21. Two of the connecting parts 561 to 564 are disposed on each side of a line X-X dividing the length of the piezoelectric element 21 into two equal parts.

A through-hole 56A and voids 56B to 56E that are surrounded by the contour part 511 and connecting parts 561 to 564 are formed line symmetrically to center line Y in the reinforcing plate 56. The through-hole 56A is formed to contain the place where the strain produced by longitudinal vibration is greatest, and functions as a first void part.

Voids 56C and 56D are formed to contain the points (places) B1' and B2' where strain produced by sinusoidal vibration is greatest, and function as third void parts.

The size, position, and shape of the through-hole 56A and voids 56B to 56E are determined to allow for the change in the vibration energy density distribution caused by the reaction of the rotor 25 (FIG. 2) when the contact prod 33 drives the rotor 25 from the vibration energy density distribution when the piezoelectric transducer 55A is driven with no load.

In addition, length L2 of the through-hole 56A and voids 56B to 56E is less than or equal to 15% (and preferably greater than or equal to 5%) of the length of the piezoelectric element 21, and the width W2 of the through-hole 56A and voids 56B to 56E is less than or equal to 78% (and preferably greater than or equal to 40%) of the width of the piezoelectric element 21.

The amplitude of the maximum vibration energy that can be produced by the longitudinal vibration and sinusoidal vibration of the piezoelectric element 21 can also be increased because the piezoelectric element 21 expands and contracts freely in the through-hole 56A and voids 56B to 56E.

The piezoelectric transducer 55A according to this embodiment of the invention affords substantially the same effect as the third embodiment because, substantially as in the fourth embodiment, openings including part of the line segment A where the strain produced by longitudinal vibration is greatest and the points B1', B2' where strain produced by sinusoidal vibration is substantially greatest are formed in the reinforcing plate 55A. In addition, this embodiment also has the following effect.

(9) The long side parts 511A and 511B of the contour part 511 work as support columns and these long side parts 511A and 511B and the connecting parts 561 to 564 together render a support skeleton, and this support skeleton desirably limits out-of-plane displacement of the piezoelectric elements 21. As a result, amplitude can be reliably increased and vibration efficiency can be further improved.

(10) The reinforcing plate 56 can reliably restrict out-of-plane displacement of the piezoelectric element 21 as a result of the through-hole 56A and voids 56B to 56E having a length less than or equal to 15% (and preferably greater than or equal to 5%) of the length and a width less than or equal to 78% (and preferably greater than or equal to 40%) of the width of the piezoelectric element 21.

In a variation of this embodiment a member other than the reinforcing member 30 can be disposed in all or any of the through-hole 56A and voids 56B to 56E.

Embodiment 6

A sixth embodiment of the invention is described next. This embodiment differs from the preceding embodiments in the shape of the protrusion that contacts the driven body. This embodiment enables increasing the amplitude of longitudinal vibration and sinusoidal vibration.

Figure 21:
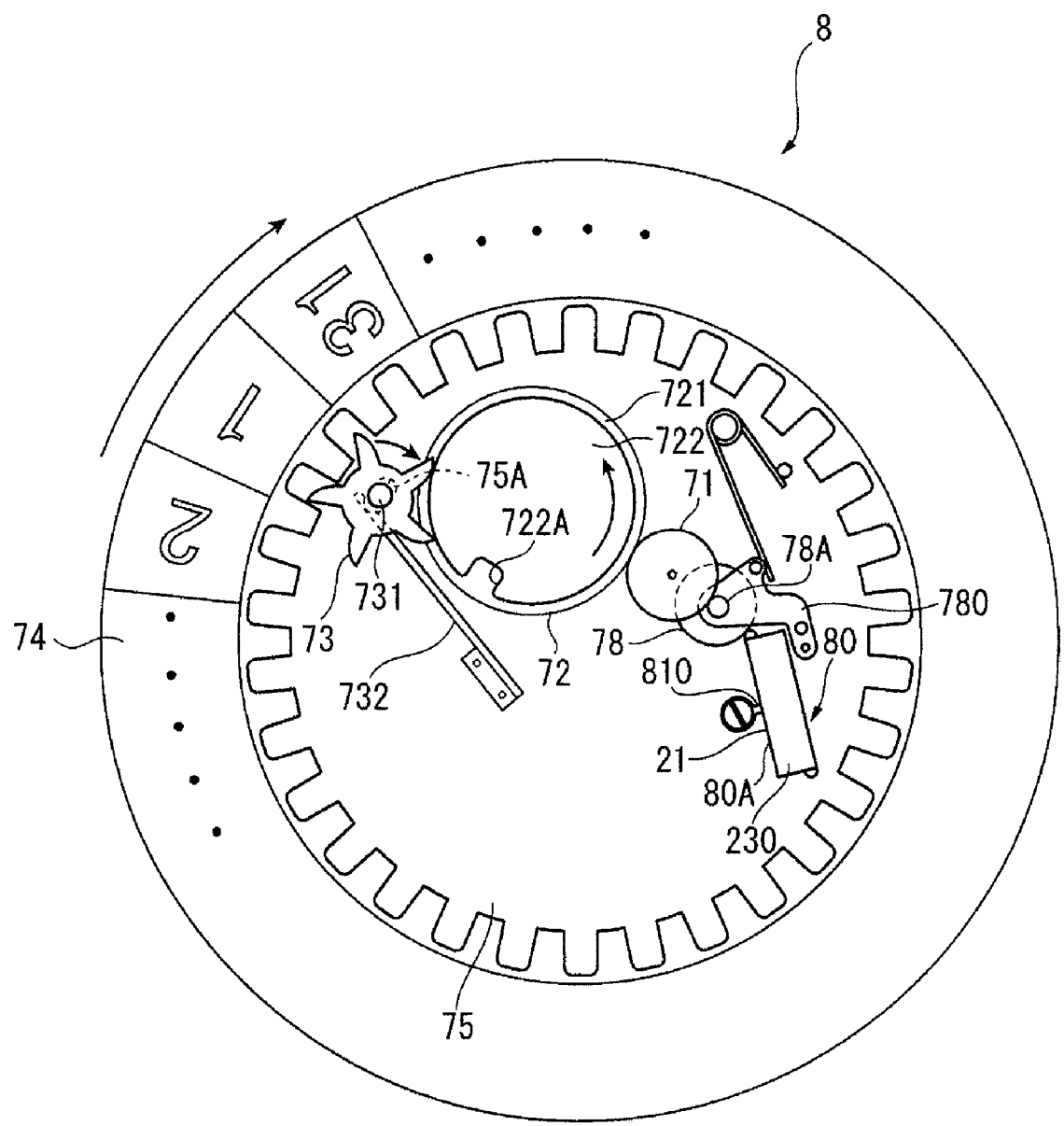
FIG. 21 is a plan view of the date display device in a sixth embodiment of the invention.

FIG. 21 shows a piezoelectric actuator 80 that is used in a date display device 8. The piezoelectric actuator 80 has a single unsegmented electrode 230 disposed to the piezoelectric elements 21 on both the front and back of the reinforcing member 810, and voltage is applied between this electrode 230 and the 810.

Figure 22:
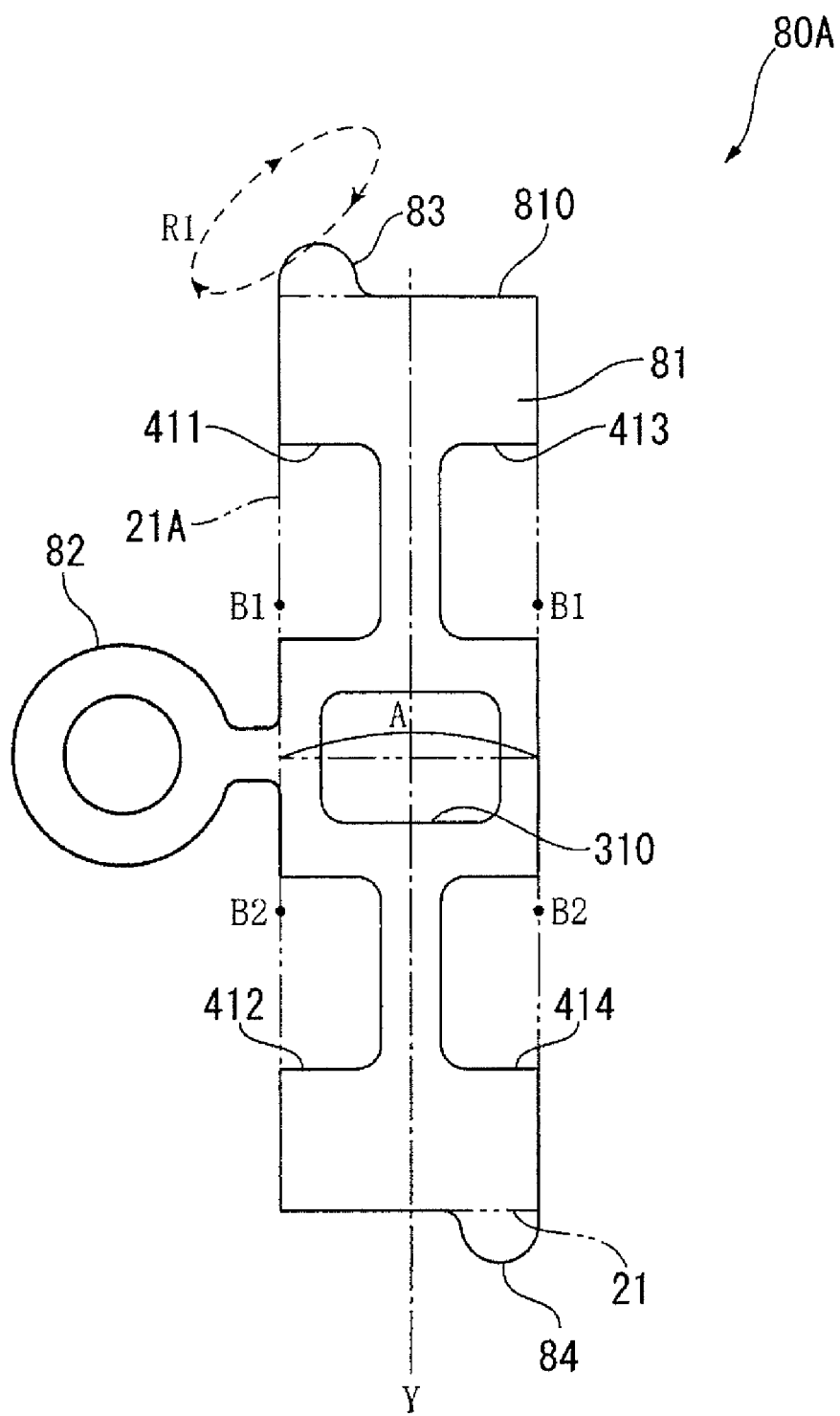
FIG. 22 is a plan view of the reinforcing member in the sixth embodiment of the invention.

FIG. 22 shows the shape of the reinforcing member 810 of the piezoelectric transducer 80A. The reinforcing member 810 has a reinforcing plate 81 substantially the same as the reinforcing plate in the second embodiment (FIG. 10), a support unit 82 connected to the side of one long side of the reinforcing plate 81, and protrusions 83 and 84 disposed to the short sides of the reinforcing plate 81. The shape and position of the through-hole 310 and recesses 411 to 414 shown in FIG. 22 are identical to the shape and position of the through-hole 310 and recesses 411 to 414 shown in FIG. 10. The recesses 411 to 414 are second void parts.

The protrusions 83 and 84 are disposed to positions offset in opposite directions from the center line Y, and the moment produced by the weight imbalance created by the positions of the protrusions 83 and 84 induces a sinusoidal vibration. As a result, the piezoelectric transducer 80A excites both longitudinal vibration and sinusoidal vibration. The rotor 78 (FIG. 21) is driven in a prescribed direction by the elliptical path R1 traveled by the protruding prod 83.

This embodiment of the invention has the same effect as the second embodiment of the invention described above.

Embodiment 7

A seventh embodiment of the invention is described next. This embodiment enables increasing primarily the amplitude of sinusoidal vibration.

Figure 23:
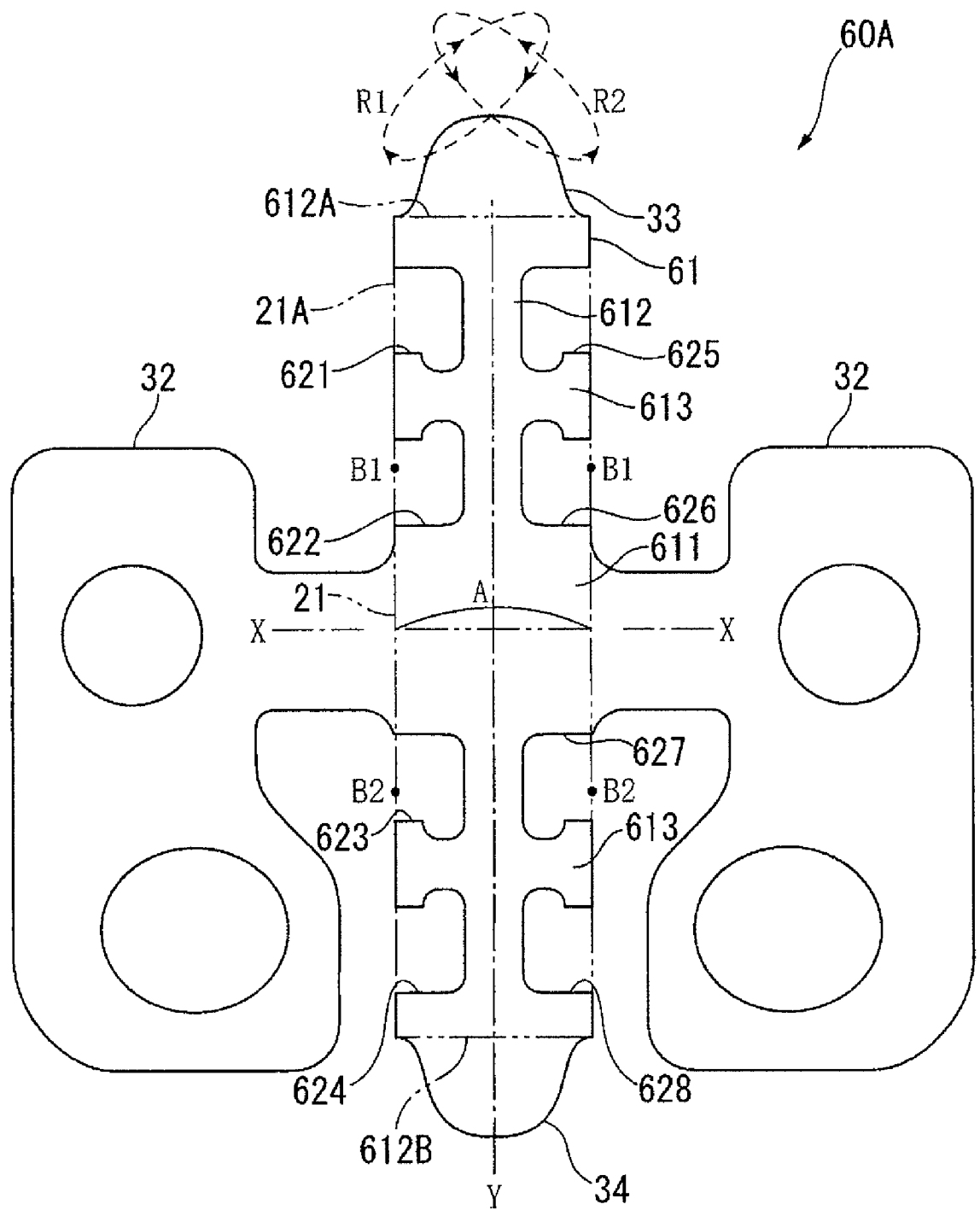
FIG. 23 is a plan view of a piezoelectric transducer according to a seventh embodiment of the invention.

FIG. 23 shows a piezoelectric transducer 60A according to this embodiment of the invention. This embodiment differs from the preceding embodiments only in the shape of the reinforcing plate 61 that is layered with the piezoelectric elements 21, and is otherwise the same as the preceding embodiments.

The reinforcing plate 61 has a center part 611, a spine 612, and a plurality of branches 613. The center part 611 is layered with and located in the center part of the surface of the piezoelectric element 21, and is connected to the support units 32. The spine 612 extends from one end to the other end of the length of the piezoelectric element 21 through the center part 611. The branches 613 are formed intersecting the spine 612.

There are two branches 613, including one between one end 612A of the spine 612 and the center part 611 and one between the other end 612B of the spine 612 and the center part 611.

The distal end parts of the branches 613 that overlap the outside edges 21A of the piezoelectric elements 21 are basically T-shaped.

Voids 621 to 628 are formed in this reinforcing plate 61 from a position corresponding to the outside lengthwise edges 21A of the piezoelectric elements 21 toward the spine 612 between the one end 612A of the spine 612 and the adjacent branch 613, between the other end 612B of the spine 612 and the adjacent branch 613, and between the center part 611 and the adjacent branches 613. These voids 621 to 628 are also formed line symmetrically to the center line Y.

The voids 622, 623, 626, and 627 are formed to contain the point B1 or B2 where strain produced by sinusoidal vibration is greatest. The voids 622, 623, 626, and 627 are thus second void parts.

The size, position, and shape of the voids 622, 623, 626, and 627 are determined to allow for the change in the vibration energy density distribution caused by the reaction of the rotor 25 (FIG. 2) when the contact prod 33 drives the rotor 25 from the vibration energy density distribution when the piezoelectric transducer 60A is driven alone with no load.

The amplitude resulting from the maximum vibration energy produced by sinusoidal vibration of the piezoelectric elements 21 can also be increased because the piezoelectric elements 21 can expand and contract freely in the voids 621 to 628.

This embodiment of the invention does not have an opening covering part of the line segment A where the strain produced by longitudinal vibration is greatest, but can still help increase the amplitude of longitudinal vibration because the piezoelectric elements 21 can expand and contract freely in the voids 621 to 628.

The piezoelectric transducer 60A in this embodiment of the invention is formed to contain the points B1 and B2 where strain produced by sinusoidal vibration is substantially greatest, and has the following effect in addition to effects (3) and (4) described above.

(1') Voids 621 to 628 containing the points B1 and B2 where strain produced by sinusoidal vibration is greatest are formed in the reinforcing plate 61 of a piezoelectric actuator 20 that operates using a battery in a timepiece 1 as the power source as a result of considering the vibration energy density of the piezoelectric transducer 60A as shown in FIG. 40 and FIG. 41. The amplitude of sinusoidal vibration is thus reliably increased because the portions of the reinforcing plate 31 other than the voids 621 to 628 limit out-of-plane displacement of the piezoelectric elements 21 while the piezoelectric element 21 can achieve maximum vibration energy and increase vibration amplitude in the voids 621 to 628.

This arrangement enables driving heavier loads (such as the rotor 25, wheels 261 and 262, and chronograph second hand 7A) or driving a driven body at high speed using the same input power so that, for example, a second hand, such as a chronograph second hand 7A that is driven at a relatively high speed, can be driven.

The invention can therefore also drive a driven body of a specific load using less input power, thereby enabling reducing battery capacity and thus facilitating reducing the size and thickness of the timepiece 1.

(11) Because the spine 612 works as a support column and the spine 612, center part 611, and branches 613 together render a support skeleton, this support skeleton desirably limits out-of-plane displacement of the piezoelectric elements 21. As a result, vibration efficiency can be further improved.

Variation of the Seventh Embodiment

Figure 24:
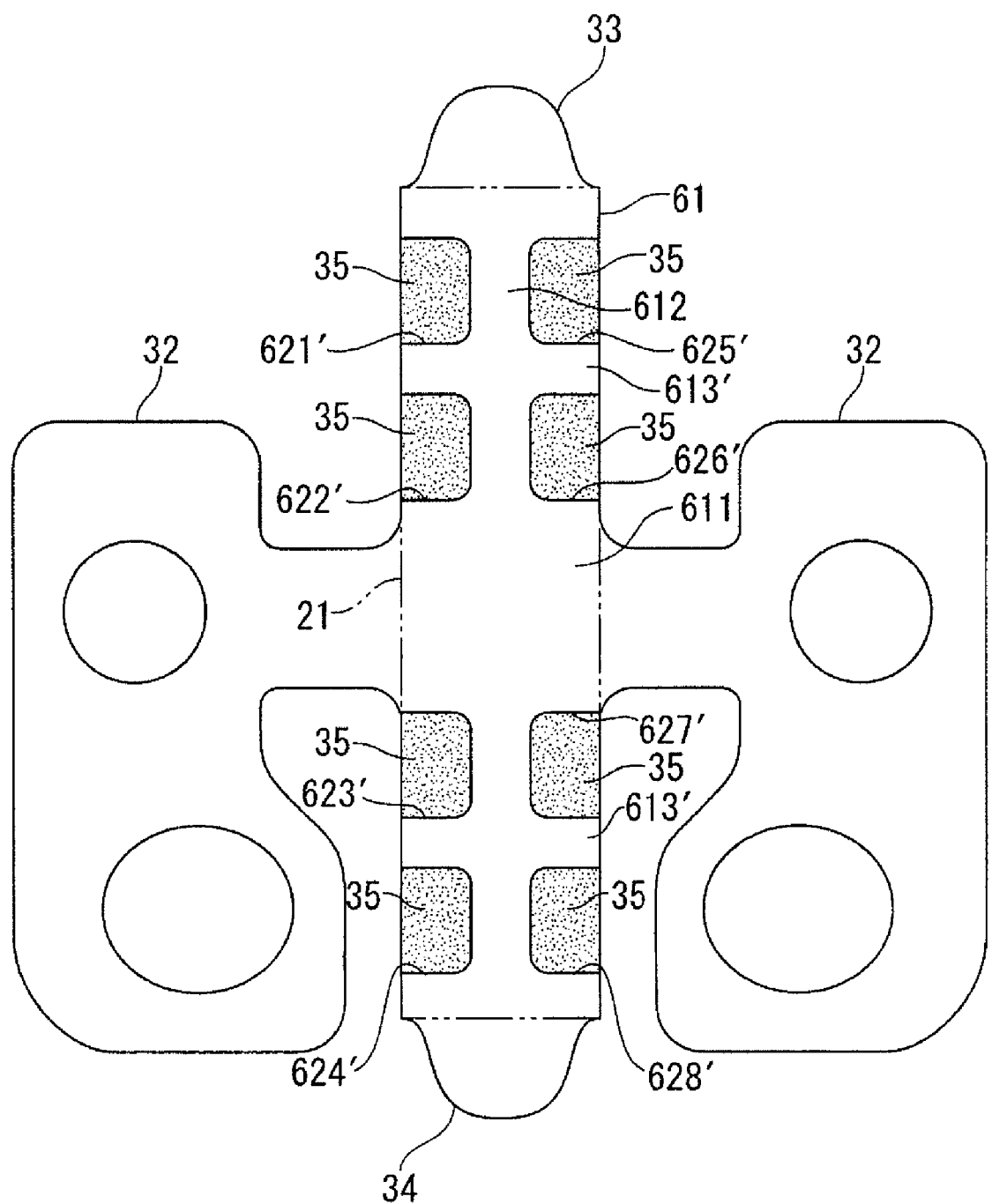
FIG. 24 shows a variation of the seventh embodiment of the invention.

FIG. 24 shows a variation in which a member 35 formed by resin or solder is disposed and fixed in the each of the voids 621' to 628' in the reinforcing plate 61. Because the elastic modulus of the member 35 is lower than the elastic modulus of the reinforcing plate 61, this variation affords the same effect as an arrangement in which the insides of the voids 621' to 628' are empty. Disposing this member 35 in the voids 621' to 628' also better assures sufficient strength in the reinforcing plate 61 even if the area of the voids 621' to 628' formed in the reinforcing plate 61 is large. As a result, the distal ends of the branches 613' are not T-shaped.

Embodiment 8

An eighth embodiment of the invention is described next. This embodiment has more branches than the seventh embodiment, and enables increasing primarily the amplitude of sinusoidal vibration.

Figure 25:
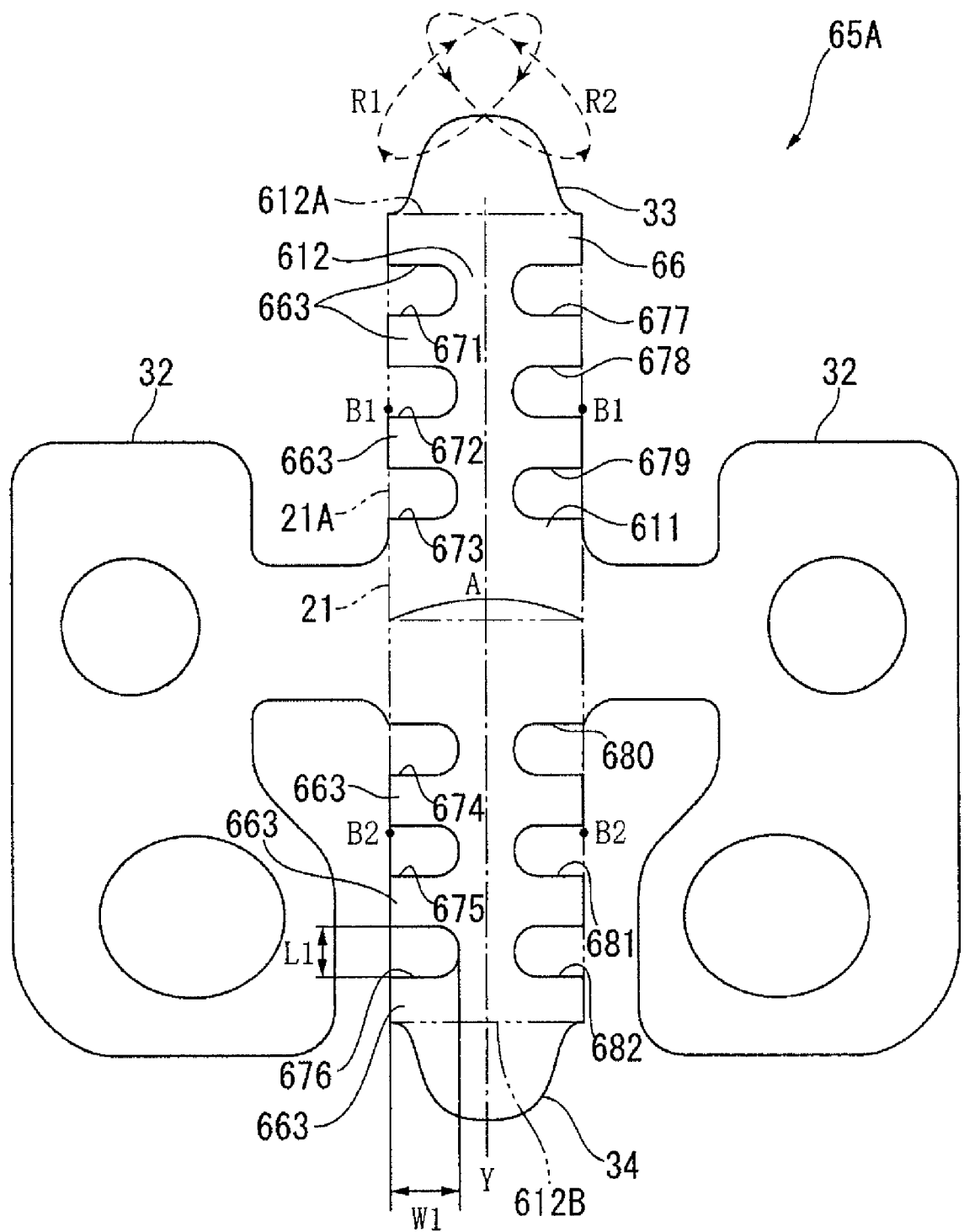
FIG. 25 is a plan view of a piezoelectric transducer according to an eighth embodiment of the invention.

FIG. 25 shows a piezoelectric transducer 65A according to this embodiment of the invention. This embodiment differs from the preceding embodiments only in the shape of the reinforcing plate 66 that is layered with the piezoelectric elements 21, and is otherwise the same as the preceding embodiments.

The reinforcing plate 66 has a center part 611, a spine 612, and a plurality of branches 663 that are formed intersecting the spine 612 substantially the same as in the seventh embodiment (FIG. 23).

There are six branches 663 in this embodiment of the invention, including three between one end 612A of the spine 612 and the center part 611 and three between the other end 612B of the spine 612 and the center part 611.

Voids 671 to 682 are formed in this reinforcing plate 66 from a position corresponding to the outside lengthwise edges 21A of the piezoelectric elements 21 toward the spine 612 between the one end 612A of the spine 612 and the adjacent branch 663, between the other end 612B of the spine 612 and the adjacent branch 663, between adjacent branches 663, and between the center part 611 and the adjacent branches 663. These voids 671 to 682 are also formed line symmetrically to the center line Y.

The voids 672 and 678 are formed to contain the point B1 where strain produced by sinusoidal vibration is greatest, and voids 675 and 681 are formed to contain the point B2 where strain produced by sinusoidal vibration is greatest. The voids 672, 678, 675, and 681 are thus second void parts.

The size, position, and shape of the voids 671 to 682 are determined to allow for the change in the vibration energy density distribution caused by the reaction of the rotor 25 (FIG. 2) when the contact prod 33 drives the rotor 25 from the vibration energy density distribution when the piezoelectric transducer 65A is driven alone with no load.

In addition, the length L1 of voids 671 to 682 is less than or equal to 7% (and preferably greater than or equal to 3%) of the length of the piezoelectric element 21, and the width W1 of the voids 671 to 682 is less than or equal to 39% (and preferably greater than or equal to 10%) of the width of the piezoelectric element 21.

The amplitude resulting from the maximum vibration energy produced by sinusoidal vibration of the piezoelectric elements 21 can also be increased because the piezoelectric elements 21 can expand and contract freely in the voids 671 to 682.

While an opening is not provided in the piezoelectric transducer 65A according to this embodiment at part of the line segment A where the strain produced by longitudinal vibration is greatest, but can still help increase the amplitude of longitudinal vibration because the piezoelectric elements 21 can expand and contract freely in the voids 671 to 682.

In addition to the effect of the seventh embodiment described above, this embodiment also has the following effect.

(12) By keeping the dimensions of the voids formed in the reinforcing plate 66 within the ratios described above, the reinforcing plate 66 can reliably limit out-of-plane displacement of the piezoelectric element 21.

Embodiment 9

A ninth embodiment of the invention is described next. While the piezoelectric transducer in each of the foregoing embodiments is formed line symmetrically, this embodiment has a piezoelectric transducer that is not line symmetrical. This embodiment shows an arrangement that primarily increases the amplitude of sinusoidal vibration.

1. General Configuration

Figure 26:
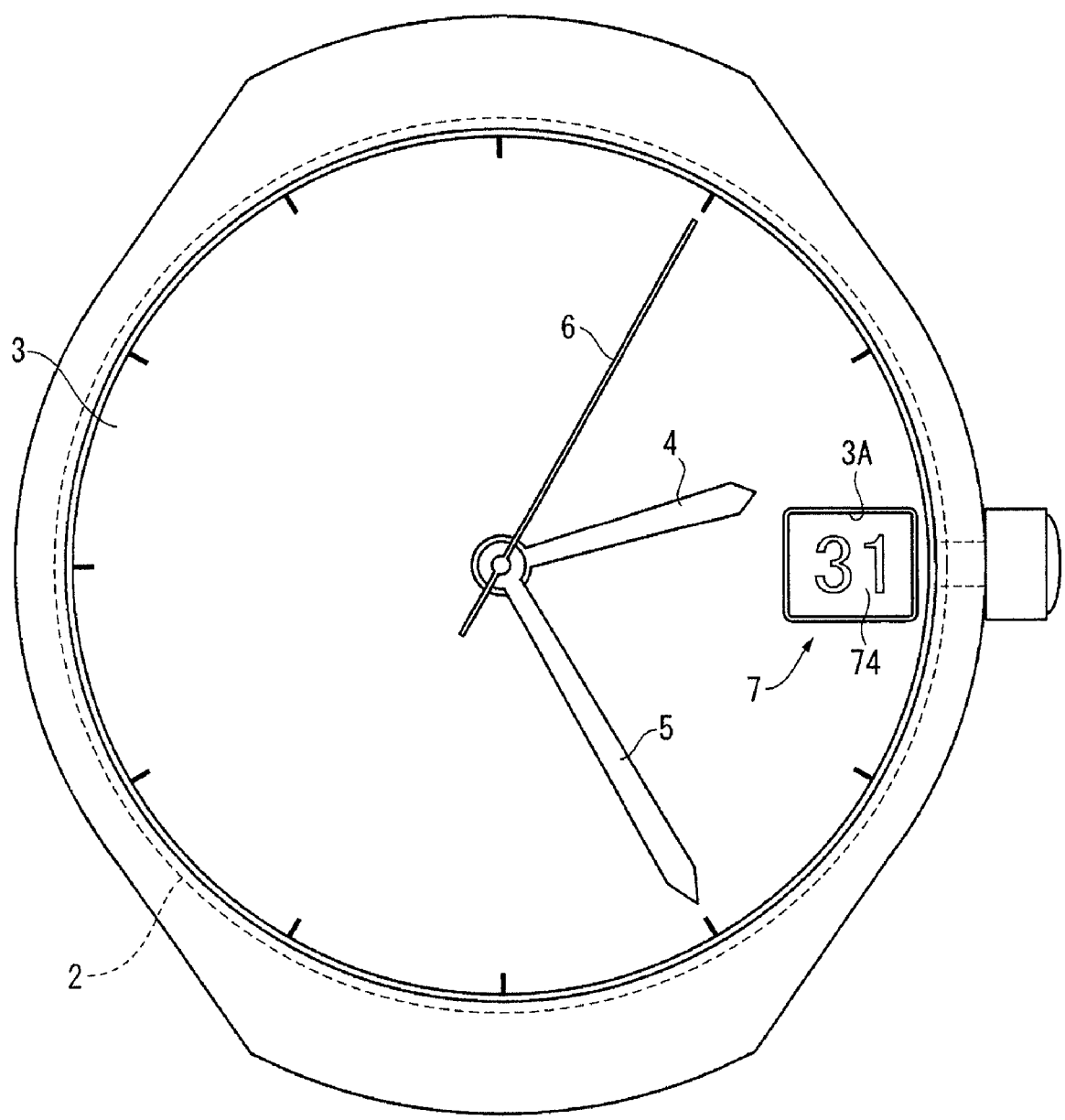
FIG. 26 shows the appearance of a wristwatch according to a ninth embodiment of the invention.

FIG. 26 is a plan view of a timepiece described as a portable device according to this embodiment of the invention.

The timepiece according to this embodiment of the invention is an analog wristwatch (quartz) that has a movement 2 as a timekeeping means, and a dial 3, an hour hand 4, a minute hand 5, and a second hand 6 as a time display unit.

A substantially rectangular window 3A is disposed at the 3:00 o'clock position of the dial 3, and the date printed on a date wheel 74 disposed behind the dial 3 is sequentially displayed in the window 3A by rotation of the date wheel 74.

This timepiece is rendered as an electronic timepiece (a quartz watch) and has a movement 2 that includes a circuit board having a crystal oscillator, a stepping motor having a coil, stator, and rotor, and a drive wheel train not shown as the drive mechanism for the hour hand 4, minute hand 5, and second hand 6.

2. Date Display Device

Figure 27:
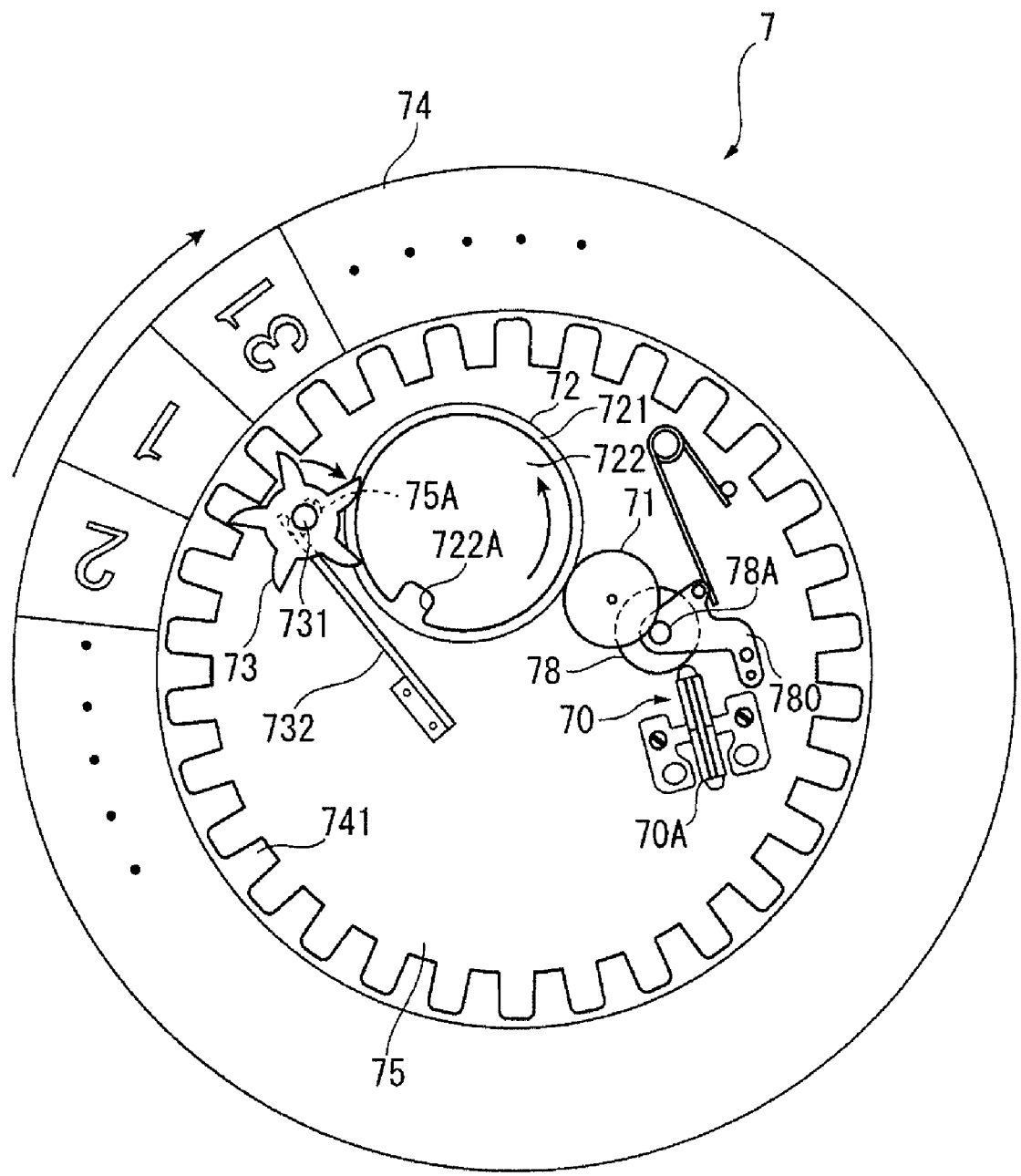
FIG. 27 is a plan view of the date display device in the ninth embodiment of the invention.
Figure 28:
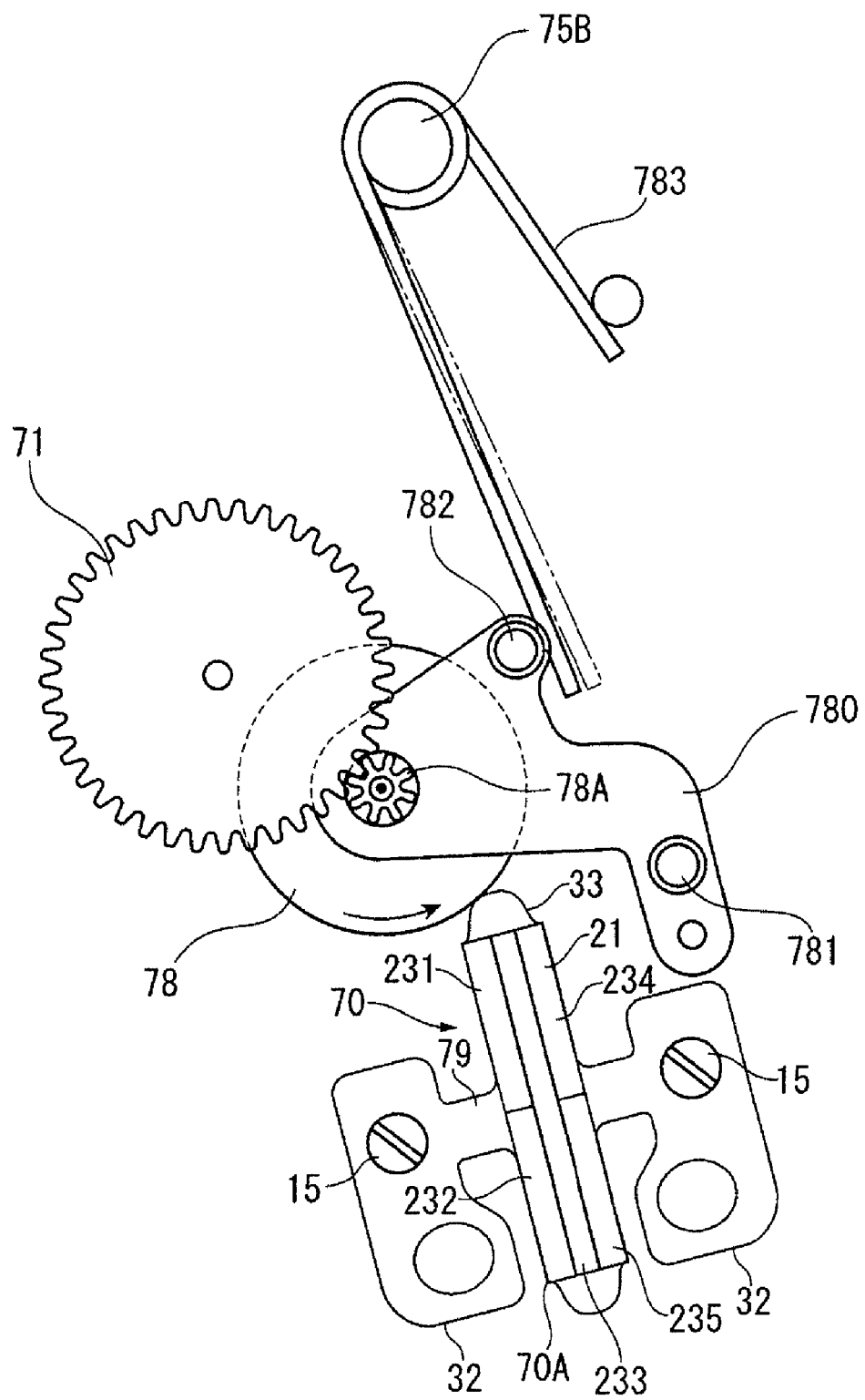
FIG. 28 is an enlarged view of a portion of FIG. 27.

FIG. 27 is a plan view of the movement 2 from the side to which the dial 3 is disposed, and FIG. 28 is an enlarged view of a part of FIG. 27. A date display device 7 for displaying the date in the window 3A (FIG. 26) is assembled in the movement 2.

The date display device 7 uses a piezoelectric actuator 70 that has a piezoelectric transducer 70A and a rotor 78 as the drive power source, and includes date-turning intermediate wheels 71 and 72 and date-turning wheel 73 for transferring while speed reducing the drive power, and the date wheel 74 that is rotated by the date-turning wheel 73.

The piezoelectric actuator 70, date-turning intermediate wheels 71 and 72, date-turning wheel 73, and date wheel 74 are disposed to the front (dial 3 side) of the main plate 75.

The drive wheel train for driving the hour hand 4, minute hand 5, and second hand 6, and a battery are disposed on the back side of the main plate 75.

A rotor pinion 78A on top of the rotor 78 engages the 71, and the 71 rotates in conjunction with rotor 78 rotation.

The date-turning intermediate wheel 72 has a large diameter part 721 and a small diameter part 722. The large diameter part 721 engages the date-turning intermediate wheel 71. The small diameter part 722 is a disc slightly smaller in diameter than the large diameter part 721, and is affixed concentrically to the large diameter part 721. A single notch 722A is formed in the outside edge of the small diameter part 722.

The date-turning wheel 73 is a gear with five teeth. The rotating shaft 731 of the date-turning wheel 73 is inserted rotatably in a hole 75A rendered in the main plate 75. The main plate 75 is an oval with the long axis substantially aligned with the circumference of the date wheel 74. A flat spring 732 fixed to the main plate 75 urges the 731 towards the top right as seen in FIG. 27, that is, toward the date-turning intermediate wheel 72. When the date-turning intermediate wheel 72 turns one revolution, a tooth of the date-turning wheel 73 engages the notch 722A in the date-turning intermediate wheel 72, causing the date-turning wheel 73 to advance the distance of one tooth and the date displayed in the window 3A (FIG. 26) to change.

Note that the date wheel 74 is prevented from rocking as a result of the date-turning wheel 73 engaging the internal teeth 741 of the date wheel 74 and the urging force of the flat spring 732.

The date wheel 74 is a ring-shaped wheel with the numbers 1 to 31 printed on the surface around the top, and is disposed around the movement 2.

When the date changes (at 24:00), the piezoelectric actuator 70 of this date display device 7 operates, the rotor 78 and date-turning intermediate wheels 71 and 72 rotate in sequence, the date-turning wheel 73 engages the notch 722A and turns, and the date wheel 74 advances one day.

3. Arrangement of the Piezoelectric Actuator

Rotor

The rotor 78 of the piezoelectric actuator 70 is held freely rotatably on a rotor support member 780. The rotor support member 780 is basically C-shaped when seen in section to hold the top and bottom of the rotor 78, and is supported on the main plate 75 by a pin 781. The rotor support member 780 also has another pin 782, and is urged counterclockwise (toward the piezoelectric transducer 70A) as seen in FIG. 28 by a pressure spring 783, which is wound around a stud 75B disposed to the main plate 75, set against the pin 782.

Piezoelectric Transducer

Figure 29:
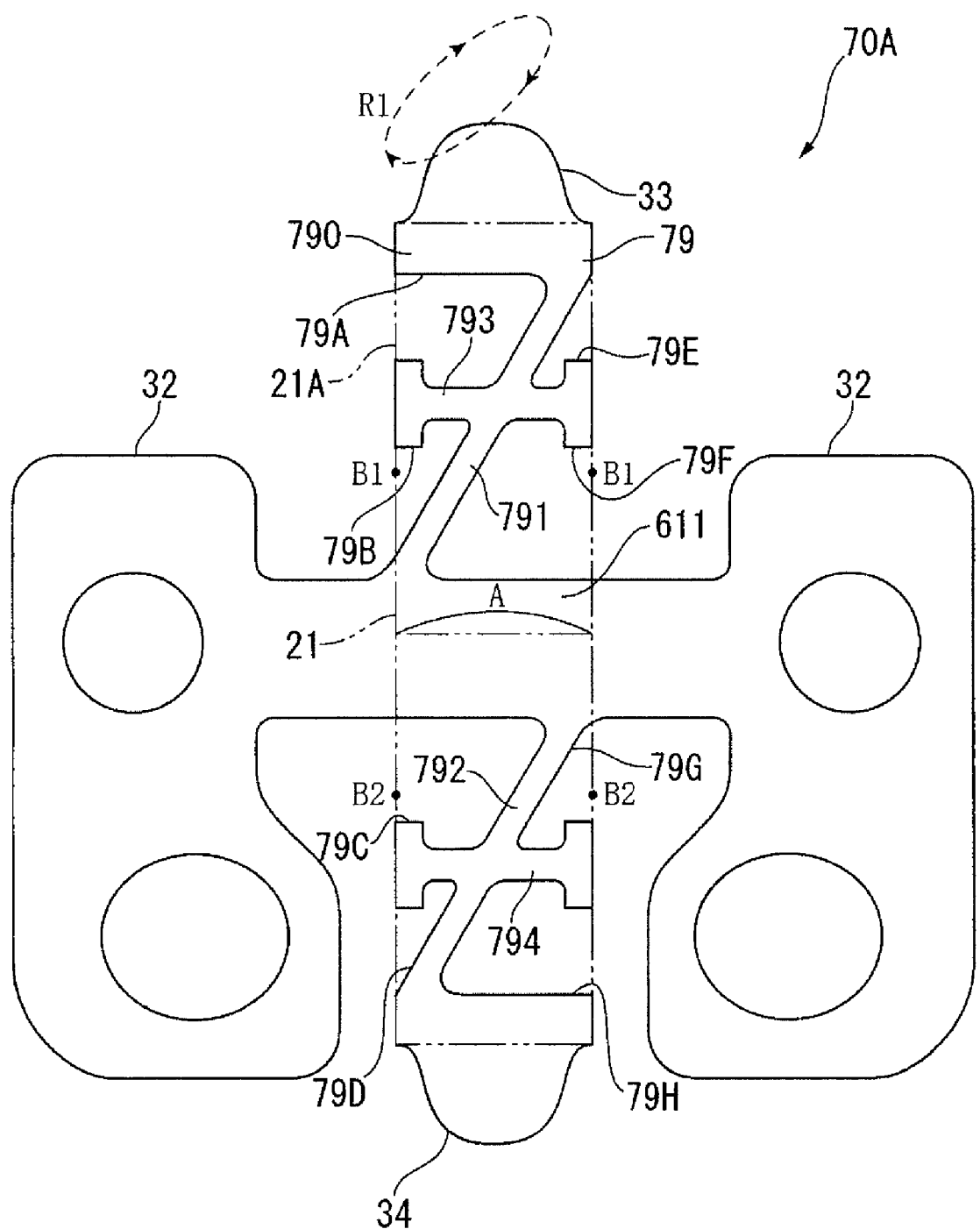
FIG. 29 is a plan view of the reinforcing member in the ninth embodiment of the invention.

As shown in FIG. 28 the piezoelectric transducer 70A has piezoelectric elements 21 as described in the foregoing embodiments, but the shape of the reinforcing member 79 differs from the preceding embodiments as shown in FIG. 29.

As shown in FIG. 29 the reinforcing plate 790 has a center part 611, spines 791 and 792, and branches 793 and 794. The center part 611 is layered with and located in the center part of the surface of the piezoelectric elements 21, and is connected to the support units 32. The spines 791 and 792 extend from the opposite sides of the center part 611. The branches 793 and 794 are formed intersecting the spines 791 and 792.

The spines 791 and 792 are disposed point symmetrically to the center of the surface of the piezoelectric elements 21. The distal end parts of the branches 793 and 794 that overlap the outside edges 21A of the piezoelectric elements 21 are basically T-shaped.

The reinforcing plate 790 is removed from positions corresponding to the outside lengthwise edges 21A of the piezoelectric elements 21 in toward the spines 791 and 792 to form voids 79A to 79H. These voids 79A to 79H are formed point symmetrically to the center of the surface of the piezoelectric elements 21.

The voids 79B and 79F are formed to contain the point B1 where strain produced by sinusoidal vibration is greatest, and the voids 79C and 79G are formed to contain the point B2 where strain produced by sinusoidal vibration is greatest. The voids 79B, 79F, 79C, and 79G are thus second void parts.

The size, position, and shape of the voids 79A to 79H are determined to allow for the change in the vibration energy density distribution caused by the reaction of the rotor 25 (FIG. 2) when the contact prod 33 drives the rotor 25 from the vibration energy density distribution when the piezoelectric transducer 70A is driven alone with no load.

4. Operation of the Piezoelectric Transducer

Applying potential to the electrodes 231, 233, and 235 (FIG. 28) and the reinforcing member 79 of the piezoelectric transducer 70A according to this embodiment of the invention causes the piezoelectric transducer 70A to vibrate in a mixed mode combining longitudinal vibration and sinusoidal vibration, and causes the contact prod 33 to moved in an elliptical path R1 that drives the rotor 78 (FIG. 28) in a prescribed direction. The electrodes 232 and 234 to which potential is not applied are used as vibration detection electrodes.

Because the piezoelectric element 21 expands and contracts freely in the voids 79A to 79H, the amplitude resulting from the maximum vibration energy that can be produced by sinusoidal vibration of the piezoelectric elements 21 can be increased. The piezoelectric transducer 70A in this embodiment of the invention does not have an opening in part of the line segment A where the strain produced by longitudinal vibration is greatest, but can still help increase the amplitude of longitudinal vibration because the piezoelectric elements 21 can expand and contract freely in the voids 79A to 79H.

This embodiment has substantially the same effect as the seventh embodiment (FIG. 23) described above.

Note that a through-hole containing a part of line segment A can also be formed in the center part 611 in this embodiment. The effect of this arrangement is substantially the same as the third embodiment (FIG. 12).

Other Aspects of the Invention

The invention is not limited to the embodiments described above and can be modified and improved in many ways without departing from the scope of the invention.

Figure 30:
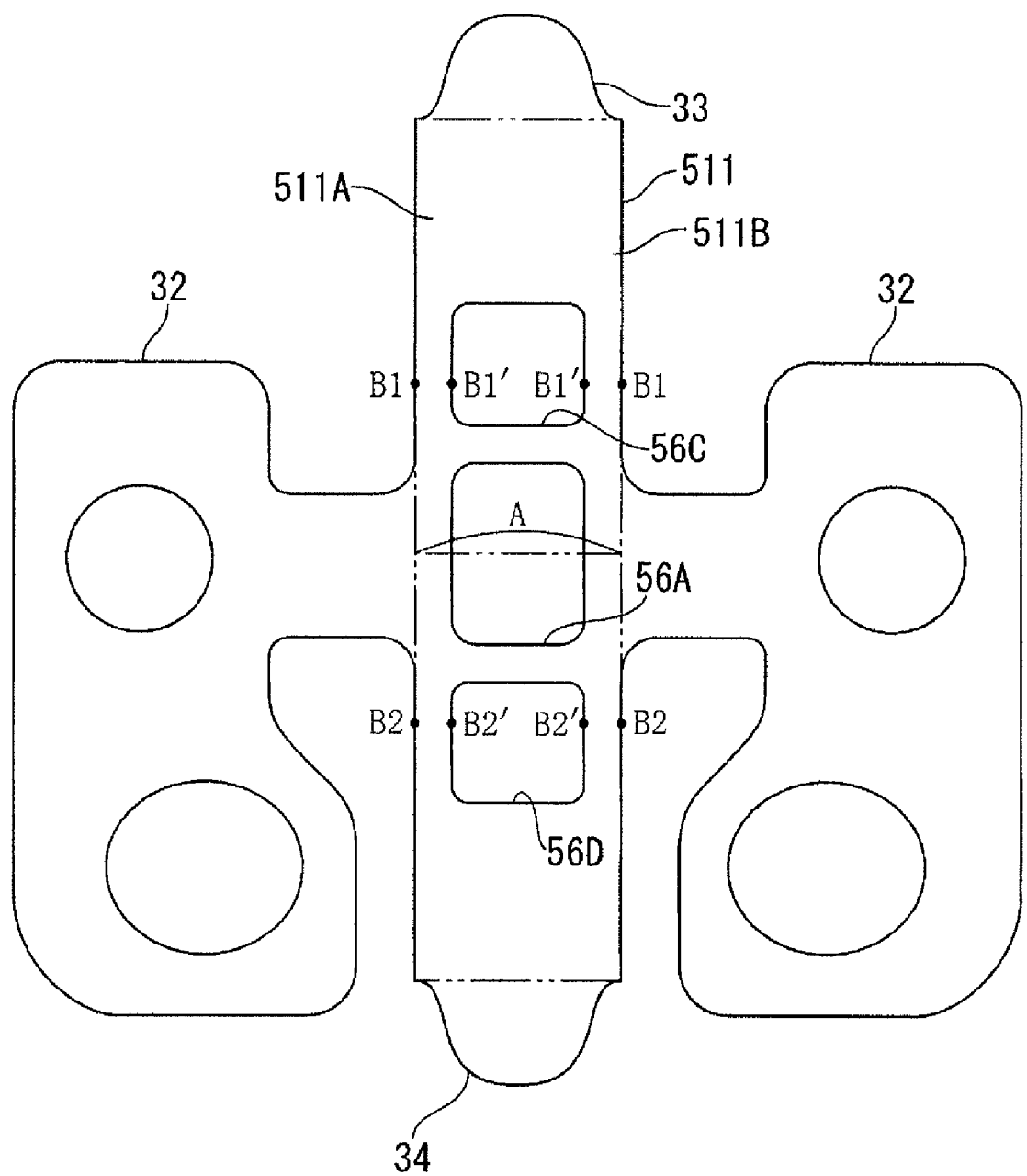
FIG. 30 is a plan view of the reinforcing member in a variation of the invention.

For example, the arrangement shown in FIG. 20 can be modified as shown in FIG. 30. The arrangement shown in FIG. 30 has openings covering part of the line segment A where the strain produced by longitudinal vibration is greatest and the points B1 and B2' where strain produced by sinusoidal vibration is substantially greatest, and has substantially the same effect as the fifth embodiment shown in FIG. 20.

Figure 31:
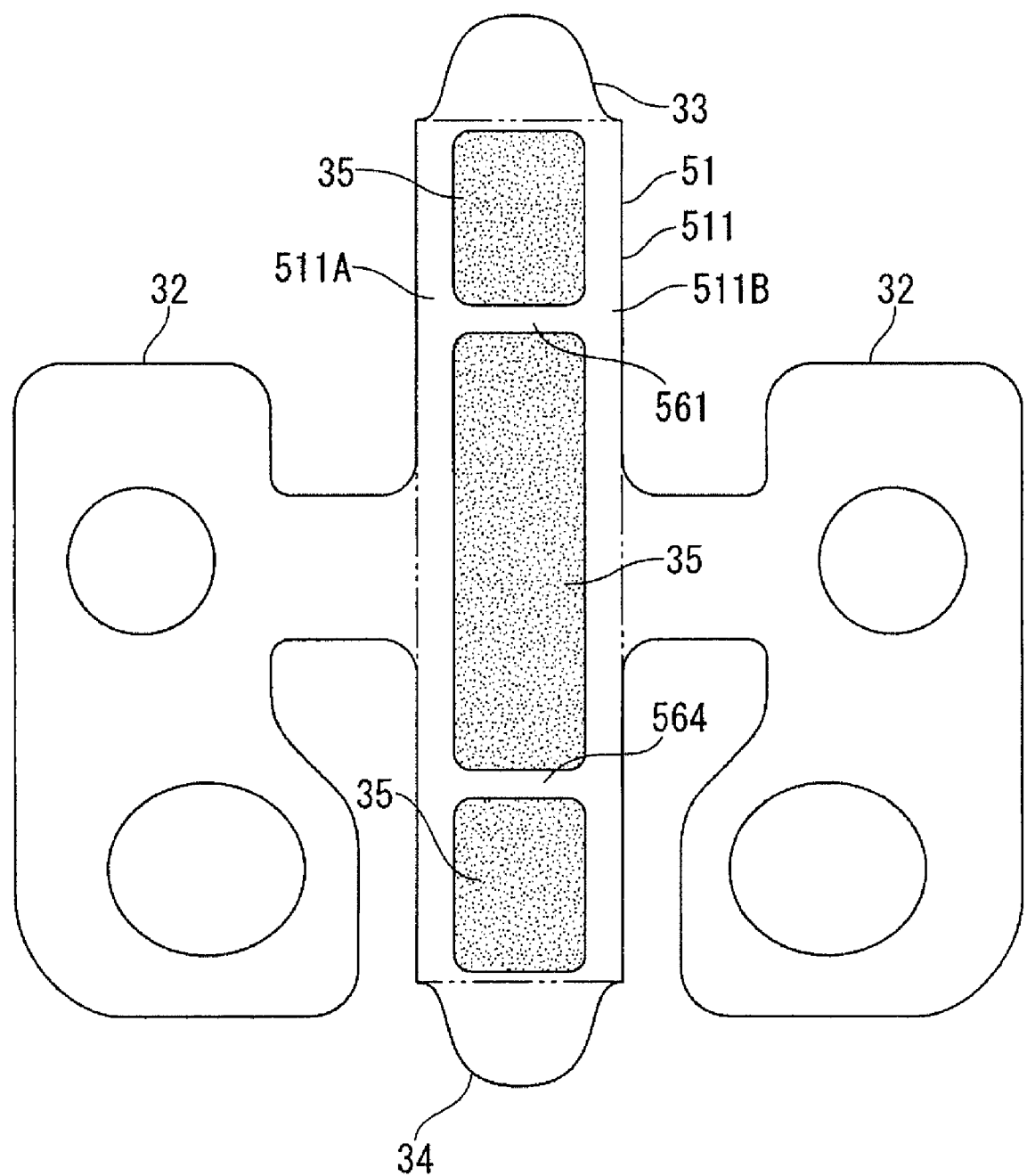
FIG. 31 is a plan view of the reinforcing member in a variation of the invention.
Figure 32:
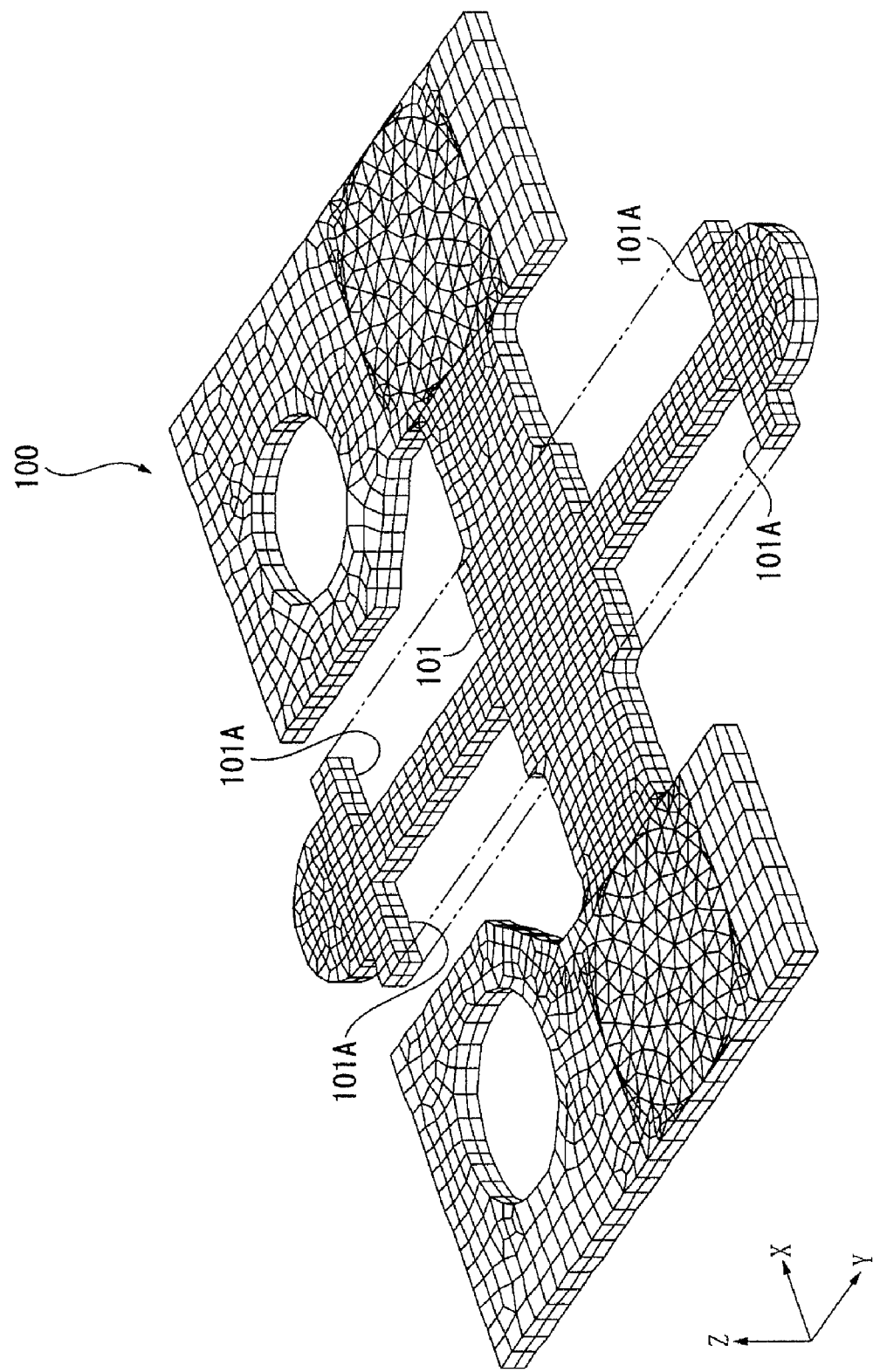
FIG. 32 shows a reinforcing member with an area significantly less than the area of the piezoelectric element.
Figure 33:
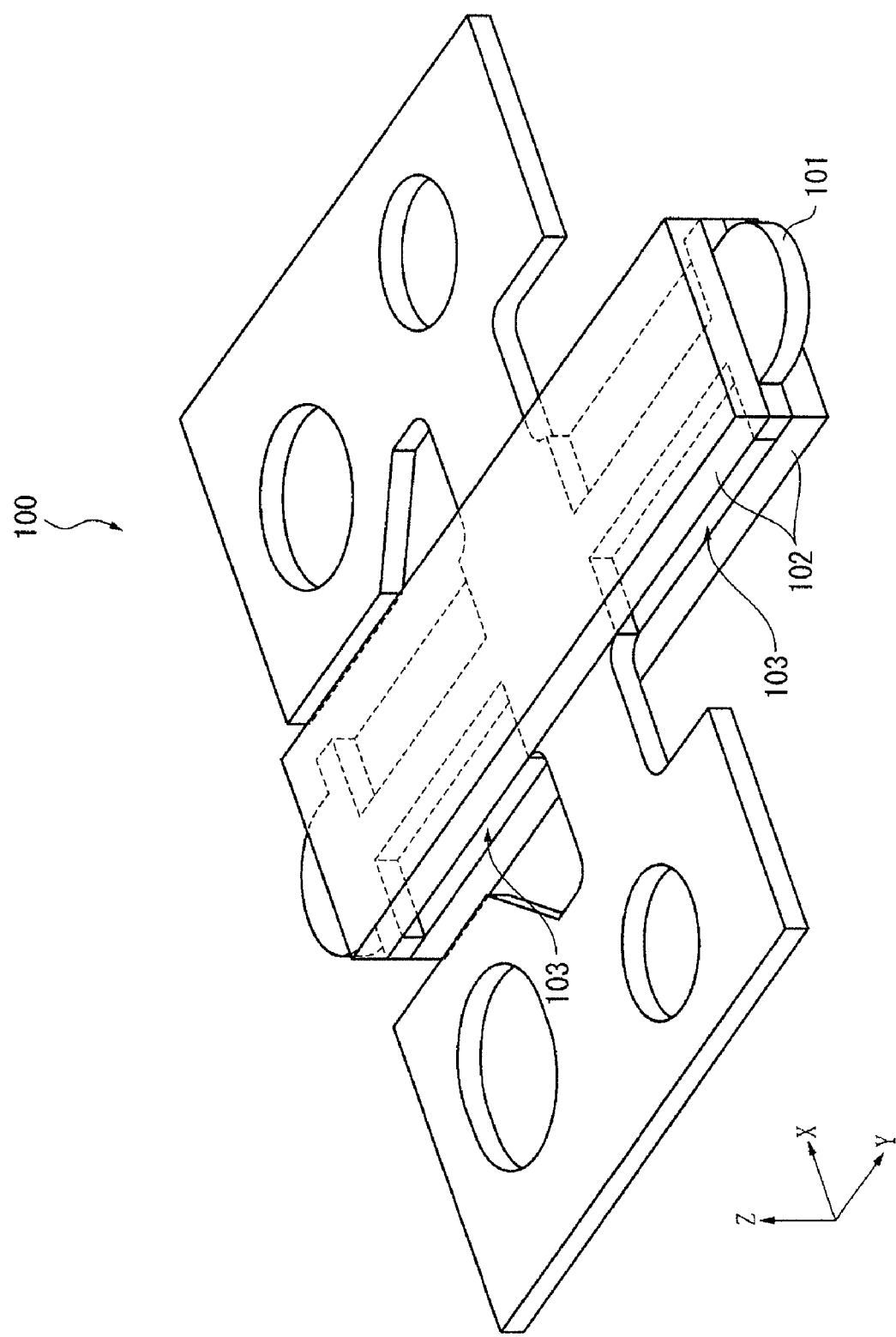
FIG. 33 shows a piezoelectric transducer having the reinforcing member in FIG. 32.

Connecting parts can also be added to the arrangement shown in FIG. 19 to achieve the arrangement shown in FIG. 31. These connecting parts 561 and 564 improve the torsion strength of the reinforcing plate 51.

Further alternatively, part of the line segment A where the strain produced by longitudinal vibration is greatest and the points B1' and B2' where strain produced by sinusoidal vibration is substantially greatest are contained in a single aperture 51A in the arrangement shown in FIG. 18, but the invention is not so limited and part of line segment A, point B1' and point B2' can be included in separate openings as shown in FIG. 30, for example.

The support units of the reinforcing member in the foregoing embodiments are formed near the center of the long sides of the piezoelectric transducer, but the location of these support units is not so limited. For example, the support units of the reinforcing member can be offset slightly from the center of the long sides of the piezoelectric transducer toward a short side, or near the center of the short sides of the piezoelectric transducer.

The support unit of the reinforcing member in the foregoing embodiments can also be disposed on both sides on opposite sides of the width of the piezoelectric transducer, or on only one side. The support unit could also be disposed to only one short side of the piezoelectric transducer.

Figure 37:
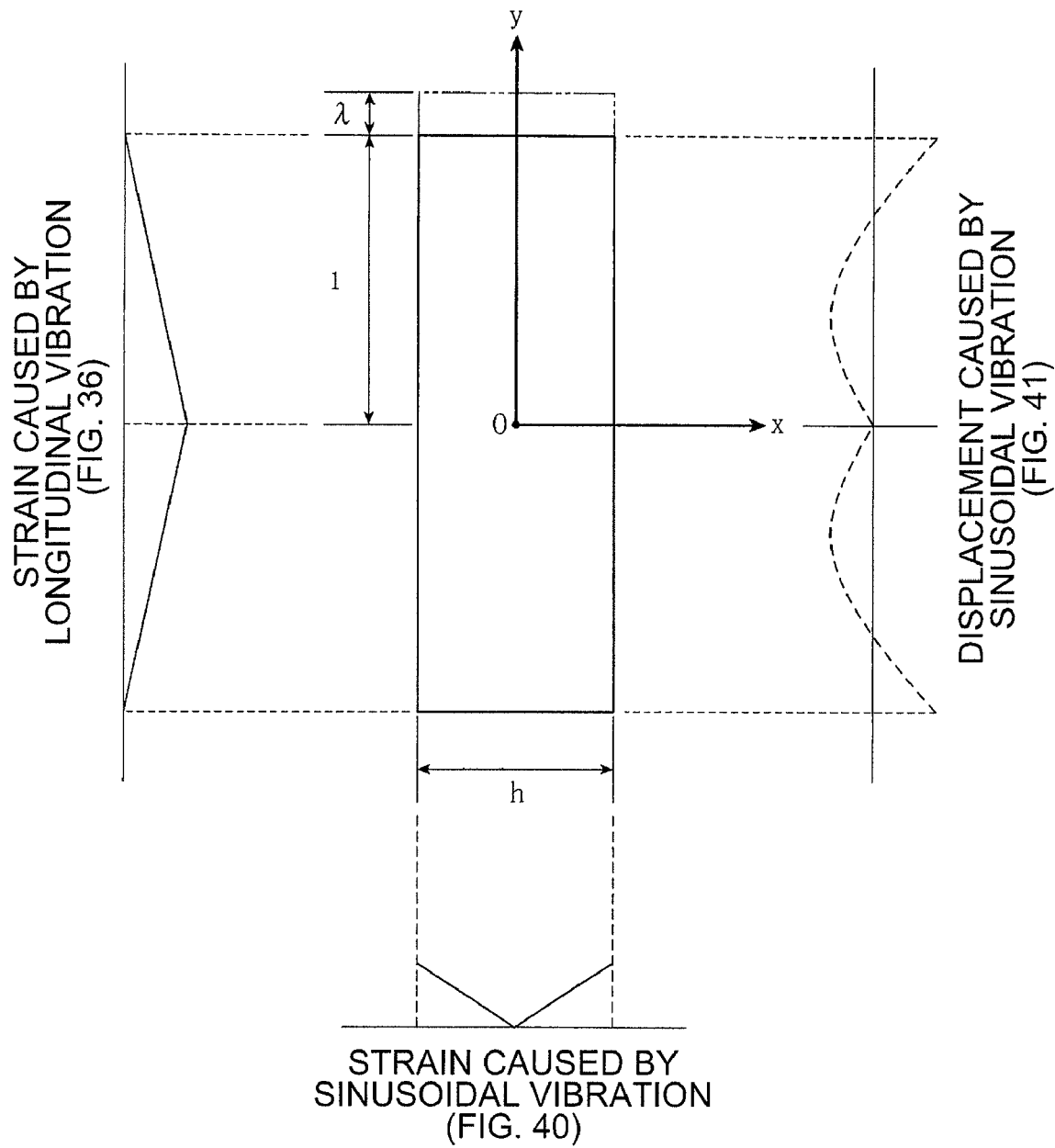
FIG. 37 shows distance normalized to 100 in FIG. 36 and FIG. 40.
Figure 38:
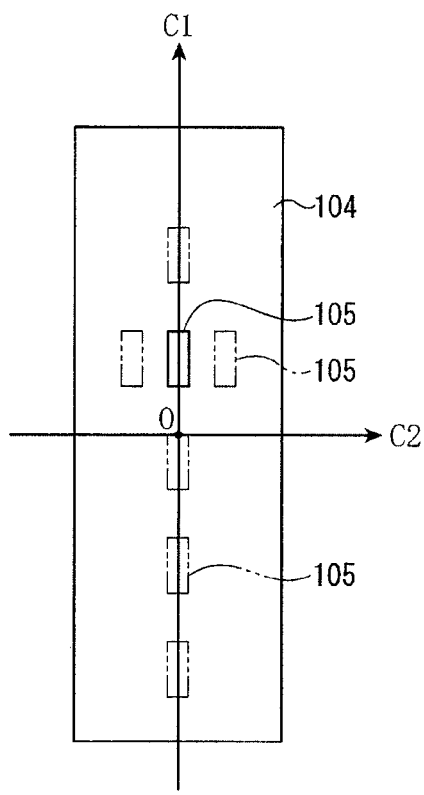
FIG. 38 shows the position of the detection electrode formed on the piezoelectric transducer.
Figure 39:
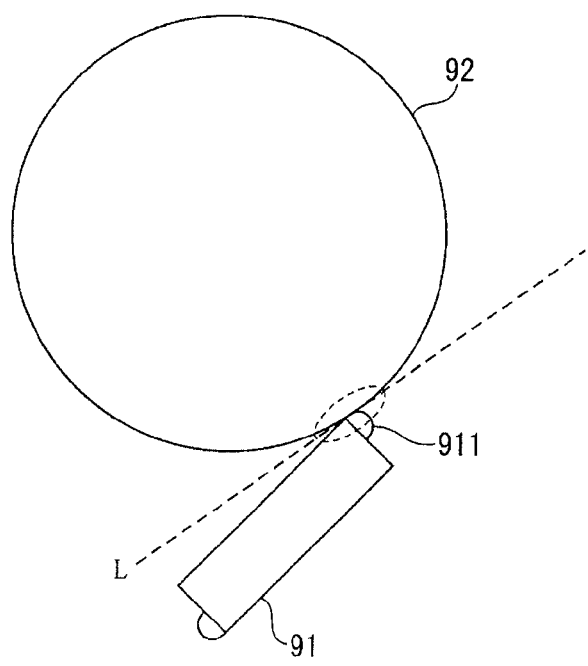
FIG. 39 shows driving a driven body by means of longitudinal vibration.

The number and location of the support units of the reinforcing member are thus not limited to the embodiments described above, and the position of the node and antinode of the longitudinal vibration and the node and antinode of the sinusoidal vibration will differ from the foregoing description according to the number and location of the support units. In this case the position where the strain produced by longitudinal vibration is greatest and the position where the strain produced by sinusoidal vibration is greatest can be determined in the same way as described above with reference to FIG. 36, FIG. 40, and FIG. 41. For example, depending on the plane shape, the length to width ratio, the drive frequency, the number of electrodes, and the location of the electrodes of the piezoelectric element and reinforcing member, there may be multiple sinusoidal vibration positions that are equivalent to point P (places of maximum displacement widthwise to the piezoelectric transducer in the sinusoidal vibration mode) in FIG. 41 between the center point O and the short side of the piezoelectric transducer in FIG. 37. In this case forming the second void parts or third void parts described above at the reinforcing member positions corresponding to these places where the strain produced by sinusoidal vibration is greatest (places where these positions P and maximum strain coincide (see FIG. 40)) is also included in the present invention. This arrangement can also improve the vibration efficiency of the piezoelectric transducer as described above. Where the first void parts, second void parts, and third void parts are formed is based on where the strain produced by longitudinal vibration is greatest and where strain produced by sinusoidal vibration is greatest.

Where strain produced by longitudinal vibration is maximized and where strain produced by sinusoidal vibration is maximized in the arrangements described above are determined based on the overall amplitude (displacement) and strain in the piezoelectric transducer, which is a laminate of the reinforcing member and piezoelectric elements, and void parts are formed at the positions of the reinforcing member corresponding to these places of maximum strain.

However, determining where strain produced by longitudinal vibration is maximized and where strain produced by sinusoidal vibration is maximized can be based on the amplitude and strain in just the piezoelectric elements or just the reinforcing member, and is not limited to the amplitude or strain of the entire piezoelectric transducer. The amplitude or strain of the piezoelectric elements or reinforcing member can be detected by computer simulation, and the detection data will resemble the data shown in FIG. 36, FIG. 40, and FIG. 41. More specifically, the strain and amplitude of the piezoelectric element, and the strain and amplitude of the piezoelectric transducer exhibit the same tendencies shown in FIG. 36, FIG. 40, and FIG. 41.

In each of the foregoing embodiments piezoelectric elements of the same rectangular shape are laminated with a reinforcing member having a basic shape that is rectangular when the void parts are not formed, the length and width of the piezoelectric elements and the length and width of the basic shape of the reinforcing member, and the four sides of the piezoelectric elements are aligned with the four sides of the basic shape of the reinforcing member. The invention is not limited to this arrangement, however, and the shape of the piezoelectric elements can differ from the basic shape of the reinforcing member, and the length and width of the piezoelectric elements can differ from the length and width of the basic shape of the reinforcing member.

More specifically, arrangements in which the width of the rectangular piezoelectric element is different from the width of the reinforcing member of which the basic shape is rectangular, and the position of the outside edge part of a long side of the piezoelectric element does not coincide with the outside edge part of a long side of the basic shape of the reinforcing member, are also included in the present invention. As described above, where strain produced by longitudinal vibration is maximized and where strain produced by sinusoidal vibration is maximized are determined as described above based on the amplitude and strain of the entire piezoelectric transducer or the amplitude and strain of just the piezoelectric element, and void parts can be formed in the reinforcing member at positions corresponding to these identified places of maximum strain.

For example, if the width of the basic shape of the reinforcing member is narrower than the width of the piezoelectric element, and the location where strain produced by sinusoidal vibration of the piezoelectric transducer is greatest is located further to the outside than the outside edge of the reinforcing member, the second void part or the third void part are formed toward the center of the width from an outside edge part of the reinforcing member where this outside edge part is located offset to the center of the width from where strain produced by sinusoidal vibration is greatest.

If the width of the basic shape of the reinforcing member is greater than the width of the piezoelectric element, the location of the void parts is determined based on the amplitude and strain of the piezoelectric element alone, and the location where strain produced by sinusoidal vibration of the piezoelectric element alone is greatest is positioned to the inside of the outside edge part of the reinforcing member, the second void part or the third void part are formed toward the center of the width from an outside edge part of the reinforcing member where this outside edge part is located offset to the outside in the widthwise direction from where strain produced by sinusoidal vibration is greatest.

The piezoelectric transducer is described as being rectangular in plan view in the foregoing embodiments, but other shapes can be used for the piezoelectric transducer, including trapezoid, parallelogram, diamond, or other any shape that can excite longitudinal vibration or sinusoidal vibration.

The piezoelectric transducer in the foregoing embodiments has one piezoelectric element laminated to the front and back of the reinforcing member, but the invention is not so limited. More specifically, a plurality of piezoelectric elements can be laminated to the front and back sides of the reinforcing member, or a piezoelectric element can be laminated on only one side of the reinforcing member.

The position and shape of the electrodes for driving the piezoelectric element are not limited to the position and shape described above, and can be determined appropriately for the conditions. For example, the electrode disposed to the piezoelectric element in the first embodiment is divided into five segments, but an electrode that is segmented laterally and longitudinally into four equal parts can be rendered on a rectangular piezoelectric element. The number of electrodes formed on the piezoelectric element is also not limited, and there can be less than three, or four, or five, or six or more electrodes.

Furthermore, if a piezoelectric element is laminated to both front and back sides of the reinforcing member, the number and shape of the electrodes formed on the front piezoelectric element and the number and shape of the electrodes formed on the back piezoelectric element can be same or different.

The piezoelectric transducers shown in FIG. 23 to FIG. 25 and FIG. 29 excite primarily sinusoidal vibration, and the form (position, shape, and number) of the electrodes formed on the piezoelectric elements of the piezoelectric transducer, and the frequency of the drive signal (applied voltage) are set appropriately to increase the amplitude of sinusoidal vibration.

The driven body is driven by transferring the vibration of the piezoelectric transducer to a rotor in each of the foregoing embodiments, but the invention is not so limited. Vibration of the piezoelectric transducer can, for example, be transferred to a driver that drives linearly. This linear drive driver can be disposed on a slider and guided by a plurality of rollers, for example.

A wristwatch is described above as an example of an application for the piezoelectric transducer, but the invention is not so limited and can be used in pocket watches, table clocks, and wall clocks, for example. The piezoelectric transducer can also be used as a mechanism for driving automata in such timepieces.

The piezoelectric transducer of the invention can also be used in mechanisms for driving devices other than timepieces, including the zoom, autofocus, or film winding mechanism of a camera, the paper feed mechanism of a printer, and toys including riding toys and dolls. In addition to timepieces, cameras, printers, and toys, the piezoelectric transducer of the invention can also be used in a wide range of electronic devices including portable information terminal devices and telephones.

The best modes and methods of achieving the present invention are described above, but the invention is not limited to these embodiments. More specifically, the invention is particularly shown in the figures and described herein with reference to specific embodiments, but it will be obvious to one with ordinary skill in the related art that the shape, material, number, and other detailed aspects of these arrangements can be varied in many ways without departing from the technical concept or the scope of the objective of this invention.

Therefore, description of specific shapes, materials and other aspects of the foregoing embodiments are used by way of example only to facilitate understanding the present invention and in no way limit the scope of this invention, and descriptions using names of parts removing part or all of the limitations relating to the form, material, or other aspects of these embodiments are also included in the scope of this invention.

The entire disclosure of Japanese Patent Application Nos: 2007-034079, filed Feb. 14, 2007 and 2007-285086, filed Nov. 1, 2007 are expressly incorporated by reference herein.

What is claimed is:

1. A piezoelectric transducer that excites longitudinal vibration, comprising:

a piezoelectric element; and a reinforcing member that is laminated with and affixed to the piezoelectric element, and that has a first void part being formed in the reinforcing member, the first void part having an opening, the opening of the first void part including a center part of a location where strain produced by longitudinal vibration in the piezoelectric transducer, the reinforcing member, or piezoelectric element is greatest, an area at which the reinforcing member and the piezoelectric element are in contact is smaller than an area of the piezoelectric element facing the reinforcing member.

2. The piezoelectric transducer described in claim 1, wherein a mixed vibration mode adding sinusoidal vibration to the longitudinal vibration is excited.

3. The piezoelectric transducer described in claim 2, wherein:

a second void part is formed in the reinforcing member, the second void part is formed to include a location where strain produced by sinusoidal vibration in the piezoelectric transducer or the reinforcing member or piezoelectric element is greatest.

4. The piezoelectric transducer described in claim 3, wherein:

the reinforcing member comprises:

a center part in which the first void part is formed, a spine extending through the center part from one end part to the other end part of the piezoelectric element in the direction of longitudinal vibration, and branches formed intersecting the spine, including at least one branch between the one end part of the spine and the center part and at least one branch between the other end part of the spine and the center part; and the second void part is formed from an outside edge part of the reinforcing member toward the spine in the regions between the spine and adjacent branches.

5. The piezoelectric transducer described in claim 2, wherein:

the reinforcing member in which the first void and a third void are formed has a contour part around the entire perimeter of the piezoelectric element when seen in plan view; and the first void part and the third void part rendered to include a location where strain produced by sinusoidal vibration is substantially greatest are formed inside the contour part.

6. The piezoelectric transducer described in claim 5, wherein:

the contour part has a substantially rectangular outside planar shape;

the reinforcing member has one or more connecting parts connecting the long side parts of the contour part across the width of the piezoelectric element on both sides of the center line dividing the length of the piezoelectric element in the direction of longitudinal vibration into two equal parts; and the first void part and third void part are formed surrounded by the contour part and the connecting parts.

7. The piezoelectric transducer described in claim 5, wherein:

the inside of the contour part of the reinforcing member is a single opening; and this opening combines the first void part and the third void part.

8. The piezoelectric transducer described in claim 1, wherein, the outside planar shape of the reinforcing member before the void part is formed is substantially rectangular, and the void part is formed line symmetrically to the center line dividing the width of the reinforcing member into two equal parts.

9. The piezoelectric transducer described in claim 1, wherein a member made from a material with a lower modulus of elasticity than the material of the reinforcing member is disposed in at least one void part.

10. The piezoelectric transducer described in claim 1, wherein the reinforcing member has a contact part that contacts a driven body to drive the driven body, and the first void part is formed to include a location where strain produced by longitudinal vibration is greatest or substantially greatest when the piezoelectric transducer is affected by the reaction of the driven body.

11. The piezoelectric transducer described in claim 3, wherein:

the second void part is formed to include a location where strain produced by sinusoidal vibration is greatest or substantially greatest when the piezoelectric transducer is affected by the reaction of the driven body.

12. The piezoelectric transducer described in claim 5, wherein:

the third void part is formed to include a location where strain produced by sinusoidal vibration is greatest or substantially greatest when the piezoelectric transducer is affected by the reaction of the driven body.

13. A piezoelectric actuator comprising:

the piezoelectric transducer described in claim 1; and a driven body that is driven by the transfer of vibration from the piezoelectric transducer.

14. A portable device comprising the piezoelectric actuator described in claim 13.

15. The portable device described in claim 14, wherein the portable device is a timepiece comprising:

a timekeeping unit; and a time information display unit that displays information kept by the timekeeping unit, and is driven by the driven body.

* * * * *